US012638391B2

(12) United States Patent
Wang et al.

(10) Patent No.: US 12,638,391 B2
(45) Date of Patent: May 26, 2026

(54) EVANESCENT SCATTERING IMAGING OF SINGLE MOLECULES

(71) Applicant: ARIZONA BOARD OF REGENTS ON BEHALF OF ARIZONA STATE UNIVERSITY, Scottsdale, AZ (US)

(72) Inventors: Shaopeng Wang, Chandler, AZ (US); Pengfei Zhang, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 160 days.

(21) Appl. No.: 18/691,592

(22) PCT Filed: Sep. 27, 2022

(86) PCT No.: PCT/US2022/077121
§ 371 (c)(1),
(2) Date: Mar. 13, 2024

(87) PCT Pub. No.: WO2023/056265
PCT Pub. Date: Apr. 6, 2023

(65) Prior Publication Data
US 2024/0410826 A1 Dec. 12, 2024

Related U.S. Application Data

(60) Provisional application No. 63/349,895, filed on Jun. 7, 2022, provisional application No. 63/306,473, filed
(Continued)

(51) Int. Cl.
*G01N 21/47* (2006.01)
*G01N 21/27* (2006.01)
(Continued)

(52) U.S. Cl.
CPC .......... *G01N 21/47* (2013.01); *G01N 21/272* (2013.01); *G02B 21/06* (2013.01); *G02B 21/34* (2013.01);
(Continued)

(58) Field of Classification Search
CPC ................ G01N 21/47; G01N 21/272; G01N 2021/177; G01N 2021/1789; G01N 2021/1772; G02B 21/06; G02B 21/34
See application file for complete search history.

(56) References Cited

U.S. PATENT DOCUMENTS 4,979,821 A * 12/1990 Schutt .................. G01N 21/552
359/896
5,192,510 A * 3/1993 Zoha .................... G01N 33/585
422/82.11
(Continued)

FOREIGN PATENT DOCUMENTS

CN 104487821 A * 4/2015 ............... G21K 1/30
CN 107430123 A * 12/2017 ....... G01N 33/54373
(Continued)

OTHER PUBLICATIONS

International Search Report and Written Opinion dated Jan. 26, 2023, PCT Application No. PCT/US2022/077121, 11 pages.
(Continued)

*Primary Examiner* — Mohamed K Amara
(74) *Attorney, Agent, or Firm* — MH2 Technology Law Group LLP

(57) ABSTRACT
Provided herein are methods of detecting single molecules that include binding single molecules in a sample solution to a first surface of an optically transparent substrate include the optically transparent substrate is free of a metallic coating. In some embodiments, the methods include irradiating the first surface of the substrate with an incident light
(Continued)

having an incident angle selected to achieve total internal reflection of the incident light, thereby scattering light from the first surface and from the single molecules bound to the surface in which a wavelength of the incident light is between 10 nm and 350 pm and the optically transparent substrate has a refractive index at the wavelength of the incident light exceeding that of the sample solution, and collecting an image that captures interference between evanescent light scattered from the single molecules and the first surface. Systems and additional methods are also provided.

20 Claims, 29 Drawing Sheets

Specification includes a Sequence Listing.

Related U.S. Application Data on Feb. 3, 2022, provisional application No. 63/249,388, filed on Sep. 28, 2021.

(51) Int. Cl.
*G02B 21/06* (2006.01)
*G02B 21/34* (2006.01)
*G01N 21/17* (2006.01)

(52) U.S. Cl.
CPC .................. *G01N 2021/177* (2013.01); *G01N 2021/1789* (2013.01)

(56) References Cited

U.S. PATENT DOCUMENTS

| | | | | |
|---|---|---|---|---|
| 5,599,668 | A * | 2/1997 | Stimpson | G01N 21/47 |
| | | | | 435/7.1 |
| 5,832,165 | A * | 11/1998 | Reichert | G01N 21/05 |
| | | | | 385/12 |
| 9,772,272 | B2 * | 9/2017 | Evers | G01N 27/745 |
| 12,055,489 | B2 * | 8/2024 | Bolton | G02B 21/367 |
| 12,072,287 | B2 * | 8/2024 | Kukura | G02B 21/002 |
| 2006/0001885 | A1 * | 1/2006 | Hertzsch | G01N 21/47 |
| | | | | 356/446 |
| 2006/0005615 | A1 * | 1/2006 | Ducker | G01Q 20/02 |
| | | | | 850/15 |
| 2007/0281315 | A1 * | 12/2007 | Takahashi | G01N 21/6452 |
| | | | | 435/6.12 |
| 2010/0053610 | A1 * | 3/2010 | Lee | G01N 21/554 |
| | | | | 427/164 |
| 2011/0026030 | A1 * | 2/2011 | Schleipen | G01N 21/41 |
| | | | | 356/432 |
| 2013/0168536 | A1 * | 7/2013 | Guo | G02B 1/005 |
| | | | | 977/700 |
| 2014/0209683 | A1 * | 7/2014 | Schultz | B82Y 30/00 |
| | | | | 235/494 |
| 2017/0261502 | A1 * | 9/2017 | Karlsson | G01N 33/54373 |
| 2018/0356341 | A1 * | 12/2018 | Muldoon | G01N 33/146 |
| 2020/0096472 | A1 * | 3/2020 | Tao | G01N 33/54353 |
| 2020/0124977 | A1 * | 4/2020 | D'Achard Van Enschut | G03F 7/7065 |
| 2022/0276174 | A1 * | 9/2022 | Unlu | G01N 21/45 |
| 2022/0397573 | A1 * | 12/2022 | Blickenstorfer | G01N 33/54373 |
| 2023/0010628 | A1 * | 1/2023 | Van Dorpe | G03H 1/0866 |
| 2023/0093989 | A1 * | 3/2023 | Mahajan | G01J 3/433 |
| | | | | 356/437 |
| 2023/0112565 | A1 * | 4/2023 | Tao | B01L 3/502761 |
| | | | | 436/86 |
| 2023/0324311 | A1 * | 10/2023 | Brown | G01N 21/95 |
| | | | | 356/446 |
| 2023/0384311 | A1 * | 11/2023 | Wang | G01N 33/54386 |
| 2023/0408409 | A1 * | 12/2023 | Wang | G01N 21/51 |
| 2024/0118200 | A1 * | 4/2024 | Wang | G01N 33/542 |

FOREIGN PATENT DOCUMENTS

| | | | | |
|---|---|---|---|---|
| CN | 115427809 A | | 12/2022 | |
| JP | 2009244270 A | * | 10/2009 | ............ G01N 21/47 |
| JP | 2021507235 A | * | 2/2021 | ............ G01N 21/648 |
| KR | 102440808 B1 | * | 9/2022 | ............ G02B 27/28 |
| WO | 2021163581 A1 | | 8/2021 | |

OTHER PUBLICATIONS

Zhang et al., Evanescent scattering imaging of single protein binding kinetics and DNA conformation changes, Nature Communications, Apr. 28, 2022, 10 pages.

* cited by examiner

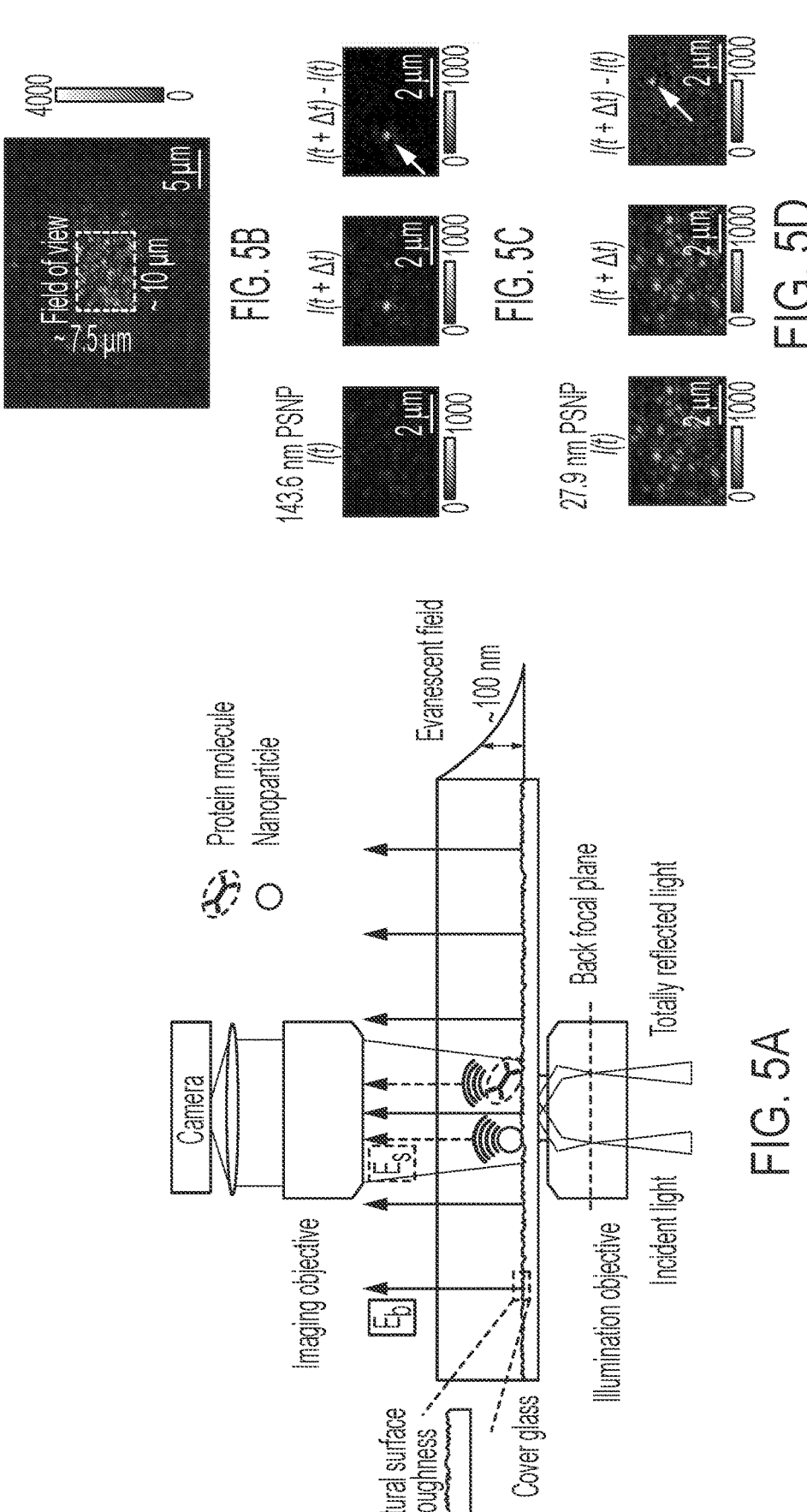

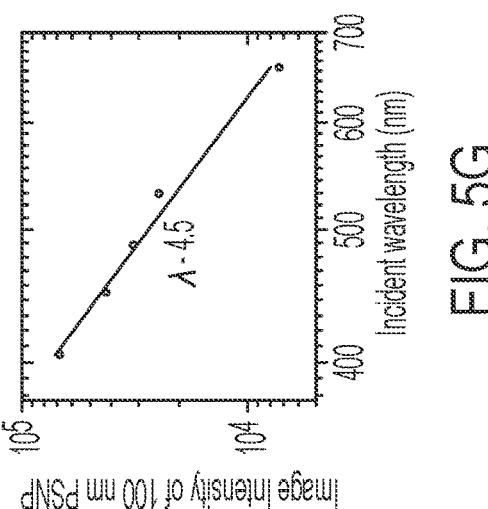
FIG. 5G
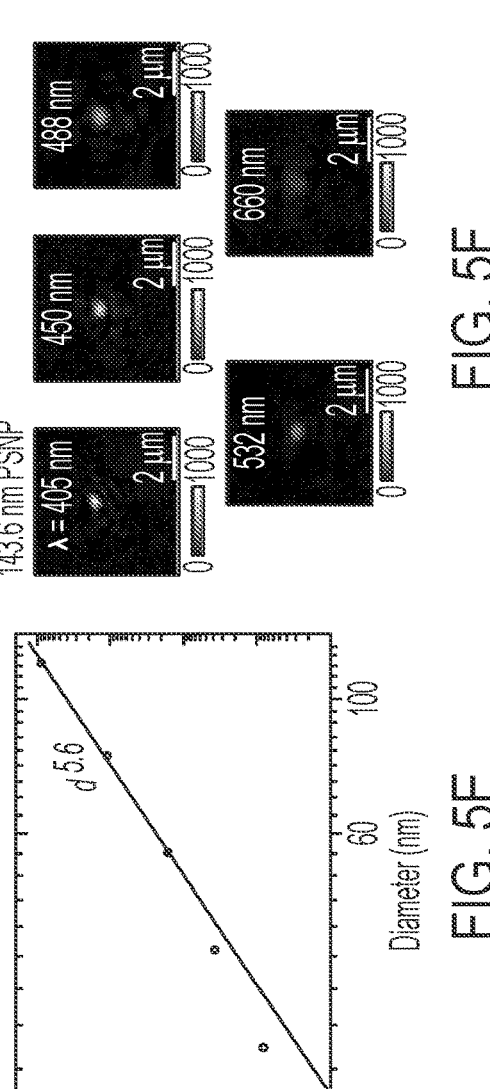
FIG. 5F
FIG. 5E

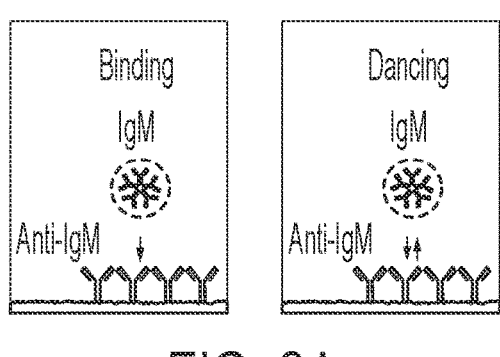
FIG. 8A
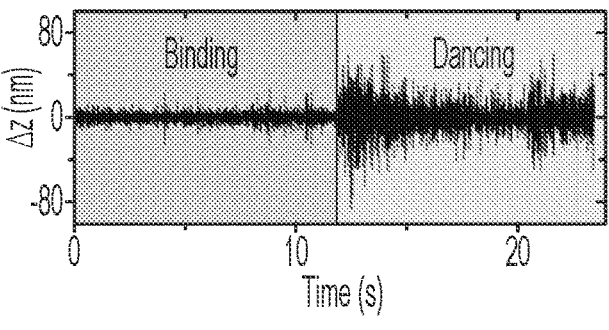
FIG. 8B
FIG. 8C
FIG. 8D

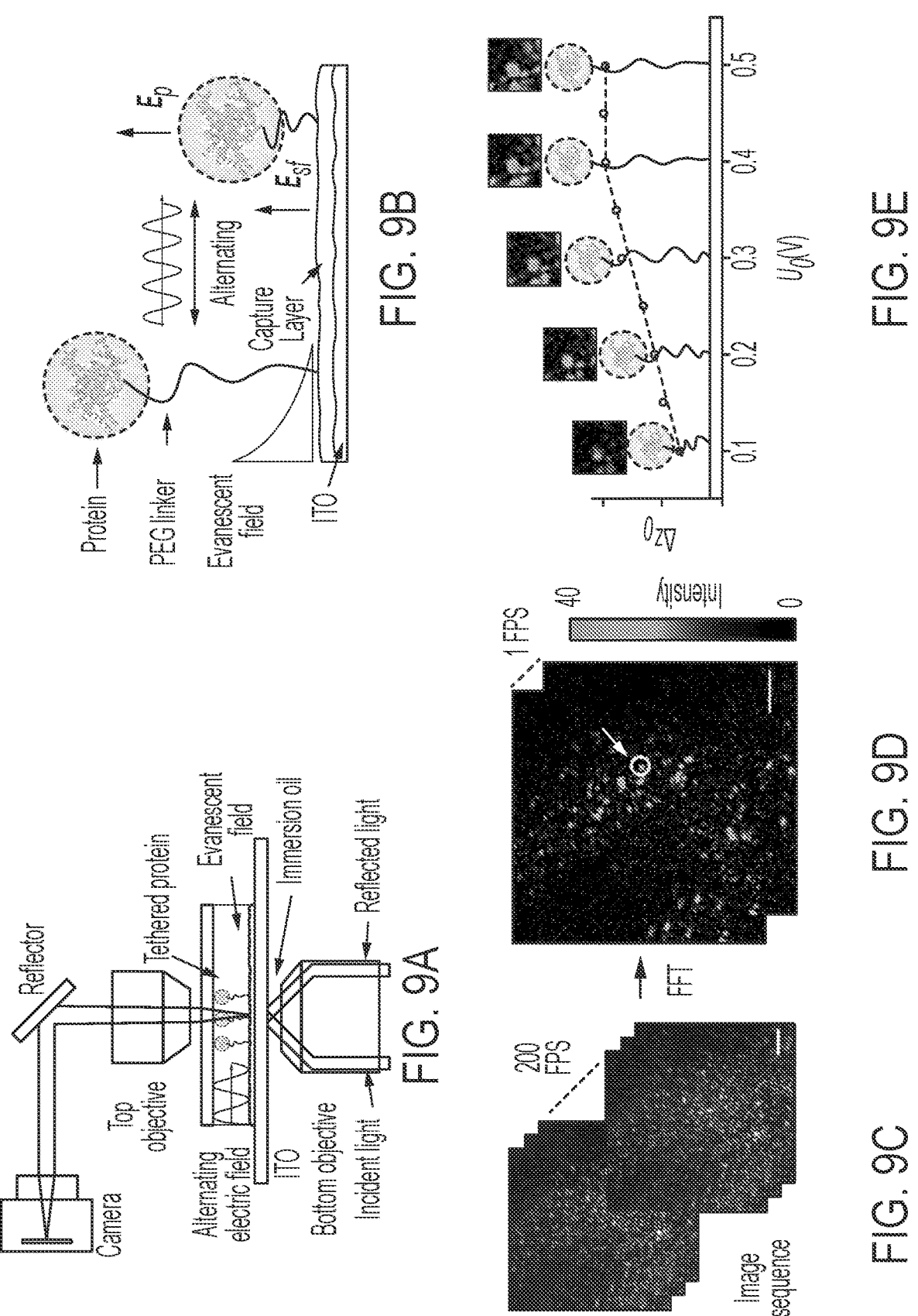

FIG. 11B                  FIG. 11C

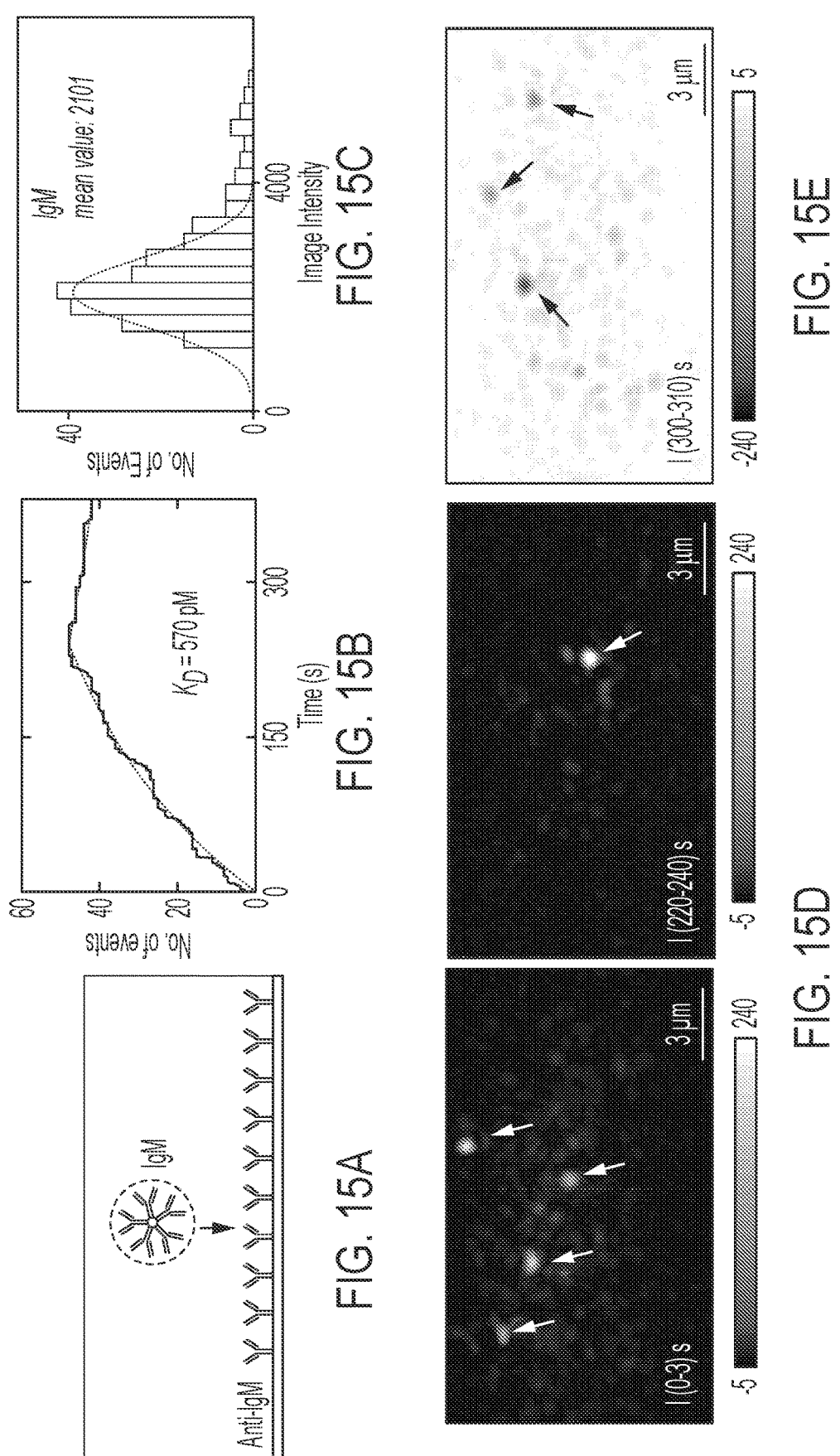

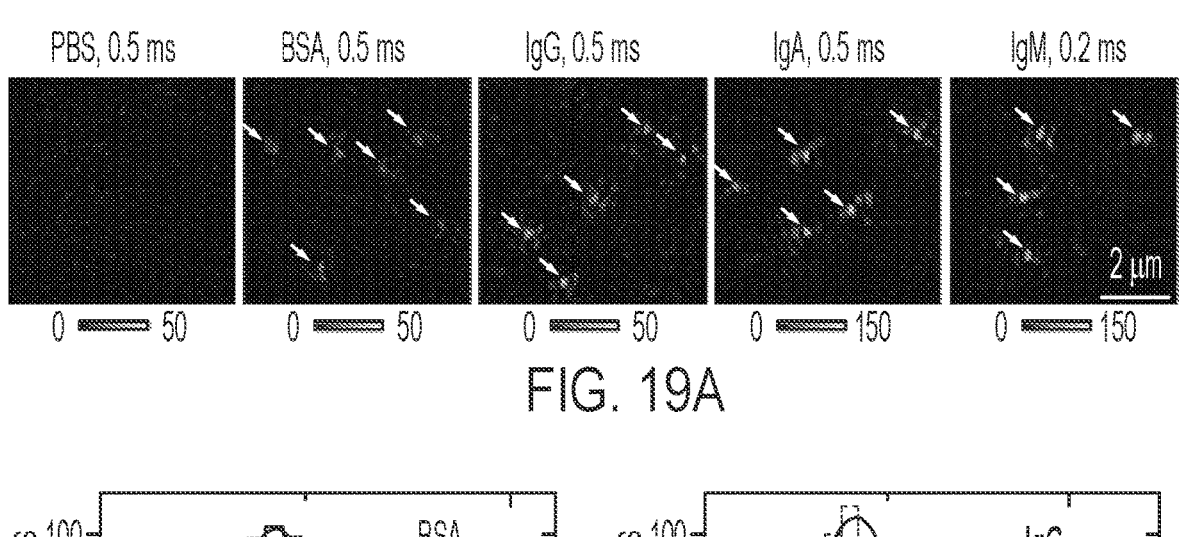
FIG. 19A
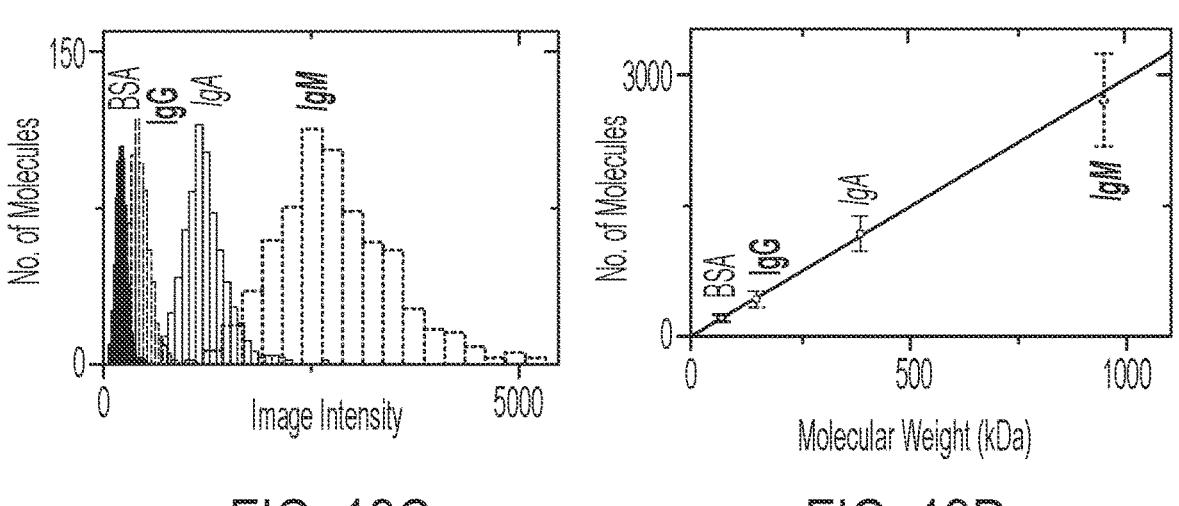
FIG. 19B
FIG. 19C          FIG. 19D

SEQUENCE LISTING

```
Sequence total quantity: 2
SEQ ID NO: 1            moltype = DNA   length = 27
FEATURE                 Location/Qualifiers
source                  1..27
                        mol_type = other DNA
                        organism = synthetic construct
SEQUENCE: 1
aacccctatc acgattagca ttaattt                                27

SEQ ID NO: 2            moltype = RNA   length = 23
FEATURE                 Location/Qualifiers
source                  1..23
                        mol_type = other RNA
                        organism = synthetic construct
SEQUENCE: 2
taatgctaat cgtgataggg gtt                                    23
```

EVANESCENT SCATTERING IMAGING OF SINGLE MOLECULES

CROSS-REFERENCE TO RELATED APPLICATIONS

This application is the national stage entry of International Patent Application No. PCT/US2022/077121, filed on Sep. 27, 2022, and published as WO 2023/056265 A1 on Apr. 6, 2023, which claims the benefit of U.S. Provisional Patent Application Ser. Nos. 63/249,388, filed Sep. 28, 2021, 63/349,895, filed Jun. 7, 2022, and 63/306,473, filed Feb. 3, 2022, the disclosures of which are incorporated herein by reference.

STATEMENT OF GOVERNMENT INTEREST

This invention was made with government support under R01 GM107165 awarded by the National Institutes of Health. The government has certain rights in the invention.

TECHNICAL FIELD

This invention relates to evanescent scattering imaging of single molecules.

BACKGROUND

Single-molecule detections push beyond ensemble averages and reveal the statistical distributions of molecular sizes and binding processes. Fluorescence microscopy is firstly developed and has been widely used for this purpose by shifting the detection wavelength from excitation wavelength to dramatically reduce the background for improving the signal-to-noise ratio, thus allowing single molecule imaging. Besides, the gold nanoparticles and chain polymers can also be used to increase the light-analyte interaction cross section for single molecule detection. In contrast with above-mentioned label involved techniques, the label-free single molecule detection has been developed in the past two decades for analyzing the intrinsic molecular properties, such as size and mass, along with monitoring the molecular interaction process without labels. Evanescent illumination is usually employed for label-free single molecule detection, because it can enhance light-analyte interaction and reduce background by notably reducing the illumination volume. However, specific optical structures, such as microspheres and nanomaterials, are generally needed to efficiently couple the incident light into the evanescent field. Until now, it is still challenging to employ these exquisite microspheres and nanomaterials for wide-field single-molecule imaging applications, such as parallelly monitoring the dynamic molecular binding process in different locations. Recently developed plasmonic scattering microscopy (PSM) utilizes the surface plasmonic wave propagating along the surface of the gold-coated glass slide as evanescent illumination, which notably simplified the system structure. But the plasmon field generates much heat at high incident light power, limiting its applications for detecting temperature sensitive biological molecules as well as long-term monitoring of molecular interaction processes.

Accordingly, there is a need for additional techniques for single molecule detection and analysis.

SUMMARY

As described herein, multiplexed single molecule detection and imaging can be realized on a plain glass surface by imaging the interference between the evanescent scattering light from the single molecules and from the natural roughness of the cover glass. This allows quantification of the mass of single proteins, characterization of the protein-antibody interactions at single molecule level, and analysis of the heterogeneity of single molecule binding behaviors. The diffusion properties of linker anchored single molecules can also be quantified by tracking their nanoscale motions, and a single copy of microRNA can be detected by tracking the hybridization induced motion changes. Thus, label-free single molecule detection and functional analysis with ordinary consumables for precise detection of small biological complexes is disclosed.

Evanescent scattering microscopy (ESM) and plasmonic scattering microscopy (PSM) share similar optical detection configurations and both use total internal reflected light to illuminate the sample and substrate, there are significant differences between the two methods. In particular, ESM does not require a substrate with a metal coating layer, and can use any wavelength of light, including ultraviolet, visible, and infrared (e.g., 10 nm to 350 μm). ESM can detect scattered light from a sample and from the top surface (opposite side of incident light) or bottom surface (same side as incident light) of a substrate contacted by the sample. In contrast, it is difficult to collect scattered light from a bottom surface of the substrate in PSM at least because the metal layer reflects and absorbs the scattered light. One advantage of detecting the scattered light from a bottom surface of the substrate is having an open top surface to facilitate sample delivery and manipulation, as well as for integration with other technologies (e.g., electrical/impedance measurement, or path clamp measurement).

In one aspect, the present disclosure provides a method of detecting single molecules. The method includes binding single molecules in a sample solution to a first surface (e.g., a top surface) of an optically transparent substrate, and irradiating the first surface of the substrate with an incident light having an incident angle selected to achieve total internal reflection of the incident light, thereby scattering light from the first surface and from the single molecules bound to the surface, wherein a wavelength of the incident light is between 10 nm and 350 μm and the optically transparent substrate has a refractive index at the wavelength of the incident light exceeding that of the sample solution. The method also includes collecting an image that captures interference between evanescent light scattered from the single molecules and the first surface, while avoiding collection of light reflected from the first surface.

Various optional features of the above embodiments include the following. Collecting the image comprises collecting a series of images over time. The method further comprises processing the series of images. Processing the series of images comprises: averaging images in the series of images; subtracting a previous image from each image to form a differential image sequence; and integrating the differential image sequence over time. The single molecules comprise proteins. The proteins are bound to the first surface with carboxylic groups. An intensity of the image is proportional to a molecular weight of the single molecules. The method further comprises assessing binding kinetics of the single molecules to the first surface over time. The light has a wavelength between 10 nm and 400 nm, between 200 nm and 400 nm, between 400 nm and 700 nm, between 700 nm and 1100 nm, or between 700 nm to 350 μm. The method further comprises assessing association and dissociation properties of the single molecules with respect to the first surface by digitally counting a number of the single molecules bound to the first surface over time. Collecting the image comprises capturing the interference between the evanescent light scattered from the single molecules and the first surface through an objective positioned above the first surface and through an objective positioned below a second surface of the substrate. Collecting the image comprises capturing the interference between the evanescent light scattered from the single molecules and the first surface only through an objective positioned below a second surface of the substrate. The optically transparent substrate is free of a metallic coating. The optically transparent substrate comprises a metallic coating. The single molecules are unlabeled.

In another aspect, the present disclosure provides a system comprising: a flow cell comprising an optically transparent substrate, wherein the flow cell is configured to facilitate flow of a sample solution over a first surface (e.g., a top surface) of the substrate and target molecules and the first surface is configured to bind to target molecules if present in the sample; a light source configured to irradiate the first surface with an incident light having an incident angle selected to achieve total internal reflection of the incident light, wherein a wavelength of the incident light is in a range of 10 nm and 350 μm, and the optically transparent substrate has a refractive index at the wavelength of the incident light exceeding that of the sample solution and an incident angle is selected to achieve total internal reflection of the light; at least one camera; and an optical system configured to capture interference between evanescent light scattered from the first surface and evanescent light scattered from the target molecules if preset on the first surface, while avoiding collection of light reflected from the first surface to form a series of images on the camera.

Various optional features of the above embodiments include the following. The first surface of the substrate produces scattered light for sufficient interference with the light scattered by the target molecules. A roughness of the surface is at least 0.5 nm, between 1 nm and 100 nm, or between 0.5 nm and 2 nm. The system further comprises a controller, wherein the controller is configured to: average images in the series of images; subtract a previous image from each image to form a differential image sequence; and integrate the differential image sequence over time. The first surface comprises receptors configured to bind to the target molecules, and binding and unbinding of the target molecules is detected by counting the target molecules over time and fitting with a binding model to determine kinetic constants and affinity. The system further comprises a controller, wherein the controller is configured to correct for mechanical drift. The system wherein correcting for mechanical drift comprises: identifying one or more features of the first surface; determining a drift displacement for each image; and subtracting the drift displacement from each image. The optical system comprises a prism or high numerical aperture oil immersion objective. The optical system is configured to capture the interference between the evanescent light scattered from the first surface (e.g., a top surface) and the evanescent light scattered from the target molecules if present on the first surface through an objective positioned above the first surface and through an objective positioned below a second surface (e.g., a bottom surface) of the substrate. The optical system is configured to capture the interference between the evanescent light scattered from the first surface and the evanescent light scattered from the target molecules if present on the first surface only through an objective positioned below a second surface of the substrate. The optically transparent substrate is free of a metallic coating. The optically transparent substrate comprises a metallic coating. The single molecules are unlabeled.

In yet another aspect, the present disclosure provides a method of imaging a multiplicity of components in a liquid sample. The method includes flowing the liquid sample over a first surface (e.g., a top surface) of a glass substrate of a flow cell, thereby coupling one or more of the components to the first surface, wherein the glass substrate is free of a metallic coating; directing light to the first surface at an incident angle selected to achieve total internal reflection; obtaining, over a length of time, a series of images comprising regions corresponding to light scattered by each component coupled to the first surface; and assessing, from the series of images, an intensity of the light scattered by each component coupled to the first surface as a function of time.

Various optional features of the above embodiments include the following. A peak intensity of the light scattered from each component increases with a mass of the component. The method further comprises assessing, from the series of images, a length of time each component is coupled to the first surface. The method includes obtaining, over the length of time, the series of images through an objective positioned above the first surface and through an objective positioned below a second surface of the glass substrate. The method includes obtaining, over the length of time, the series of images only through an objective positioned below a second surface of the substrate.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 5 a, Schematic of ESM imaging principle, where the evanescent field is created by total internal reflection and scattering of the evanescent waves by a particle or protein $(E_s)$ and by the glass surface $(E_b)$ is collected from the top to form an ESM image. b, Raw ESM images of a bare cover glass. The dashed frame indicates the field of view determined by the illumination area. Incident wavelength: 450 nm. Incident intensity: 60 kW cm$^{-2}$. Camera exposure time: 5 ms. c, ESM images before and after the binding of a 143.6 nm polystyrene nanoparticle (PSNP), and the corresponding differential image. Individual particle is marked with arrow. Incident wavelength: 450 nm. Incident intensity: 2 kW cm$^2$. Camera exposure time: 0.2 ms. d, ESM images before and after the binding of a 27.9 nm PSNP, and the corresponding differential image. Individual particle is marked with arrow. Incident wavelength: 450 nm. Incident intensity: 60 kW cm$^{-2}$. Camera exposure time: 1 ms. e, ESM image intensity versus particle diameter. The image intensity for each diameter was obtained from the mean value of a corresponding histogram, and normalized with an incident intensity of 60 kW cm$^{-2}$ and camera exposure time of 5 ms. The experiments were repeated three times with similar results. f, ESM images of 143.6 nm PSNP achieved with different incident wavelengths. Incident intensity: 2 kW cm$^{-2}$. Camera exposure time: 0.2 ms. g, ESM image intensity of the nanoparticle with an effective diameter of 100 nm versus incident wavelength. The image intensity was achieved from a calibration curve, and normalized with an incident intensity of 60 kW cm$^{-2}$ and camera exposure time of 5 ms.

FIG. 6 a-d, ESM images and image intensity histograms of BSA (a), IgG (b), IgA (c), and IgM (d) proteins, where the solid curves are Gaussian fittings. Individual proteins are marked with arrows. Incident wavelength: 450 nm. Incident intensity: 60 kW cm$^{-2}$. Camera exposure time: 5 ms. The ESM images of BSA, IgG, and IgA were achieved by subtracting the previous frame from each frame after averaging the raw images with a period of 50 ms. The ESM images of IgM were achieved by subtracting the previous frame from each frame without averaging. e, Box plots of image intensities measured on different proteins from FIG. 6 a-d. f, ESM image intensity versus protein diameter measured by dynamic scattering lighting, where the z-distance dependence of evanescent wave is considered. The image intensity for each diameter was obtained from the peak values of the corresponding histograms for measurement on each of the three cover glasses.

Figures 7A, 7B, 7C, 7D:
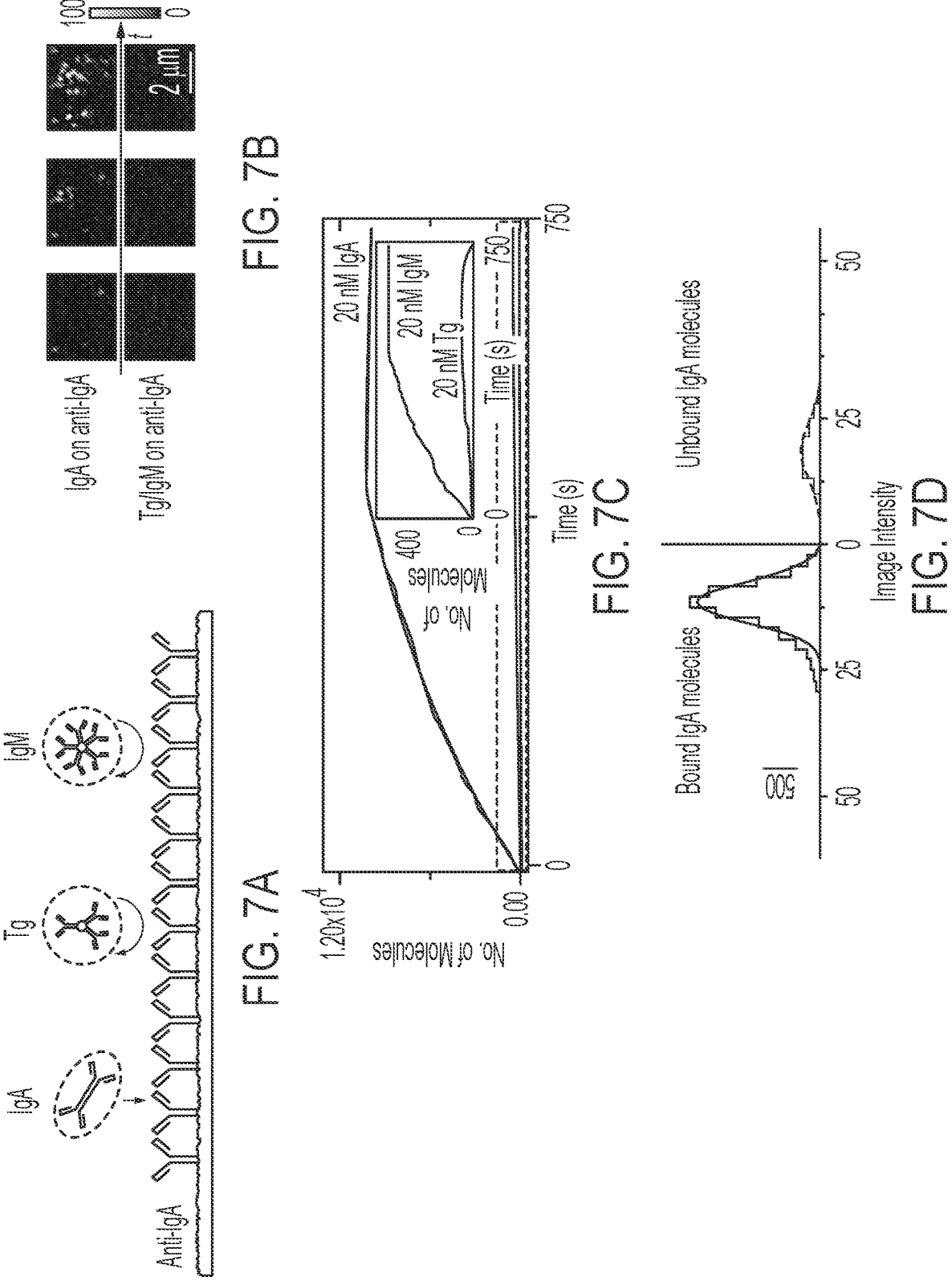

FIG. 7a, Schematic showing the behaviors of single IgA, Tg, and IgM proteins on the anti-IgA modified surface. b, ESM images showing binding of IgA to anti-IgA immobilized on the surface, and negative control experiment, exposing of IgM to anti-IgA surface. c, Kinetics of 20 nM IgA binding to anti-IgA determined by digital counting of the binding/unbinding of single IgA molecules (solid curve and dashed fitted curve), and negative control experiments exposing of Tg and IgM to anti-IgA surface. Inset is zoom in of the control experiment results. d, Image intensity histogram obtained from association, and dissociation processes of 20 nM IgA injected onto anti-IgA modified surface, where the solid lines are Gaussian fitting. e, Extracting mean radial profiles from one differential frame where one protein has been recognized to construct full-circle point spread function (PSF). f, Correcting the ESM image distortions by cross-correlating the ESM images with the full-circle PSF. g, Tracking the position of one protein binding on the sensor surface with effective frame rate of 50 fps after average and duration of 0.5 second using TrackMate. h, Localization standard deviations (STD) histograms achieved by tracking different molecules. i, Super-resolution image, showing the localized positions of the cumulative IgA binding events on anti-IgA immobilized on the surface. j, Super-resolution image, showing the localized positions of the Tg and IgM hitting events on anti-IgA immobilized on the anti-IgA immobilized on the surface. Incident wavelength: 450 nm. Incident light intensity and camera exposure time are 20 kW cm$^{-2}$ and 10 ms. The image intensity was normalized with incident light intensity of 60 kW cm$^{-2}$ and camera exposure time of 5 ms.

Figures 8E, 8F, 8G, 8H, 8I:
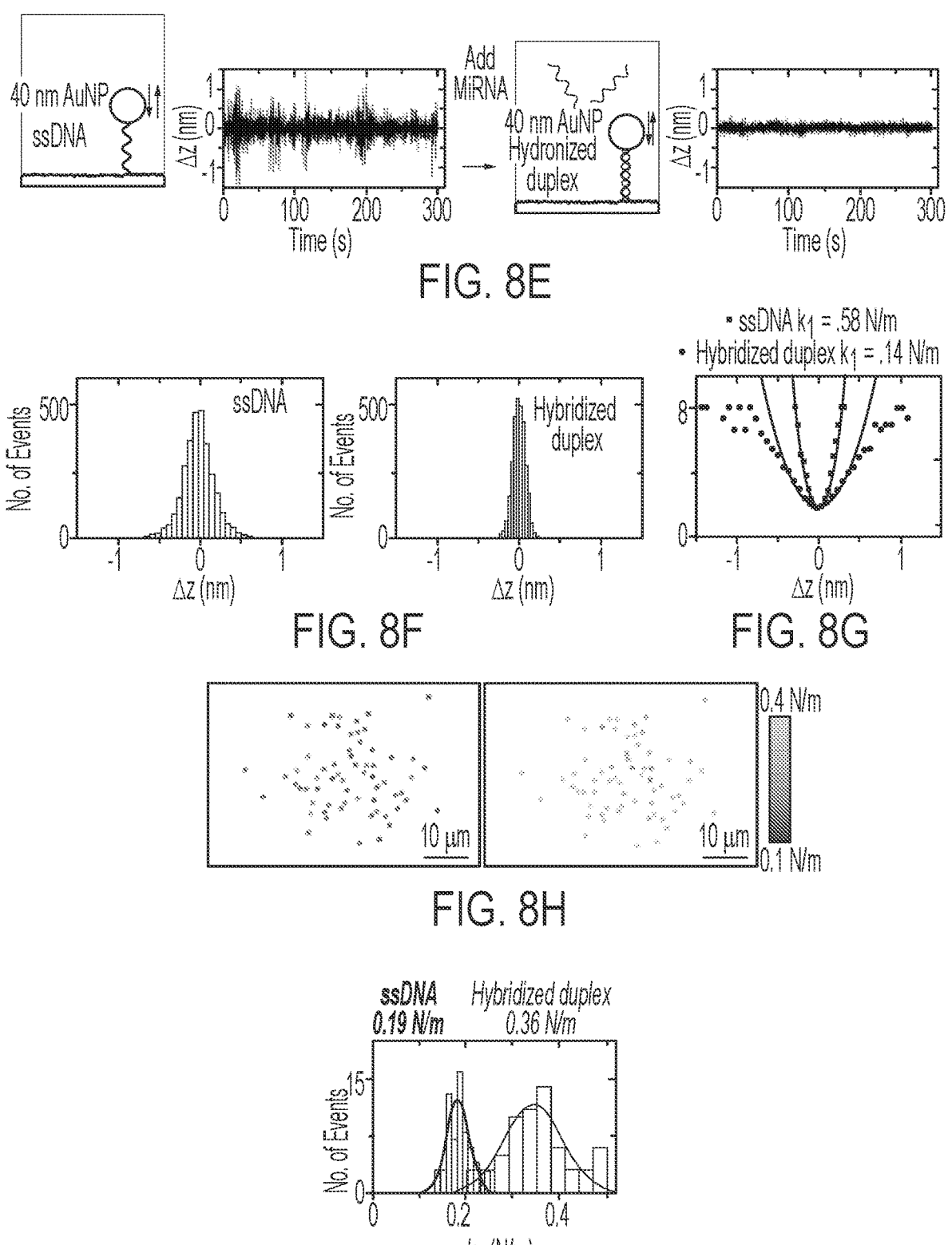

FIG. 8a, Two types of protein interaction modes on antibody modified surface: hit and stay (binding), and bind and unbind rapidly (dancing). b, Time trace of z-displacement of one IgM molecule on the anti-IgM modified surface under two protein interaction modes. c, Probability density determined from the statistical distribution of z-displacement amplitude. d, Free energy profile achieved from the probability density and fitted results with polynomial function. The effective spring constant obtained from fitting was also presented. For FIG. 8a-d, incident wavelength is 450 nm, and incident light intensity and camera exposure time are 60 kW cm$^{-2}$ and 5 ms. e, Schematic showing the structure of ssDNA anchored gold nanoparticle (AuNP) on the glass surface before and after hybridization with miRNA. Time trace of z-displacement of one nanoparticle linked by the soft ssDNA and rigid hybridized duplex structures was also presented. f, Probability density determined from the statistical distribution of z-displacement amplitude for the gold nanoparticle shown in FIG. 8e. g, Free energy profile achieved from the probability density and fitted results with polynomial function. The effective spring constant obtained from fitting was also presented. h, Effective spring constant colormap for 64 gold nanoparticles linked by ssDNA molecules on the surface before and after hybridization with miRNA. i, Effective spring constant statistical distribution for 64 gold nanoparticles linked by ssDNA molecules on the surface before and after hybridization with miRNA, where the solid curves are Gaussian fitting. For FIG. 8e-i, incident wavelength is 532 nm, and incident light intensity and camera exposure time are 2 kW cm$^{-2}$ and 0.2 ms.

FIG. 9. Imaging the size and charge of single protein using evanescent scattering microscopy (ESM). (a) Schematic of ESM and the electrochemical system. A vertical alternating electric field is applied to an ITO surface via a three-electrode configuration. A 450 nm laser is directed from the bottom objective to the ITO surface to excite the evanescent field. The scattered light from the oscillating molecules is collected by the top objective and imaged by a CMOS camera. (b) The protein molecule is tethered to the streptavidin functionalized (the capture layer) ITO surface by a PEG linker, and driven into oscillation by an alternating electric field in vertical direction. Lights scattered by protein ($E_p$) and surface roughness ($E_{sf}$) interfere with each other and eventually imaged by the camera. (c) An alternating potential with 0.5 V amplitude and 40 Hz frequency is applied to the ITO surface functionalized with tethered immunoglobulin G (IgG). An image sequence is recorded at 200 frames per second (FPS). (d) By performing temporal fast Fourier transform (FFT) to every 1 s images in the image sequence, an FFT image sequence of 1 FPS is obtained, in which oscillating proteins showing as bright spots. The arrow marks a single IgG protein (bright spot). See Methods for details about how to identify protein oscillation from the ITO background. (e) The FFT image intensity of the marked protein is converted to oscillation amplitude (in nanometers) through a calibration (see FIG. 10). By increasing the applied potential ($U_0$), the oscillation amplitude ($\Delta z_0$) shows a linear increase in the beginning and then reaches a plateau due to the restriction from the PEG tether. The hydrodynamic diameter and charge of the protein can be determined from the plateau regime and the linear regime, respectively. Scale bars in (c) and (d), and the image size in (e) are 5 μm.

FIG. 10. Measuring the size and charge of single protein molecules. (a) Relationship between particle size and FFT image intensity. Streptavidin coated polystyrene nanoparticles (PSNP) are tethered to the ITO surface by PEG and driven into oscillation. The average temporal FFT image intensity over the plateau regime is plotted vs. particle size in log scale and fitted with a linear model. The error bar represents the PSNP size distribution (determined by DLS) in horizontal axis and FFT intensity distribution (obtained from ~300 individual particles for each size) in vertical axis, respectively. (b) FFT image intensity of immunoglobulin G (IgG) measured at 0.5V, 40 Hz. 5 individual IgG molecules and their intensity are selected as examples. FFT image intensity. Scale bar: 1 μm (c) and the corresponding oscillation amplitude (d) of the 5 IgG molecules in b at different potentials, from which the size ($D_H$) and charge (q) can be derived. (e) Measurement results of $D_H$ and q from the data in c. Histogram of $D_H$ (f) and q (g) for 293 IgG molecules are fitted with Gaussian distribution. The mean value and standard deviation are 10.4±1.4 nm in size and −6.5±1.8 e in charge, respectively. (h) Measuring the size of IgM, IgA, IgG and BSA. 256 IgM, 278 IgA, 292 IgG, and 282 BSA molecules are measured to generate the error bar. The solid curve describes the relationship between FFT image intensity and $D_H$ as obtained in (a). (i) Comparison of $D_H$, q for different proteins determined by our oscillation approach with those measured by dynamic light scattering (DLS).

Figure 11A:
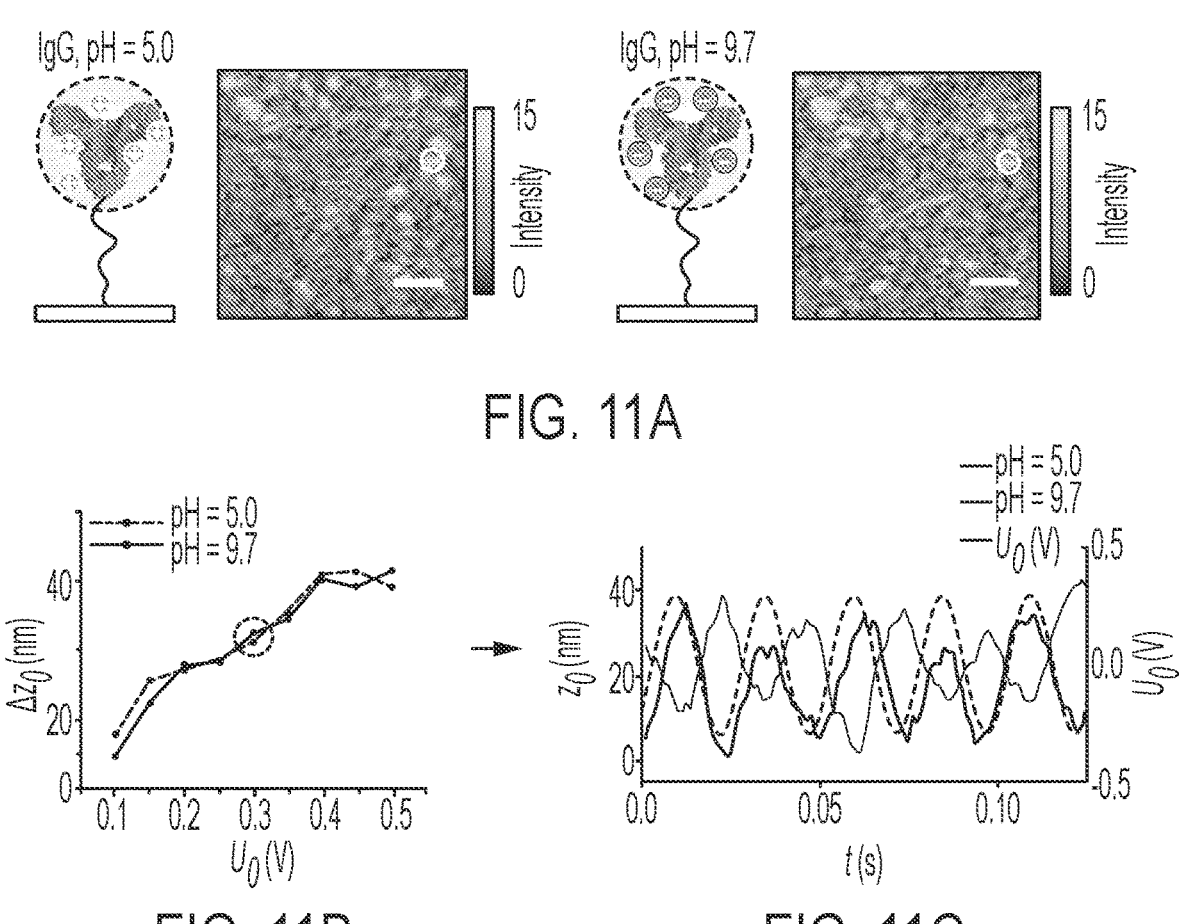
Figure 11D:
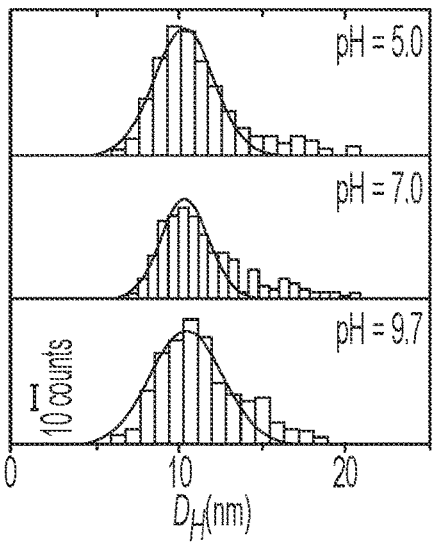
Figure 11E:
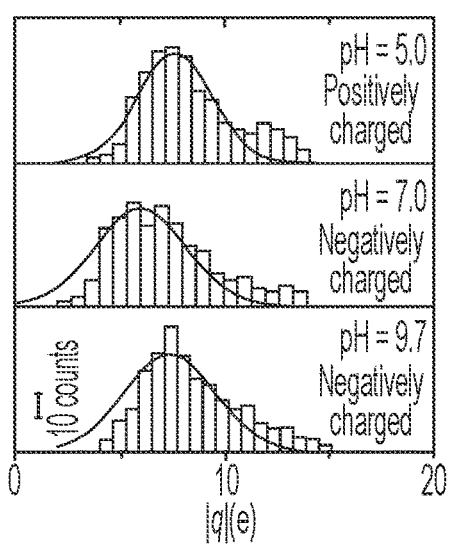

FIG. 11. Dependence of charge on pH. (a) FFT images showing the same tethered IgG (white circle) in acidic (left panel) and basic solutions (right panel). Applied potential, 0.3V at 40 Hz. The pH for the solutions were tuned to 5.0 and 9.7 respectively while maintaining the ionic strength the same as the 100 times diluted 1×PBS. Scale bar: 2 μm (b) Oscillation amplitude of the same IgG molecule at different potentials in acidic and basic solutions. The oscillation profiles at 0.3 V (circled) were plotted in c. (c) Oscillation of the IgG molecule under pH 5.0 (bold solid curve) and 9.7 (solid curve). The potential applied was 0.3 V, 40 Hz. The oscillation under pH 5.0 was in phase with the applied potential, indicating positive charge of the molecule. The phase was flipped ~180° at pH 9.7 because the charge polarity became negative. (d) and (e) Histograms of $D_H$ and q at different pH. 312, 300 and 314 IgG molecules were measured under pH 5.0, 7.0 and 9.7 respectively. The data was fitted with Gaussian distribution (solid curves). The size remains constant at different pH, but the charge amount and polarity were changed by pH.

FIG. 12. Identification of single protein in a two-protein mixture. (a) IgA and BSA were mixed and tethered to the surface. The specific binding of anti-IgA changes both the size and charge of IgA, while those of BSA are not changed. (b) and (c) Real-time monitoring of the size and charge change in single IgA molecules upon antibody binding, 0.4V, 40 Hz potential was applied for size detection (where oscillation was within the plateau regime) and 0.2V, 40 Hz potential was applied for charge detection (where oscillation was within the linear regime). Anti-IgA was introduced at t=0 s (marked by an arrow). (d) and (e) 2D size and charge distribution of the IgA/BSA mixture before and after adding anti-IgA. 425 and 424 individual molecules were measured before (darker) and after (lighter) adding anti-IgA, respectively. Before introducing the antibody. Two domains can be found which were identified as BSA and IgA. After anti-IgA binding, a portion of the IgA domain shows a shift due to size and charge changes. The top and side panels are projection of the 2D plot showing size or charge distribution. The size distribution is fitted with two Gaussian distributions, and the full width at half maximum (FWHM) is used to identify individual BSA and IgA in the sample. (f) An example showing several IgA and BSA molecules were identified based on the size and charge, where the BSA and IgA are marked in lighter shade in white circle and darker shade in white circle. The rest of the spots in dark circles were molecules that were not identified or backgrounds that did not show clear response to the electric field.

FIG. 13. System and image processing principles. (a) The ESM schematic, incident light creates an evanescent field on the surface, and scattering light of protein ($E_s$) and glass surface ($E_b$) are collected by the top-mounted objective (not shown). (b) ESM raw image sequence. (c) Single protein image after data processing with the correct estimation of the protein binding time in (b), where the light and dark, shaded bar above the image indicate the selected time zone for the single protein analysis. The binding time is in the middle of two image stacks. The differential between averaged images from the dark zone and light zone reveals the protein binding. (d) Single protein image after data processing with the wrong estimation of the protein binding time, leading to miscalculation of image intensity. By moving-average the raw image sequence with single frame steps, a protein binding event obtained from the differential of the two averaged images will have an intensity profile that firstly increases and then decreases (e, f), arrows in the (f) correspond to the images in the (e) with the same color.

FIG. 14. System calibration. (a-c) IgG, IgA, and IgM images (after image processing) and intensity histogram. Arrows indicate the binding spots. The dashed curve is the Gaussian fitting. (d) ESM intensity versus protein mass. The image intensities are obtained from the histograms of each protein in (b-d). The error bars indicate the standard deviation of Gaussian fitting.

FIG. 15. Analysis of IgM binding to anti-IgM on the surface. (a) Schematic of the experiment. (b) Accumulated counts of bound IgM molecules (black line) and first-order binding kinetic fitting (dashed line). (c) Histogram of IgM binding intensity. Gaussian fitting (dashed curve) shows the distribution and mean intensity. The histogram is obtained from 3 experiments. (d) Differential images show IgM binds to the surface at two different times. Arrows point to binding IgM spots. (e) IgM unbinds from the surface. Arrows point to unbinding spots.

FIG. 16. Detection of anti-IgA and IgA interaction in the free solution through surface nonspecific bindings. (a) Schematic of nonspecific binding of anti-IgA, IgA and their binding complex, the surface is modified with BSA. (b) Protein binding image of anti-IgA (dashed arrow), IgA (solid arrow), and complex (dashed dot arrow) at different times. Histograms of the first minute (c) and the third minute (d) protein counts accumulated in one minute. Gaussian fitting curves correspond with those in (b). (e) IgA monomer ratio ($X_{IgA}$) as the function of time, the solid line is the exponential decay fitting result. Each data point is the ratio in a one-minute time window and separated by five seconds.

FIG. 17. Parallel binding kinetics analysis of anti-IgA, IgA, anti-IgM, and IgM. (a) Schematic of protein binding onto the surface. Anti-IgA, IgA, and their complex bind to the surface nonspecifically. IgM bind to the surface specifically. (b) Count-based anti-IgM and IgM binding interaction measurement, the dashed curve is the fitting result. (c) The solid line is the monomer decay fitting result of anti-IgA and IgA interaction measurement. (d) IgA (solid arrow), complex (dashed dot arrow), and IgM (dashed arrow) bind to the surface at different times. (e) IgM unbinds from the surface. Arrows indicate the unbinding spots.

FIG. 18. Setup and principle of single-objective ESM. A; Simplified sketch of the optical setup, where evanescent waves are excited on the surface of ITO coated coverslip using total internal reflection configuration. Scattering of the evanescent waves by a protein ($E_s$) and by the ITO surface ($E_b$) is collected from the bottom. One blocker with a diameter of 4 mm is employed to stop the reflection beam to avoid overexposure. B; Raw image captured by the camera. The system field of view was marked with a dashed square. C; ESM image of one IgG protein molecule after removing $E_b$. D; Profiles of marked lines in C. Incident light intensity, 150 kW cm$^{-2}$; camera exposure time, 0.5 ms.

FIG. 19. Imaging single proteins with single-objective ESM. A; ESM imaging of BSA, IgG, IgA, and IgM protein molecules binding on the surface. The white arrows indicate the binding sites. The ESM image achieved by flowing PBS buffer was presented as control. B; Image intensity histograms, where the solid lines are Gaussian fittings, of BSA, IgG, IgA, and IgM proteins by counting the individual protein binding events. C; Image intensity histograms of BSA, IgG, IgA, and IgM proteins in the same scale. D; ESM image intensity versus molecular weight. The image intensity at the center of error bar for each molecular weight is the mean value of the corresponding histograms in B. The error bars indicate the full width at half maximum of the Gaussian fitting of corresponding histograms. Incident light intensity, 150 kW cm$^{-2}$. Camera exposure time is 0.5 ms for BSA, IgG, and IgA, and 0.2 ms for IgM.

FIG. 20. Identifying single proteins with single-objective ESM. A; Integrated ESM snapshots showing binding of BSA to anti-BSA immobilized on the surface. B; Molecular weight histogram of BSA molecules, where the solid lines are Gaussian fitting. C; Negative control experiment, exposing of IgA to anti-BSA surface. Incident light intensity, 150 kW cm$^{-2}$; camera exposure time, 0.5 ms.

FIG. 21. Single-molecule measurement of binding kinetics with single-objective ESM. A; Kinetics of 5 nM IgA binding to anti-IgA determined by digitally counting the binding/unbinding of single molecules. B; Molecular weight histograms of binding and unbinding of individual IgA molecules, where the solid lines are Gaussian fittings. The mean values of the histograms are presented in the figure. C; One snapshot of IgA binding on the surface, and super-resolution localization determined by two-dimensional fitting in the horizontal and vertical directions. The localization precision is estimated with the standard deviation (STD) of the IgA binding positions determined at different times. D; Super-resolution image, showing the localized positions of the individual IgA binding to anti-IgA measured in A. E; Statistics of localized positions of the individual IgA binding to anti-IgA in horizontal and vertical directions shown in D. Incident light intensity, 150 kW cm$^{-2}$; camera exposure time, 0.5 ms

DEFINITIONS

In order for the present disclosure to be more readily understood, certain terms are first defined below. Additional definitions for the following terms and other terms may be set forth throughout the specification. If a definition of a term set forth below is inconsistent with a definition in an application or patent that is incorporated by reference, the definition set forth in this application should be used to understand the meaning of the term.

As used in this specification and the appended claims, the singular forms "a," "an," and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

It is also to be understood that the terminology used herein is for the purpose of describing particular embodiments only and is not intended to be limiting. Further, unless defined otherwise, all technical and scientific terms used herein have the same meaning as commonly understood by one of ordinary skill in the art to which this disclosure pertains. In describing and claiming the methods, systems, and computer readable media, the following terminology, and grammatical variants thereof, will be used in accordance with the definitions set forth below.

About: As used herein, "about" or "approximately" or "substantially" as applied to one or more values or elements of interest, refers to a value or element that is similar to a stated reference value or element. In certain embodiments, the term "about" or "approximately" or "substantially" refers to a range of values or elements that falls within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value or element unless otherwise stated or otherwise evident from the context (except where such number would exceed 100% of a possible value or element).

Antibody: As used herein, the term "antibody" refers to an immunoglobulin or an antigen-binding domain thereof. The term includes but is not limited to polyclonal, monoclonal, monospecific, polyspecific, non-specific, humanized, human, canonized, canine, felinized, feline, single-chain, chimeric, synthetic, recombinant, hybrid, mutated, grafted, and in vitro generated antibodies. The antibody can include a constant region, or a portion thereof, such as the kappa, lambda, alpha, gamma, delta, epsilon and mu constant region genes. For example, heavy chain constant regions of the various isotypes can be used, including: IgG$_1$, IgG$_2$, IgG$_3$, IgG$_4$, IgM, IgA$_1$, IgA$_2$, IgD, and IgE. By way of example, the light chain constant region can be kappa or lambda. The term "monoclonal antibody" refers to an antibody that displays a single binding specificity and affinity for a particular target, e.g., epitope.

Protein: As used herein, "protein" or "polypeptide" refers to a polymer of at least two amino acids attached to one another by a peptide bond. Examples of proteins include enzymes, hormones, antibodies, and fragments thereof.

DETAILED DESCRIPTION

This disclosure describes systems and methods for evanescent scattering microscopy, (ESM) on plain glass surfaces with a total internal reflection (TIR) configuration by imaging the interference between the evanescent scattering light from the single molecules and from the natural roughness of the cover glass. An ESM system is calibrated with proteins of different molecular weights and used to analyze molecular binding kinetics and explore the heterogeneity of single protein behaviors during the molecular interaction process. Unlike other evanescent imaging systems ESM provides high resolution images by reducing or eliminating parabolic tails, thus allowing precise tracking of nanoscale single molecule motions. This feature can be used to analyze diffusion properties of linker-anchored single protein molecules, which can be used for reagent-less biosensing, nano oscillators, and creating nanometer-scale spaces near the surface.

ESM allows the use of short incident wavelength for larger single molecule scattering cross section and high incident light intensity without significant heating effect, thus achieving ~8 times lower detection limit than other plasmonic scattering imaging approaches. ESM can quantitatively analyze the heterogeneity of single molecule binding behaviors, providing an approach for understanding molecular interaction characteristics. In addition, ESM can be used to track the nanoscale motion of proteins anchored by molecular linkers to quantify the heterogeneity of linkers. This allows analysis of the heterogeneity of motion behaviors of proteins linked by chain molecules. The cover glass has no plasmonic quenching effect and good optical clearance, so the ESM can be integrated with fluorescence imaging for multiplexed detection.

ESM systems for single molecule imaging described herein are based on TIR. ESM image contrast arises from the interference of evanescent light scattered by an analyte and the surface roughness as plasmonic scattering microscopy (PSM), which is different from other kinds of interference imaging methods using far field light. Using the tightly localized evanescent field to enhance the light-analyte interaction, ESM and PSM can achieve the same signal-to-noise ratio with either lower incident light power or wider field of view compared with nonevanescent approaches. Compared to PSM, ESM has at least two advantages. First, the incident wavelength is more flexible for the TIR configuration of ESM, while only the red or longer incident light can excite surface plasmonic resonance (SPR) at a gold-water interface. This makes it possible to employ 450 nm incident light for ESM to achieve ~5 times larger scattering cross section than the PSM using red incident light, which can compensate the ~6 times smaller intensity enhancement of evanescent wave created by TIR than the SPR. Second, ESM is constructed on the cover glass, which absorbs less light than gold film, thus allowing the incident light intensity of up to 60 kW cm$^{-2}$ without significant heating effect. This incident intensity is ~30 times stronger than the PSM, making it possible for imaging single proteins with molecular weight down to ~50 kDa.

ESM can quantify the protein binding kinetics by digitally counting the binding of individual molecules as PSM, thus offering similar advantages over ensemble SPR. ESM and PSM measurements are generally insensitive to the bulk refractive index changes, and allow analysis of the heterogeneity of protein behaviors for a deeper understanding of molecular interaction characteristics nearby the equilibrium state. Except for these mutual advantages, ESM can provide higher image contrast than PSM because $|E_b|^2$ is smaller on a cover glass than gold film coated cover glass, thus allowing tracking the nanoscale motion of chain molecule linked proteins for several potential applications. First, ESM allows tracking the diffusion behavior of antibody labelled nanoparticles with diameter smaller than 50 nm in complex media without a molecular crowding effect. Second, ESM can be used to quantify the heterogeneity of motion behaviors of proteins linked by chain molecules with different stiffness, which are commonly used biological complexes for reagent-less biosensing and nano oscillators, for designing labelling strategies with better homogeneity. In addition, tracking biological complex motion changes caused by binding of small target molecules may allow extending the ESM detection limit beyond the mass limitation of ~19 kDa for the optical scattering measurement due at least in part to the phototoxicity and energy loss in the optical paths.

Figure 1:
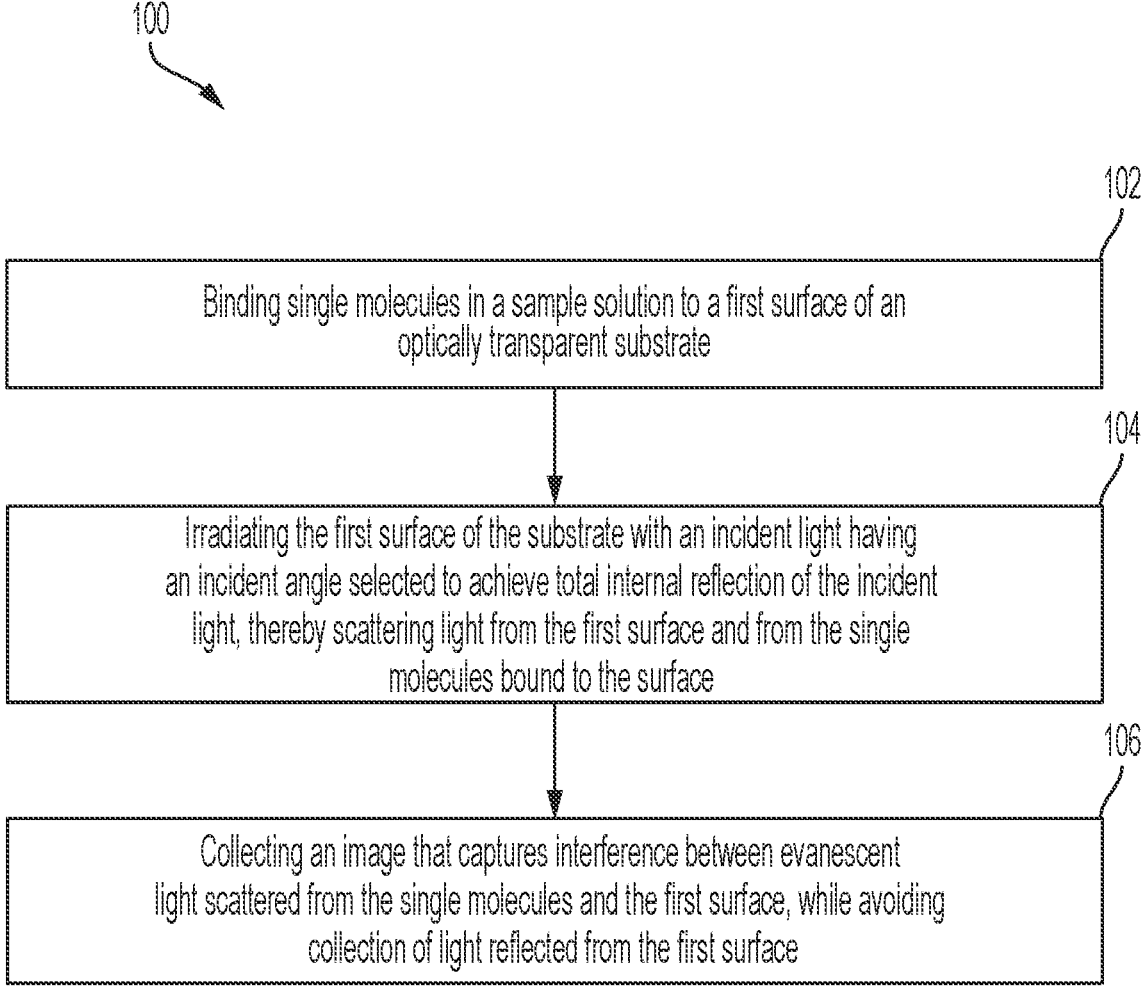
FIG. 1 is a flow chart that schematically shows exemplary method steps of detecting single molecules according to some aspects disclosed herein.

The present disclosure includes various methods of detecting single molecules. To illustrate, FIG. 1 is a flow chart that schematically shows exemplary method steps of detecting single molecules according to some aspects disclosed herein. As shown, method 100 includes binding single molecules in a sample solution to a first surface (e.g., a top surface) of an optically transparent substrate (step 102). Method 100 also includes irradiating the first surface of the substrate with an incident light having an incident angle selected to achieve total internal reflection of the incident light, thereby scattering light from the first surface and from the single molecules bound to the surface, wherein a wavelength of the incident light is between 10 nm and 350 μm and the optically transparent substrate has a refractive index at the wavelength of the incident light exceeding that of the sample solution (step 104). In addition, method 100 also includes collecting an image that captures interference between evanescent light scattered from the single molecules and the first surface, while avoiding collection of light reflected from the first surface (step 106). In some embodiments, collecting the image in step 104 includes capturing the interference between the evanescent light scattered from the single molecules and the first surface through an objective positioned above the first surface and through an objective positioned below a second surface of the substrate. In some embodiments, collecting the image in step 104 includes capturing the interference between the evanescent light scattered from the single molecules and the first surface only through an objective positioned below a second surface of the substrate. Additional methods are described herein.

Figure 2:
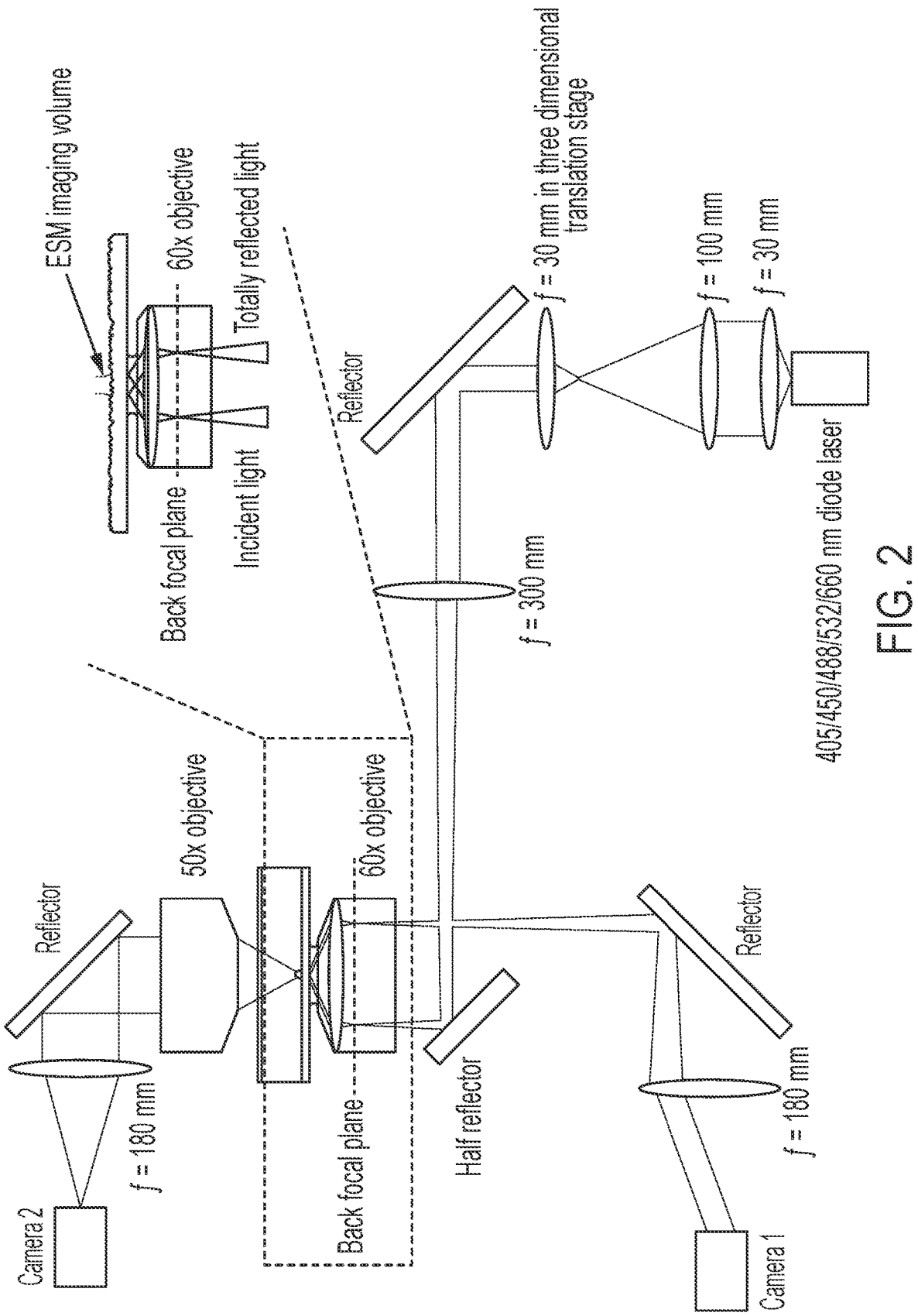
FIG. 2 is a schematic optical setup for evanescent scattering microscopy (ESM) according to an exemplary embodiment.

The methods and related systems disclosed herein utilize various optical setups. To illustrate one example, FIG. 2 is a schematic optical setup for evanescent scattering microscopy (ESM) according to an exemplary embodiment. As shown, light from the diode laser is conditioned and focused onto the back focal plane of a 60× objective (NA=1.49). Then the collimated laser beam was directed onto a cover glass mounted on the objective via refractive index match oil. Light reflected from the gold-coated glass slide is detected by camera 1 (MQ013MG-ON, XIMEA), which is equipped with an optical attenuator (ND30A, Thorlabs, Newton, NJ) to avoid overexposure. The reflection light is used to find the 60× objective focus. The incident light angle is adjusted to 650 using a three-dimensional translation stage (XR25P-K2, Thorlabs) to achieve total internal reflection (TIR). The incident light intensity is 60 kW cm$^{-2}$ or less. Light scattered from the glass surface is collected by a 50× objective (NA=0.42) and detected by camera 2 (MQ003MG-CM, XIMEA) placed on top of the samples. A thin cover glass constructed flow cell constraining ~50 μm channel height was employed for sample delivery (Nat Methods 17, 1010-1017 (2020)). An 80-mW laser diode (PL450B, Thorlabs, Newton, NJ, US) is used as the light source to provide the incident light with central wavelength at 450 nm for single protein imaging. Coherent OBIS FP 405 LX, OBIS FP 488LS, OBIS FP 532LS, and OBIS FP 660 LX lasers were used as the light source to provide the incident light with central wavelength at 405, 488, 532, and 660 nm to explore the effect of incident wavelength on image intensity.

Figure 3:
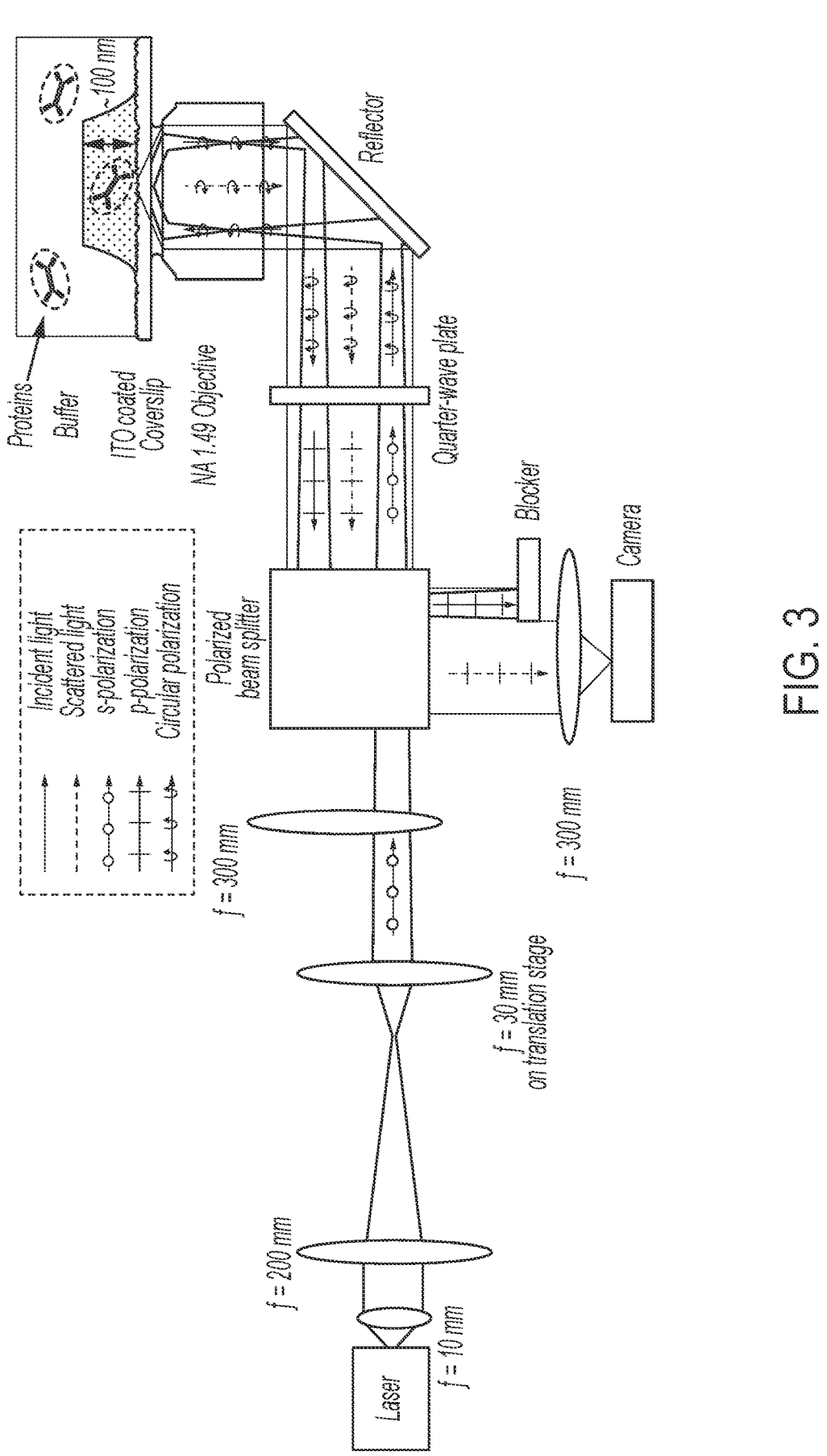
FIG. 3 is a schematic optical setup for ESM according to an exemplary embodiment.

As a further illustration, FIG. 3 is a schematic optical setup for single-objective ESM according to another exemplary embodiment. As shown, light from a laser diode with a center wavelength of 660 nm (L660P120, Thorlabs, Newton, NJ, US) is firstly collimated by a lens group with effective focal length of 10 mm. The lens group is constructed by two achromatic doublet lenses with focal length of 19 mm. The laser diode is fixed at a temperature-controlled mount (LDM56, Thorlabs), which is driven by a benchtop diode current controller (LDC205C, Thorlabs) and a temperature controller (TED200C, Thorlabs). Then, the light is conditioned again by a lens group constructed by two achromatic doublet lenses with focal length of 200 mm and 30 mm, respectively. The lens with focal length of 30 mm is placed in a manual three-dimensional translation stage (XR25P-K2, Thorlabs) for adjusting the incident angle beyond the incident angle. Then, the light is focused to the back focal plane of a ×60 objective (Olympus APO N 60× Oil TIRF, NA 1.49) by a tube lens with focal length of 300 mm. A combination of polarization beam splitter with quarter-wave plate is employed to separate the signal light from incident light. Refection beams is blocked by a M4 screw with a diameter of 4 mm. The evanescent waves scattered by the ITO surface and proteins are collected by a camera (MQ003MG-CM, XIMEA).

Figure 4:
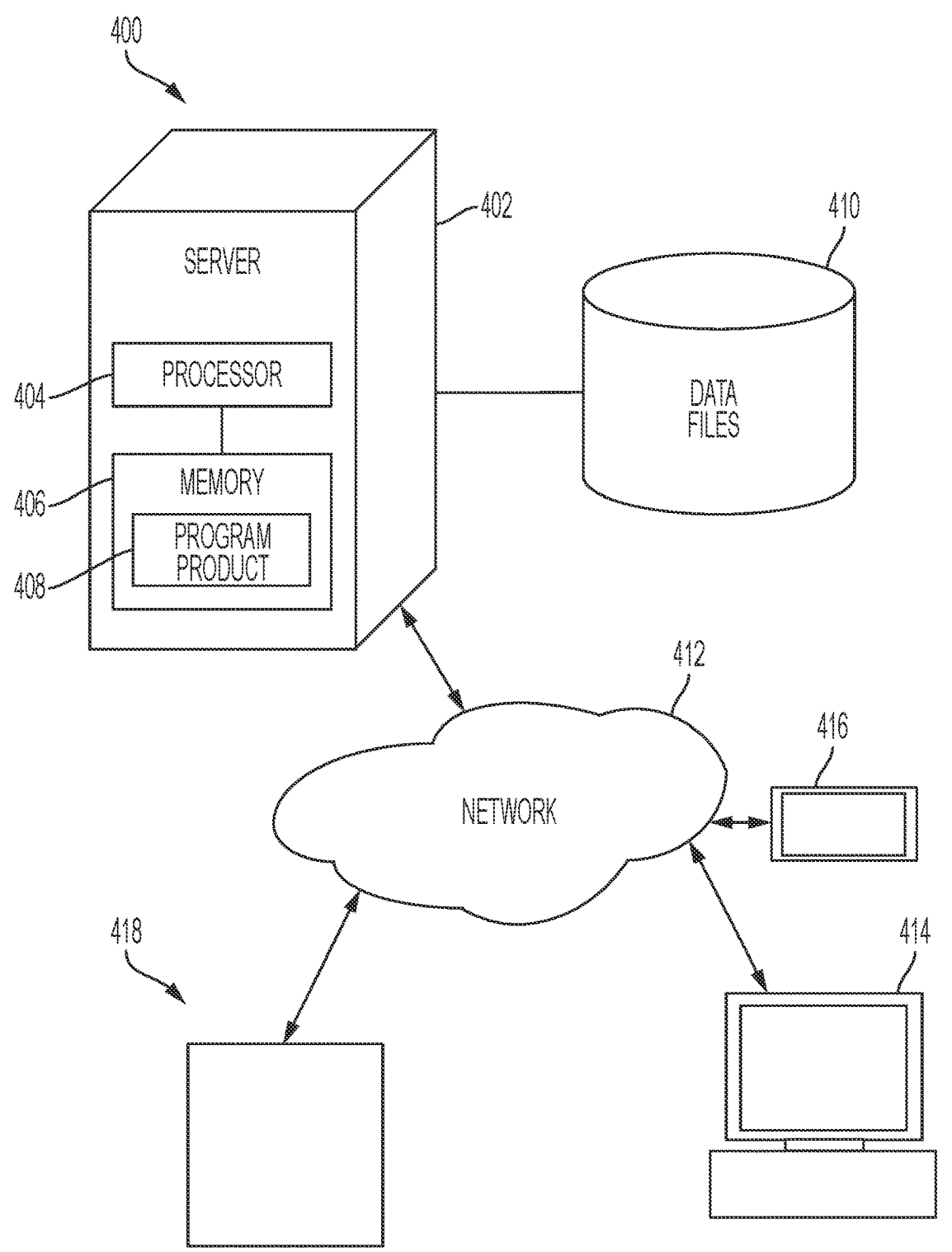
FIG. 4 is a schematic diagram of an exemplary system suitable for use with certain aspects disclosed herein.

The present disclosure also provides various systems and computer program products or machine readable media. In some aspects, for example, the methods described herein are optionally performed or facilitated at least in part using systems, distributed computing hardware and applications (e.g., cloud computing services), electronic communication networks, communication interfaces, computer program products, machine readable media, electronic storage media, software (e.g., machine-executable code or logic instructions) and/or the like. To illustrate, FIG. 4 provides a schematic diagram of an exemplary system suitable for use with implementing at least aspects of the methods disclosed in this application. As shown, system 400 includes at least one controller or computer, e.g., server 402 (e.g., a search engine server), which includes processor 404 and memory, storage device, or memory component 406, and one or more other communication devices 414, 416, (e.g., client-side computer terminals, telephones, tablets, laptops, other mobile devices, etc. (e.g., for receiving data, etc.) in communication with the remote server 402, through electronic communication network 412, such as the Internet or other internetwork. Communication devices 414, 416 typically include an electronic display (e.g., an internet enabled computer or the like) in communication with, e.g., server 402 computer over network 412 in which the electronic display comprises a user interface (e.g., a graphical user interface (GUI), a web-based user interface, and/or the like) for displaying results upon implementing the methods described herein. In certain aspects, communication networks also encompass the physical transfer of data from one location to another, for example, using a hard drive, thumb drive, or other data storage mechanism. System 400 also includes program product 408 stored on a computer or machine readable medium, such as, for example, one or more of various types of memory, such as memory 406 of server 402, that is readable by the server 402, to facilitate, for example, a guided search application or other executable by one or more other communication devices, such as 414 (schematically shown as a desktop or personal computer). In some aspects, system 400 optionally also includes at least one database server, such as, for example, server 410 associated with an online website having data stored thereon searchable either directly or through search engine server 402. System 400 optionally also includes one or more other servers positioned remotely from server 402, each of which are optionally associated with one or more database servers 410 located remotely or located local to each of the other servers. The other servers can beneficially provide service to geographically remote users and enhance geographically distributed operations.

As understood by those of ordinary skill in the art, memory 406 of the server 402 optionally includes volatile and/or nonvolatile memory including, for example, RAM, ROM, and magnetic or optical disks, among others. It is also understood by those of ordinary skill in the art that although illustrated as a single server, the illustrated configuration of server 402 is given only by way of example and that other types of servers or computers configured according to various other methodologies or architectures can also be used. Server 402 shown schematically in FIG. 4, represents a server or server cluster or server farm and is not limited to any individual physical server. The server site may be deployed as a server farm or server cluster managed by a server hosting provider. The number of servers and their architecture and configuration may be increased based on usage, demand and capacity requirements for the system 400. As also understood by those of ordinary skill in the art, other user communication devices 414, 416 in these aspects, for example, can be a laptop, desktop, tablet, personal digital assistant (PDA), cell phone, server, or other types of computers. As known and understood by those of ordinary skill in the art, network 412 can include an internet, intranet, a telecommunication network, an extranet, or world wide web of a plurality of computers/servers in communication with one or more other computers through a communication network, and/or portions of a local or other area network.

As further understood by those of ordinary skill in the art, exemplary program product or machine readable medium 408 is optionally in the form of microcode, programs, cloud computing format, routines, and/or symbolic languages that provide one or more sets of ordered operations that control the functioning of the hardware and direct its operation. Program product 408, according to an exemplary aspect, also need not reside in its entirety in volatile memory, but can be selectively loaded, as necessary, according to various methodologies as known and understood by those of ordinary skill in the art.

As further understood by those of ordinary skill in the art, the term "computer-readable medium" or "machine-readable medium" refers to any medium that participates in providing instructions to a processor for execution. To illustrate, the term "computer-readable medium" or "machine-readable medium" encompasses distribution media, cloud computing formats, intermediate storage media, execution memory of a computer, and any other medium or device capable of storing program product 408 implementing the functionality or processes of various aspects of the present disclosure, for example, for reading by a computer. A "computer-readable medium" or "machine-readable medium" may take many forms, including but not limited to, non-volatile media, volatile media, and transmission media. Non-volatile media includes, for example, optical or magnetic disks. Volatile media includes dynamic memory, such as the main memory of a given system. Transmission media includes coaxial cables, copper wire and fiber optics, including the wires that comprise a bus. Transmission media can also take the form of acoustic or light waves, such as those generated during radio wave and infrared data communications, among others. Exemplary forms of computer-readable media include a floppy disk, a flexible disk, hard disk, magnetic tape, a flash drive, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave, or any other medium from which a computer can read.

Program product 408 is optionally copied from the computer-readable medium to a hard disk or a similar intermediate storage medium. When program product 408, or portions thereof, are to be run, it is optionally loaded from their distribution medium, their intermediate storage medium, or the like into the execution memory of one or more computers, configuring the computer(s) to act in accordance with the functionality or method of various aspects disclosed herein. All such operations are well known to those of ordinary skill in the art of, for example, computer systems. Typically, the detection of single molecules is obtained using device 418, which includes an optical setup for ESM as shown, for example, in FIG. 2 or 3, as exemplary embodiments.

EXAMPLES

Example 1: Evanescent Scattering Imaging of Single Molecule Binding Kinetics and Nanoscale Motion Results ESM Setup and Imaging Principles. Evanescent waves were excited by directing collimated light at an incident angle of ~65°, which is slightly larger than the critical angle of ~61.8° at BK7 optical glass-water interface, via an oil-immersion objective onto a commercial cover glass placed on the objective (FIG. 5a). The incident angle was fixed in all experiments to ensure stable penetration depth of evanescent field. Traditional microscopic TIR imaging records the reflection beam for extinction spectral analysis or local refractive index sensing, but the strong total reflection light limits the maximum incident light intensity, making it challenging to achieve sufficient signal-to-noise ratio for single-molecule detection. In contrast, the ESM detects evanescent waves scattered by the analyte ($E_s$) using a second objective placed on top of the sample to overcome this difficulty. Unsurprisingly, we also observe the background ($E_b$) from the evanescent waves scattered by the natural surface roughness of cover glass (FIG. 5b), similar with the phenomena observed on PSM using the gold-coated glass slides. The nanometer scale surface roughness can also be revealed by atomic force microscopy. We select the cover glasses with suitable roughness profiles from the commercial batches to ensure measurement reproducibility. The ESM image intensity of an analyte can be given by $$I = |E_b + E_s|^2 = |E_b|^2 + |E_s|^2 + 2\,|E_b|\,|E_s|\cos{(\theta)}, \qquad (1)$$

where $\theta$ is the phase difference between light scattered by analyte and surface roughness. The phase difference is small because of the short distance between scattering sites of surface roughness and analyte binding positions. Besides, the phase statistics are identical within the field of view, which is determined by illumination area (FIG. 5b), because the phase difference is random in the multiple scattering regime. For analytes with large sizes, such as polystyrene nanoparticles with a diameter of 143.6 nm, the $|E_s|^2$ is much larger than $|E_b|^2$ (FIG. 5c). On the other hand, for analytes with small sizes, such as polystyrene nanoparticles with a diameter of 27.9 nm, the contribution of $2|E_b||E_s|\cos{(\theta)}$ becomes significant. Meanwhile, $|E_b|^2$ is static and can be removed in the differential images by subtracting the previous frame from each frame of raw image. In this way, the nanoparticle can be revealed in the differential image in the moment the particle attaching to the sensor surface (FIG. 5d). Note that the background in the differential image in FIG. 5d is not zero due to the shot noise. We measure the polystyrene nanoparticles with different diameters and determine the ESM image intensity by averaging the intensities of all pixels within the Airy disk. The diameter of the Airy disk was estimated to be ~1.07 μm by dividing the incident wavelength of 450 nm with the imaging objective numerical aperture of 0.42. Plotting the image intensity versus nanoparticle diameter in logarithmic scale reveals two regimes, corresponding to large and small nanoparticles (FIG. 5e), where the z-distance dependence of evanescent wave is considered. In the large nanoparticle regime (diameters>65 nm), the image intensity follows a power law of $d^{5.6}$, where the exponent is close to six. This is expected because light from the nanoparticles dominates, such that the measured image contrast scales with $|E_s|^2$ according to equation (1). However, in the small nanoparticle regime (<44 nm), the drop in image intensity with decreasing diameter slows down as predicted, because the interference term, $2|E_b||E_s|\cos{(\theta)}$ in equation (1), becomes dominant. The interference effect avoids the rapid drop of image intensity with decreasing analyte diameter, making it possible to detect the single proteins, which are typically smaller than 30 nm.

The main advantage of PSM is that the plasmonic field can provide a significant field enhancement, usually 20-30 times on the gold-water interface. At the same time, the field enhancement is only 3-5 times for the ESM based on the TIR configuration. Theoretically, PSM can provide ~6 times higher enhancement than ESM at the same excitation wavelength and power. However, we show that the ESM can overcome this limitation in two ways. First, the cover glass surface has a much lower heating effect than the gold surface, thus allowing the incident intensity up to 60 kW cm$^{-2}$, which is ~20 times higher than the commonly used incident intensity on the PSM. Second, the ESM allows employing the short incident wavelength, while the plasmonic field was hard to be excited on the gold-water interface with an incident wavelength shorter than 600 nm. The shorter wavelength can provide a larger scattering cross-section to improve the image contrast (FIG. 5f). Quantitative analysis shows that the ESM image intensity scales with $\lambda^{-4.5}$, where $\lambda$ represents the incident wavelength (FIG. 5g), agreeing with the theoretical prediction of the Rayleigh scattering model. The incident wavelength of 450 nm was used for the label-free single-molecule imaging in this study because the violet light (405 nm) may damage the surface modification under high intensity. The incident wavelength of 450 nm can provide ~5 times larger scattering cross-section than that of 670 nm, which is commonly used for PSM.

Figures 6A, 6B, 6C:
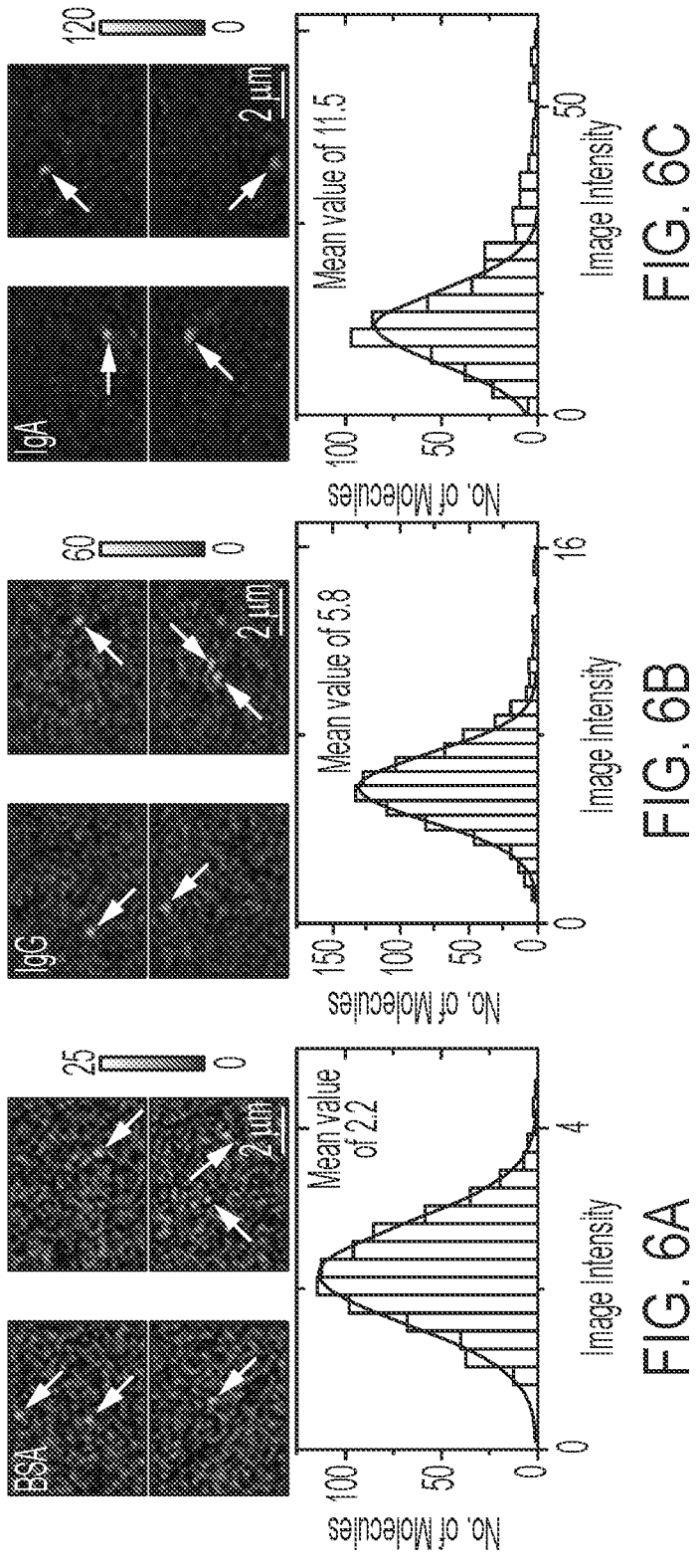
Figures 6D, 6E, 6F:
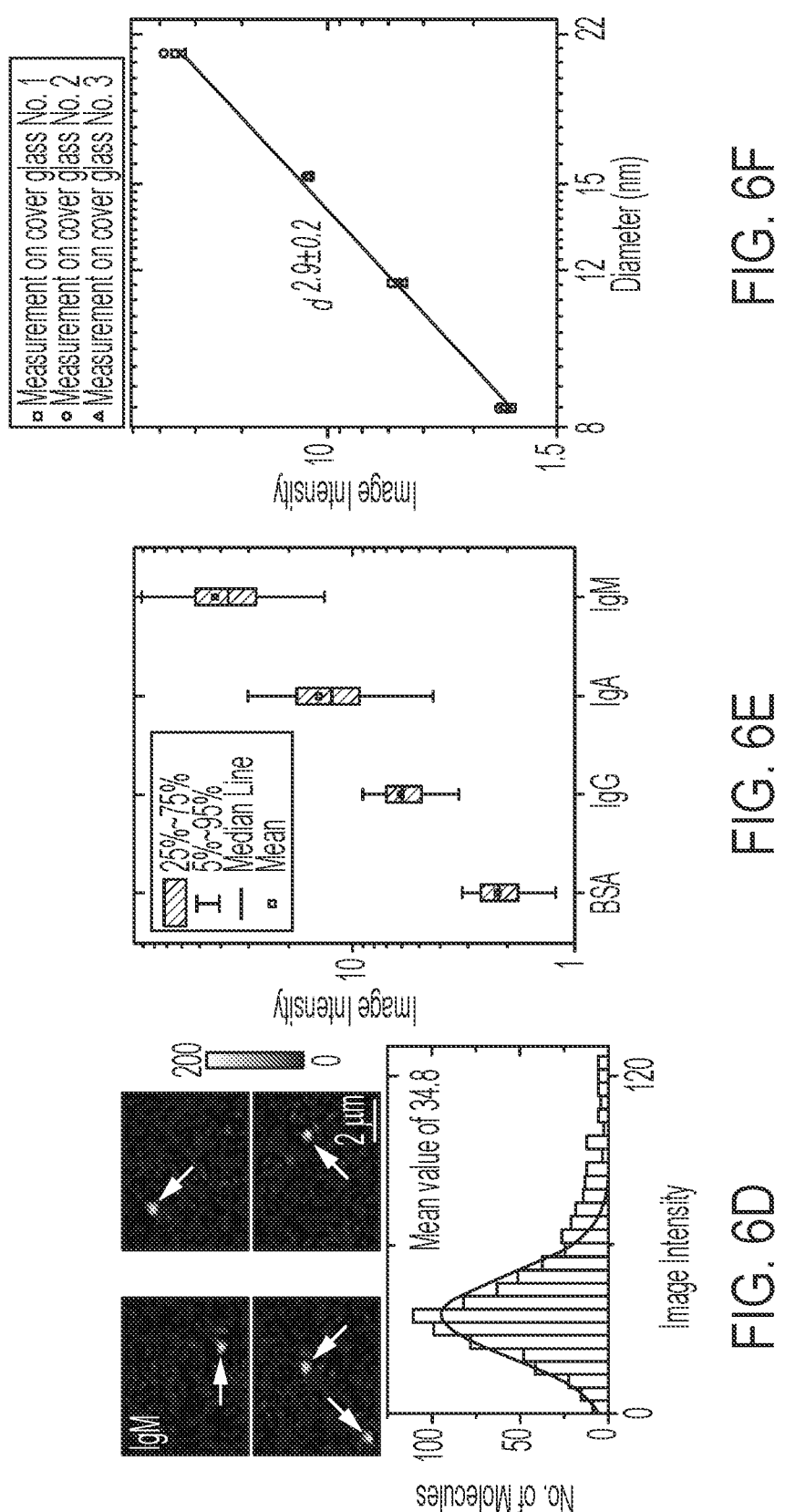

Detection of single proteins. To demonstrate the capability of ESM for label-free imaging of single proteins, we studied the detection of bovine serum albumin (BSA), mouse immunoglobulin G (IgG), human immunoglobulin A (IgA), human immunoglobulin M (IgM) with ESM (FIG. 6). The measurement was carried out by flowing each protein solution with a 5 nM concentration over the sensor surface while recording the nonspecific binding of individual proteins on the surface. The surface was modified with N-hydroxysuccinimide (NHS) to increase the binding rate (Methods). FIG. 6a shows several frames of binding events of BSA molecules, where the individual proteins are marked with arrows. We tracked and counted individual protein binding events on the differential frames over 5 mins and constructed a protein image intensity histogram (FIG. 6a). The image intensity histogram follows a Gaussian distribution, where the histogram width may result from the protein orientation heterogeneities. Increasing the protein diameter can lead to an increase in ESM image intensities. This is clearly shown by the intensity histograms of BSA, IgG, IgA, and IgM proteins, which have the hydrodynamic diameters of 8.5±2.0 nm, 11.8±1.6 nm, 15.7±2.2 nm, and 21.8±1.9 nm measured by dynamic light scattering, respectively (FIG. 6a-d). For visual comparison the relationship of protein size and the ESM image intensity, a box plot is provided in FIG. 6e. The mean ESM image intensities of these proteins were obtained by fitting the histograms with Gaussian distribution. Reproducible results were obtained for each protein in three different chips. Plotting the image intensity versus protein diameter in logarithmic scale reveals that the ESM image intensity responds to the protein diameter in a cubic power, because the interference term, $2|E_b||E_s|\cos(\theta)$ in equation (1), is dominant for single protein imaging (FIG. 6*f*). We compared the image intensities of proteins with polystyrene nanoparticles, which fall on a similar calibration curve, further supporting the results of single proteins imaging on ESM.

It is noted that minor peaks show at the position with ~two times higher intensity than the mean values in several histograms (FIG. 6). With the increase of analyte concentration, the heights of the minor peaks do not scale, and become a long tail at high protein concentrations. We also noted that two proteins may bind to the surface simultaneously at locations close to each other (FIG. 6*b*). Therefore, the small peaks/tails on the right side of the histogram are likely created by two or more molecules simultaneously falling within the same Airy disk area within a diameter of ~1 μm, which cannot be resolved by the ESM image and counted as a single event. This phenomenon is caused by the finite temporal and spatial resolution of the ESM image, the random binding of molecules to the surface, and possible non-uniform distribution of active carboxylic groups on the sensing surface. We also study the spatial distribution of the ESM image intensity, and the image intensity is slightly higher in the central illumination area than the marginal area due to the Gaussian optical characteristics of the laser beam. This makes it possible to observe smaller proteins, such as protein A molecules, in the central illumination area.

Quantification of protein-protein interactions. ESM can image single proteins, making it possible to determine the binding kinetics by digitally counting the association and dissociation of single proteins. As a demonstration, IgA binding to anti-IgA was measured by ESM (FIG. 7*a*). 20 nM IgA solution was flowed over an anti-IgA coated sensor surface to study the specific association process, then PBS buffer was flowed over the sensor surface to study the dissociation of IgA from anti-IgA. The association and dissociation processes were tracked by counting the individual IgA molecules in real time. On exposure to IgA, the specific absorption of single IgA molecules to anti-IgA took place immediately (FIG. 7*b*). Negative control experiment was performed by flowing thyroglobulin (Tg, molecular weight of 660 kDa) and IgM over the anti-IgA coated surface. Different from the specific binding of IgA to anti-IgA, the Tg and IgM proteins only transiently show up on the anti-IgA modified surface (FIG. 7*b*), and few cumulative binding events were observed (FIG. 7*c*). The binding kinetic curve can be achieved by plotting the number of cumulative IgA proteins binding to the surface versus time (FIG. 7*c*). The association ($k_{on}$) and dissociation ($k_{off}$) rate constants are determined to be $1.1 \times 10^5$ M$^{-1}$ s$^{-1}$ and $9.6 \times 10^{-5}$ s$^{-1}$, respectively. The equilibrium dissociation constant ($K_D = k_{off}/k_{on}$) is determined to be 873 pM. These values agree well with the values achieved with the ensemble SPR. The association and dissociation events of individual IgA proteins were counted to construct intensity histograms. The mean intensities by fitting the histograms with Gaussian distributions are consistent with the size of single IgA molecules, confirming the detection of single molecules (FIG. 7*d*).

Figures 7E, 7F, 7G:
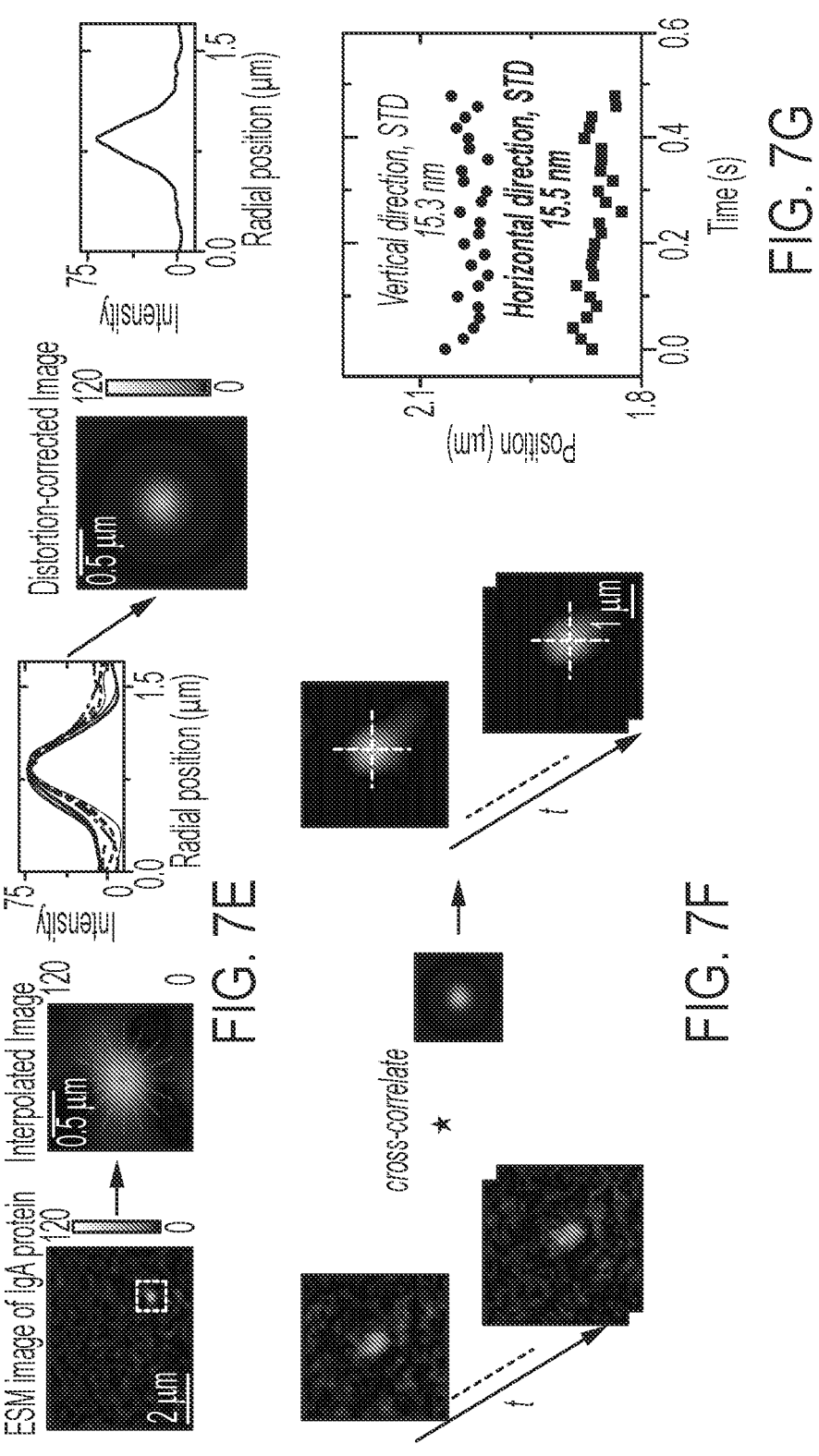
Figures 7H, 7I, 7J:
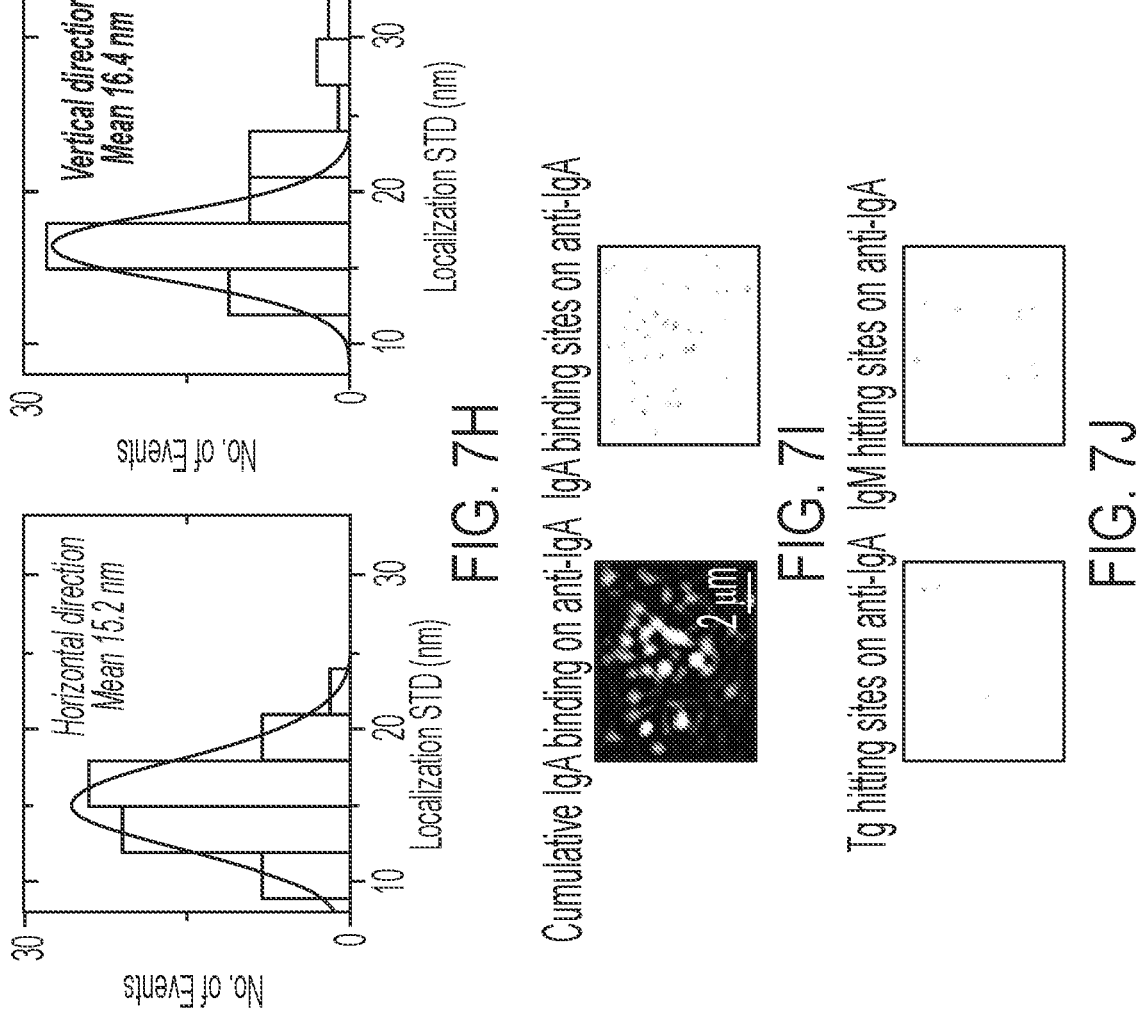

The bright spot created by the analyte in the ESM image exhibits a quasi-Airy pattern, thus allowing employing the two-dimensional Gaussian fitting, which has been widely used for single molecule binding sites localization in super-resolution fluorescence microscopy. To correct the intensity variations caused by the uneven background, the mean radial profile was computed from the radial profiles at different angles of one bright spot created by a protein on ESM image to generate the full-circle point spread function (PSF) (FIG. 7*e*). The resulting full-circle PSF was used to cross-correlate with the ESM image sequence to correct the image distortions for improving image quality (FIG. 7*f*). Then the two-dimensional Gaussian fitting was used for the super-resolution localization with TrackMate. Tracking results on one and multiple IgA molecules show that the super-resolution tracking on the corrected ESM image sequence can provide the precision of ~15 nm, which is close to the theoretical limit (FIGS. 7*g* and 7*h*). Then we can achieve the localizations of cumulative IgA, Tg, and IgM binding events on anti-IgA immobilized on surface (FIGS. 7*i* and 7*j*). These results clearly show that the specific binding events of IgA to anti-IgA are much more than the nonspecific binding events of others, further demonstrating the capability of ESM for single protein recognition.

Quantification of DNA conformation changes. After binding to the antibody, a few proteins may present distinctive behaviors rather than hitting and staying on the surface. For example, FIG. 8*a* shows an IgM molecule with repeated hitting behavior after binding on the anti-IgM modified surface, just like 'dancing'. To elucidate the underlying mechanism, we performed the statistical analysis at the single molecule level. The relation between the ESM image intensity and z-displacement is given according to the exponential distribution of evanescent field intensity (FIG. 8*b*). Analysis on the region adjacent to the IgM binding sites shows much smaller fluctuations, indicating that this z-axis movement was dominated by the IgM binding. The statistical distribution shows that the fluctuating z-displacement amplitude increased along with changing the 'binding' condition to the 'dancing' condition (FIG. 8*c*). The free energy profile, G(z) (the potential of mean force), is related to the probability density of z-displacement amplitude, and the effective spring constant $k_f$ can be obtained by fitting the free energy profiles near equilibrium (FIG. 8*d*). It can be seen that the $k_f$, reflecting the restoring force of adhesion bond, which is created by molecular binding between IgM and anti-IgM, decreases along with changing the 'binding' condition to the 'dancing' condition, indicating the different adhesion bond properties behind different molecular interaction behaviors.

With the ability to evaluate the restoring force of molecular adhesion bonds, we show that ESM can quantify the conformation changes of DNA from softy single-stranded to rigid double-stranded counterparts after hybridization. This provides a solution for detecting the miRNA molecules, which are challenging to be detected by conventional label-free measurement approaches with practical detection limits for measuring BSA or larger biological macromolecules. We firstly flow 40 nm gold nanoparticles to the surface with the single-stranded DNA (ssDNA) immobilized to construct the detection system for miRNA measurement (FIG. 8*e*). The incident wavelength was changed from 450 nm to 532 nm to enhance the scattering via exciting the localized SPR, making the measurement independent of the background created by surface roughness scattering. Then the PBS buffer was flowed over the surface to flush away weakly absorbed nanoparticles, and the z-axis fluctuations of ssDNA linked nanoparticles were monitored in the PBS flow. Next, the complementary miRNA solution was flowed onto the surface for hybridization with ssDNA to construct rigid duplex structure. After flushing away the extra miRNA with PBS, the measurement on one rigid duplex structure linked gold nanoparticle in the PBS flow shows that its z-axis fluctuations were obviously smaller than those on ssDNA (FIGS. 8e and 8f). Moreover, the statistical analysis quantitatively shows that the restoring force was increased by ~4 folds due to the DNA conformation changes (FIG. 8g). The clearly decreasing of z-axis fluctuations after hybridization could be explained by the increasing restoring force after rigid duplex structure formation. To make our analysis more convincing, more gold nanoparticles linked by ssDNA immobilized on another cover glass were tracked and analyzed. Both spatial distribution and statistical analysis show that their $k_f$ increases after hybridization with miRNA (FIGS. 8h and 8i). The measurement results can be repeated on different cover glasses. The background analysis also indicates that the nanoparticle z-displacement variations should be induced by the thermal fluctuations of adhesion bonds, rather than the molecular diffusion or experimental conditions. These results demonstrate that ESM can perform miRNA detection by monitoring the change in z-axis fluctuations of nanoparticles, caused by hybridization-related conformation change.

Discussion

We developed ESM for single molecule imaging based on TIR, which is an ancient method but still being developed for new applications. In contrast with far field interference imaging methods, ESM has image contrast arising from the interference of evanescent light scattered by an analyte and the surface roughness, a principle has been proposed for PSM. As a result, both ESM and PSM can achieve comparable signal-to-noise ratio with either lower incident light power or wider field of view than conventional nonevanescent approaches. Compared to PSM, ESM shows two advantages. First, the choice of incident wavelength is more flexible for the ESM owing to the TIR configuration, while only the red or longer incident light can excite SPR at gold-water interface on PSM. This makes it possible to employ 450 nm as incident light for ESM, achieving ~5 times larger scattering cross section than that of PSM using red incident light. This advantage makes TIR to achieve comparable evanescent wave scattering intensity with PSM, which is usually ~6 times larger than former under the same incident intensity. Second, ESM is constructed on the cover glass, which absorbs fewer lights than gold film, thus allowing the incident light intensity of up to 60 kW cm$^{-2}$ without significant heating effect. This incident intensity is ~20 times stronger than the upper-limit incident intensity of PSM. While PSM can only image large proteins as small as IgG (150 kDa) limited by the heating effect, ESM can reliably imaging medium sized single proteins as small as the BSA (66 kDa), which is usually considered as the practical measurement limit for label-free single-molecule detection technologies. Therefore, ESM can measure a much wider range of proteins compared to PSM.

In addition, one approach was presented for the lateral super-resolution localization of protein binding sites in ESM image. The intensity fluctuations resulting from the nonuniform background was corrected, and the binding sites of different proteins on the antibody modified surface were localized. The super resolution image shows the protein binding positions with high precision, which clearly reveals the interaction frequency difference between specific and nonspecific binding events. This super-resolution localization approach could be applied to study spatial variation of surface binding events with high resolution.

We demonstrated that ESM could also provide a label-free detection scheme for small molecules, such as miRNA. The axial diffusion of gold nanoparticles linked to the surface through ssDNA can be tracked by ESM with at least 0.04 nm resolution. This is due to the exponential distribution of evanescent field intensity, and the conformation changes resulting from miRNA hybridization with ssDNA can be measured by analyzing the z-axis thermal fluctuations of ssDNA linked nanoparticles. Although the axial tracking resolution of 0.02 nm has been reported on the SPR system, the electron transfer between gold nanoparticles and the gold film will lead to the nonlinear variations of SPR scattering signals, making it challenging to be realized with conventional optical system and image processing approaches. This chain molecular linking nanoparticle tracking scheme provides a solution for the small molecule detection in regular buffer.

We have demonstrated the evanescent single-molecule imaging with TIR configuration. The light scattered by the natural roughness of cover glass is used as a reference for interfering with light scattered by proteins, providing the quantitative size imaging of single proteins. We show that this approach can analyze the heterogeneities of single-molecule binding behaviors and permit the analysis of DNA conformation changes by tracking the axial fluctuations of linking nanoparticles. In addition, the cover glass has a lower heating effect, no plasmonic quenching effect, and good optical clearance so that the ESM can be easily integrated with fluorescence imaging for multiplexed detection in future applications. Thus, we anticipate that the ESM can become an essential tool for analyzing single molecules and biological complexes' behaviors, especially when combined with volumetric fluorescence imaging for a systematic understanding of cell activities.

Methods

Materials. The No. 1 cover glasses (22×22 mm, Catalog No. 48366-067), and isopropyl alcohol (IPA, Catalog No. BDH2032-1GLP) was purchased from VWR (Radnor, PA, US). Polystyrene nanoparticles were purchased from Bangs Laboratories (Fishers, Indiana, US). Spherical gold nanoparticles (Catalog No. A11) were purchased from Nanopartz company (Loveland, CO, US). 0.1% poly-l-lysine (Catalog No. P8920), hydrogen peroxide (H$_2$O$_2$, 30%, Catalog No. H1009), (3-Aminopropyl)triethoxysilane (APTES, Catalog No. 440140), succinic anhydride (Catalog No. 239690), bovine serum albumin (BSA, Catalog No. A7638), human thyroglobulin (Tg, Catalog No. T6830), sodium hydroxide (NaOH, Catalog No. S5881), 4-(N-Maleimidomethyl) cyclohexane-1-carboxylic acid 3-sulfo-N-hydroxysuccinimide ester sodium salt (Sulfo-SMCC, Catalog No. M6035), and Tris(2-carboxyethyl)phosphine (TCEP, Catalog No. 646547) were purchased from Sigma-Aldrich (St. Louis, MO, US). Ammonium hydroxide (NH$_3$—H$_2$O, 28.0 to 30.0%, Catalog No. C5103500-2.5D) was purchased from Mallinckrodt Reagents (Belmont, NC, US). 1-ethyl-3-(3-dimethylaminopropyl)carbodiimide hydrochloride (EDC, Catalog No. 22980) and Sulfo-NHS (N-hydroxysulfosuccinimide, Catalog No. 24510) were purchased from Thermo Scientific (Waltham, MA, US). Phosphate-Buffered Saline (PBS, Catalog No. 21-040-CV) was purchased from Corning (Corning, NY, US) and filtered with 0.22-μm filters (Millex-GS, Catalog No. SLGSM33SS) from Sigma-Aldrich (St. Louis, MO, US). Native protein A (Catalog No. ab7399) was purchased from Abcam (Cambridge, UK). Anti-IgA (IgG, Catalog No. STAR141) was purchased from BIO-RAD (Hercules, CA, US). Human colostrum IgA (Catalog No. 16-13-090701) and Human IgM (Catalog No. 16-16-090713) were purchased from Athens Research and Technology (Athens, GA, US). Deionized water with resistivity of 18.2 MΩ cm$^{-1}$ was filtrated with a 0.22-μm filter and used in all experiments. The ssDNA and miRNA were purchased from Bio-Synthesis Inc. The ssDNA was modified with a disulfide bond at 5' for protein conjugation and NHS ester at 3' for linking to the glass substrate. The ssDNA and miRNA sequences are as follows:

(SEQ ID NO: 1)
5' [NHS][Amino C6 linker]-AAC CCC TAT CAC GAT TAG
CAT TAA TTT-(CH2)3-S-S-(CH2)3 3'

(SEQ ID NO: 2)
miR-155 5'-UAA UGC UAA UCG UGA UAG GGG UU-3'

Experimental setup. An 80-mW laser diode (PL450B, Thorlabs, Newton, NJ, US) is used as the light source to provide the incident wavelength of 450 nm. The laser diode is fixed at a temperature-controlled mount (LDM38, Thorlabs), which is driven by a benchtop diode current controller (LDC205C, Thorlabs) and a temperature controller (TED200C, Thorlabs). Light from the laser diode is conditioned by an achromatic doublet lens group, and then focused to the back focal plane of a ×60 objective (Olympus APO N 60× Oil TIRF, NA 1.49) by a tube lens with focal length of 300 mm. The incident angle was adjusted by a manual translation stage to reach total internal reflection condition at 65° (XR25P-K2, Thorlabs). Reflection light is also collected by a camera (MQ013MG-ON, XIMEA) for helping to find the objective focus position. Scattered light from the protein and glass surface is collected by a ×50 objective (NA, 0.42) to form an ESM image by a second camera (MQ003MG-CM, XIMEA). Coherent OBIS FP 405 LX, OBIS FP 488LS, OBIS FP 532LS, and OBIS FP 660 LX lasers were used as the light source to provide the incident light with central wavelength at 405, 488, 532, and 660 nm. A detailed schematic representation of the optics can be found in FIG. 2. A thin cover glass constructed flow cell with ~50 μm channel height was employed for sample delivery as previously reported, and the flow rate is controlled to achieve laminar flow with a gravity-based pumping system.

Surface functionalization. For polystyrene nanoparticle detection, cover glass surface was incubated with 0.1% poly-l-lysine for 1 h. Then the surface becomes positively charged to achieve high binding rate. For measuring nonspecific binding of single proteins, the cover glass was modified with active carboxyl groups using following steps. 1) The cover glasses were cleaned in the boiling solution mixing the $NH_3$—$H_2O$, $H_2O_2$, and water with volume ratio of 1:1:5 for 1 hour to obtain clean hydroxylated glass surfaces, where dropping water became a layer. 2) The cover glasses and container were washed twice with water, and then ultrasonically cleaned 2 times with water, and blew dry with nitrogen. 3) The hydroxylated cover glasses were incubated in boiling 1% APTES diluted with IPA for 3 hours to functionalize the surface with primary amine group. After processing, both solution and cover glass should be clear if drying in second step is performed properly. 4) Cover glass and container were washed twice with IPA, ultrasonically cleaned twice with IPA, and blew dry with nitrogen. 5) Incubate the amino group modified cover glasses in 10 g L$^{-1}$ succinic anhydride in water for 1 hour to obtain carboxylic group functionalized cover glass chips. The pH of succinic anhydride solution is adjusted to 7.5-8 with 1 M NaOH solution. The cover glass and container were washed twice with water, ultrasonically cleaned twice with water, and then stored in the water prior to use. In the experiment, the surface was incubated in 40 g L$^{-1}$ EDC mixed with 11 g L$^{-1}$ Sulfo-NHS for 15 min to activate the carboxyl groups for connecting proteins. The EDC/NHS solution was filtered by a 0.22-μm filter before use. For specific binding kinetic analysis, the activated carboxylic group modified cover glasses were rinsed with PBS buffer, and then 20 nM anti-IgA or anti-IgM in PBS buffer was applied to the surface and incubated for 1 hour to allow immobilization. Next, the surface was incubated in 1 mg ml$^{-1}$ BSA for 10 min to block any remaining activated carboxylic group to minimize nonspecific binding. Finally, the protein solution was flowed onto the surface for specific binding measurement.

For the nanoscale tracking of ssDNA linked nanoparticles, the ssDNA was linked to the glass surface through amine-NHS reaction by flowing the chamber with 250 μL of 7.5 μM ssDNA solution over 1 hour and followed by washing with 2 mL of PBS over 10 min. Then, the ssDNA was reduced to expose the —SH bond for connecting the gold nanoparticles by reductive cleavage of the disulfide bond: 3 ml of cleavage buffer comprising 50 mM of the reducing agent Tris(2-carboxyethyl)phosphine in PBS was introduced to the chamber for 15 min. After reduction, the chamber was flushed with 2 mL of PBS for 10 min to exclude any residual cleavage buffer. Finally, the miRNA and ssDNA hybridization were conducted by flowing 500 μL of 6 μM miRNA in TE buffer (10 mM Tris-HCl, 1 mM EDTA, pH 7.4) across the chamber for 11 min. The sample was then washed by flowing 2 mL of TE buffer over a span of 9 min. All buffers were freshly prepared before each experiment using nuclease-free water.

Data processing. The raw image sequence captured at high frame rate (~100-1,000 fps) was converted to an averaged-image sequence, by averaging images over every 20 ms using previously reported MATLAB program or the real-time averaging function of the camera recording software (XIMEA CamTool), to suppress shot noise. To remove the background, a differential image sequence was obtained by subtracting the previous frame from the present frame of the averaged-image sequence using a MATLAB program. The TrackMate plugin in ImageJ was employed to find and count particles or molecules. The ESM intensity of a particle or molecule was determined by average the powers of all pixels within the Airy disk. Origin 2019 was used to create data plots and histograms. Scrubber v. 2.0a was used to determine the association and dissociation rate constants by fitting the curves in FIG. 7c with the first-order binding kinetics model.

Example 2: Optical Imaging of Single-Protein Size, Charge, Mobility, and Binding Introduction Proteins are ubiquitous in biological processes and play key roles in disease diagnosis and treatment. Size and charge are the most fundamental physical characteristics of protein, which determine many molecular activities including binding and conformation changes. For this reason, mainstream techniques such as mass spectrometry, electrophoresis, western blot and enzyme-linked immunosorbent assay (ELISA) separate or identify proteins based on the size, charge and specific interactions. Although these techniques are widely employed in laboratory and industry, most of them are detrimental to the native protein structure due to fragmentation and denaturation, and lack the sensitivity for measuring low-abundant samples. Several single-molecule techniques have been developed to quantify the size and charge, which significantly improve the detection sensitivity. In particular, interferometric scattering (iSCAT) quantifies the protein size by imaging the scattered light from single protein. Anti-Brownian electrokinetic (ABEL) trap measures the molecular diffusion and electrokinetic mobility (related to size and charge) by manipulating the motion of single protein via an electric field. We have recently developed a technique that can measure single protein size and charge, and detect ligand binding using total internal reflection (TIR) imaging. We tether protein molecules to a sensor surface via flexible polymer linkers and apply an alternating electric field to drive the proteins into oscillation. By imaging the oscillation in response to the field, the size and charge can be extracted. The binding of ligands changes the size and/or charge of the protein and thus can be detected as well. However, this technique has two intrinsic limitations. Firstly, the imaging relies on the interference between the scattered light from the proteins and the reflected light from the surface. The strong reflected light easily saturates the camera full well capacity and impedes further improvement of signal-to-noise ratio (SNR) by increasing the incident light intensity. Also, the interference pattern appears as a parabolic shape with a size (5 µm) much larger than the diffraction limit (1 µm). As a result, only ~10 single proteins can be imaged simultaneously by a microscope with 60× amplification, making it difficult to study single molecules in a multiplexed fashion.

To address above problems, we introduce an evanescent scattering microscopy (ESM) configuration to our imaging system, which only collects the scattered light rather than the reflected light. Since the scattered light is much weaker than the reflected light, the SNR can be easily enhanced by increasing the incident light intensity without saturating the camera. The parabolic shape for single protein image is also eliminated in the ESM configuration due to the absence of reflected light, allowing us to increase detection throughput with higher protein coverage. Besides the technical advance, we demonstrate the capability of ESM in measuring single-molecule size and charge with four different proteins. Towards protein identification, we measured the pH induced size and charge of single proteins, a strategy analogous to conventional two-dimensional (2D) electrophoresis. We also identify individual molecules in a two-protein mixture by the size, charge, and antibody binding, which resembles western blot. We hope this work will lay the groundwork for single-protein separation and identification and contribute to single-molecule biosensing.

Results

Detection Principle

In ESM, a laser with 450 nm wavelength is directed to the surface of an indium tin oxide (ITO) coated cover glass at 650 of incidence, which is 3.5° above the total internal reflection angle of the glass/water interface, using a 60× high numerical aperture (NA) objective. An evanescent field is created on the ITO surface and scattered by the tethered proteins and surface roughness (FIG. 9a). The scattered light is collected using another objective on top of the ITO and imaged by a CMOS camera, which can be denoted as $$E_{cam} \sim 2|E_{sf}| |E_p| \cos(\theta), \qquad (2)$$

where $E_{sf}$ and $E_p$ are the light scattered by the ITO surface roughness and the protein molecules, respectively, and $\theta$ is the phase difference between the two scattered lights (FIG. 9b). For a given surface, $E_{sf}$ is constant, while $E_p$ is a function of protein size (hydrodynamic diameter, $D_H$) and the vertical distance from the surface (z) due to the exponential decay of evanescent field. Thus, $E_{cam}$ is a function of both $D_H$ and z. Since the proteins are charged in solution (with charge q), z can be modulated by applying an electric field in vertical direction. Therefore, both $D_H$ and q can be extracted simultaneously by imaging the electrical response of the protein molecules. To continuously manipulate the same protein molecule and prevent diffusion, we tether the proteins to the ITO surface with a soft polymer, polyethylene glycol (PEG, with molecular weight 10 kDa). Then we drive the proteins into oscillation by applying an alternating electric field and record an image sequence at a frame rate several times higher than the frequency of the electrical field. By performing temporal fast Fourier transform (FFT) for every second of the recorded image sequence, an FFT image sequence of 1 frame per second (FPS) is obtained. The FFT amplitude images shows bright spots, which are the oscillating protein molecules. The oscillation amplitude in nanometer can be calculated based on the FFT amplitude image intensity of the bright spots (FIG. 9c, d). As the applied potential increases, the oscillation amplitude and FFT image intensity increases as well. But due to the restriction of the PEG tether, the FFT image intensity will reach a maximum when further increasing the potential cannot provide enough force to counter the entropic force of the stretched PEG. As a result, the FFT image intensity vs. applied potential (I vs. $U_0$) plot presents a linear regime at low potential and a plateau regime at high potential (FIG. 9e). Using the linear regime and the plateau regime, the charge (q) and size of single molecules ($D_H$) can be calculated (see below).

The FFT image intensity is converted into oscillation amplitude in nanometers by using $I=I_0 e^{\Delta z_0/d}$, where I is FFT image intensity, $\Delta z_0$ is the distance from the protein to the surface, and d is the decay constant of evanescent field (−200 nm). $I_0$ is the intensity when the protein is at the surface ($\Delta z_0=0$), which is determined by measuring the I when the PEG is stretched to its maximal approachable length. After determining $\Delta z_0$ at different applied electric field, the I vs. $U_0$ curve is converted to $\Delta z_0$ vs. $U_0$ curve, and the protein charge can be obtained by (Supplementary Note 1), $$\Delta z_0 = \frac{q}{k_{PEG}} E_0(\Delta z_0) \qquad (3)$$

where $E_0(\Delta z_0)$ is the amplitude of the electric field at $\Delta z_0$ (proportional to $U_0$), q is the charge of the protein molecule and $k_{PEG}$ is the entropic spring constant of the PEG tether. By fitting the slope of $\Delta z_0/U_0$ in the linear regime of FIG. 1e, we can calculate the charge of protein molecule (q) by Eq. 3.

Figures 10A, 10B, 10C, 10D, 10E:
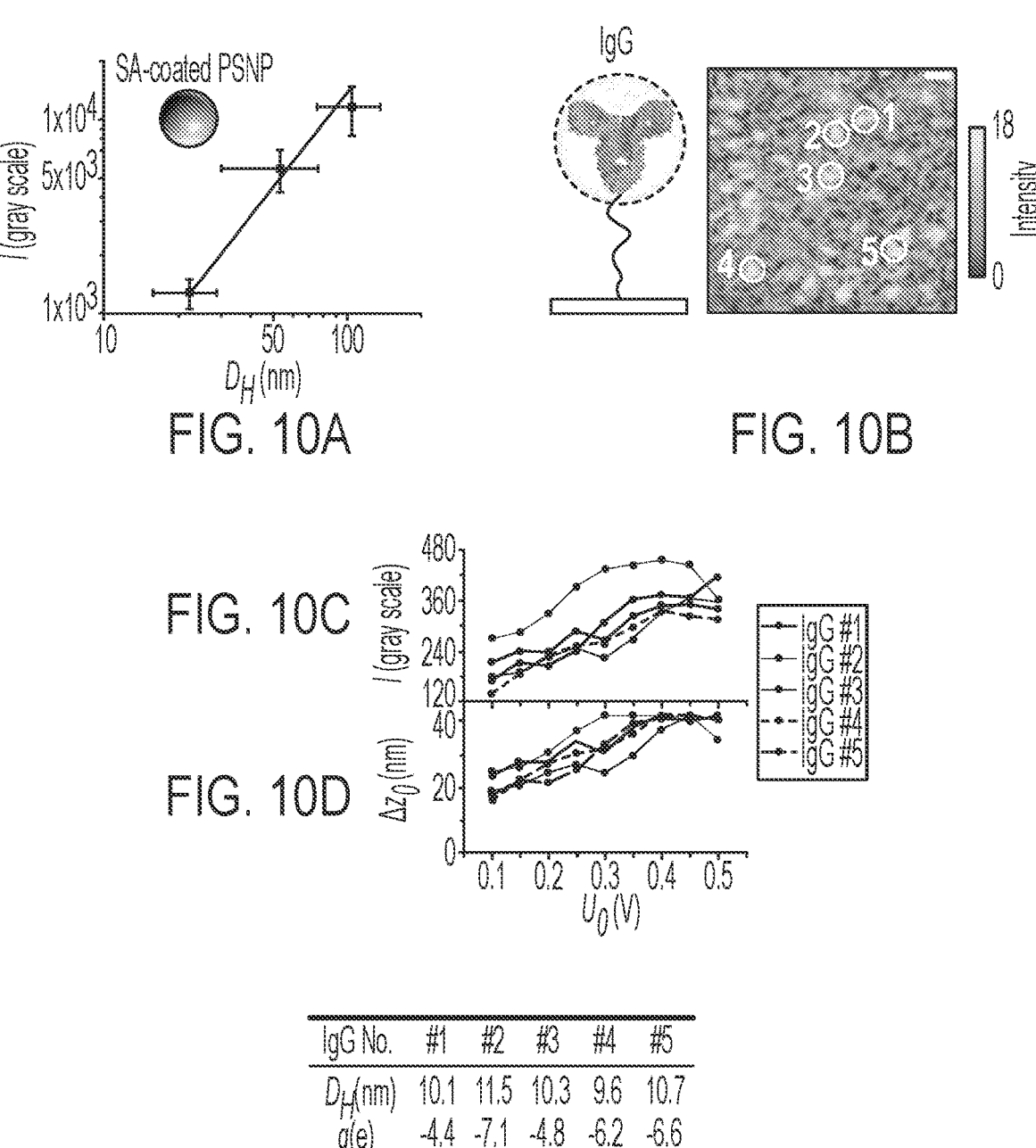
Figures 10F, 10G:
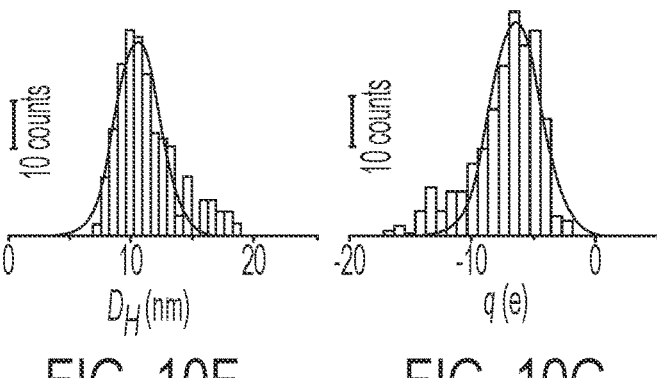

To determine the protein size, we establish a relationship between I and $D_H$ with polystyrene nanoparticles (PSNP). PSNPs are used because their refractive index is similar to proteins. 3 kinds of PSNPs with different $D_H$ were tethered with PEG 10 kDa linker and then driven into oscillation via the same electric field series. Then we applied the FFT filter and extract the oscillation signals at the plateau regime (FIG. 10a). The FFT intensity change at the plateau regime shows a proportional relationship with $D_H$ in log-log scale, which also agrees with our calculation.

Sensitivity and Throughput

ESM improves both the SNR and the image resolution when compared with the tethered protein detection by TIR imaging. ESM avoids the strong reflected light in TIR detection by collecting the scattered light from top of the sample, and thus dramatically improves the camera photon collection efficiency. ESM allows the use of much stronger incident light power to improve SNR in shot noise limited detection condition, where the SNR scales with square root of sample scattered photons. Theoretical calculation shows ESM can use 5000 times higher incident power ($5 \text{ kW}\cdot\text{cm}^{-2}$ vs $1 \text{ W}\cdot\text{cm}^{-2}$) and has five times SNR improvement over TIR imaging on single BSA molecule detection ($SNR_{ESM}$~16 and $SNR_{ESM}$~3, based on received photon number calculation). In our current ESM setup, limited by the camera quantum efficiency and loss of light in the optical path, the shot noise limited SNR is ~8.5. The actual measured $SNR_{ESM}$ for single BSA molecule is ~7.2, indicating our measurement is shot noise dominant with minor contributions from other types of noises. Nevertheless, ESM still more than doubles the SNR on detection of single protein over TIR detection in our current setup, which could be further improved by reducing photon loss and other type of system noises in the optical system.

ESM also improves the spatial resolution of the protein image and the detection throughput of the detection over TIR imaging. By eliminating the parabolic interference pattern (~5 µm in length) in TIR image, ESM image has spatial resolution of ~1 µm in both x and y directions. Therefore, ESM can detect individual protein signals as long as their distance larger than 1 µm, which allows several times higher protein oscillator packing density on the sensor surface compared to TIR imaging. More signal spots on the same sensing area increases the throughput for study of heterogenic properties of single proteins in a population.

Measuring the Size and Charge of Single IgG Molecule

After establishing the detection method, we demonstrate the capability of ESM for measuring size and charge using immunoglobulin G (IgG, with molecular weight 150 kDa). A series of potentials from low to high were applied to the tethered IgG and the images were recorded. FIG. 10b shows the FFT image at 0.5 V, 40 Hz, where the bright spots are single IgG molecules. The total image intensity (in gray scale) for each molecule is integrated to represent the scattered light intensity. After plotting the intensity vs. different potentials (FIG. 10c), the average intensity at the plateau was calculated and plugged into the calibration curve (FIG. 10a) to calculate $D_H$. Then the intensity in gray scale was converted into oscillation amplitude in nanometers (FIG. 10d). By fitting the slope of the linear regime, q for each IgG molecule was obtained. The $D_H$ and q for the 5 representative IgG molecules were shown in FIG. 10e. A total of 293 IgG molecules were measured for statistical analysis. By fitting the histogram with Gaussian distribution (FIGS. 10f and g), $D_H$ and q are determined to be 10.4±1.4 nm and −6.5±1.8 e (e, the elementary charge), respectively.

Figure 10H:
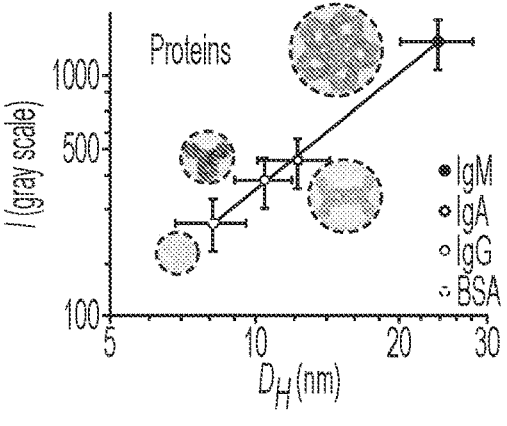
Figure 10I:
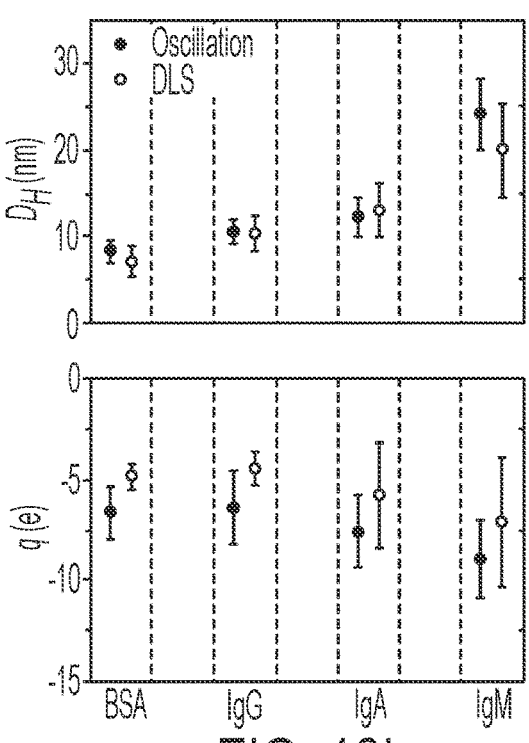

Using the above method, the $D_H$ of another three kinds of proteins: immunoglobulin M (IgM), immunoglobulin A (IgA), and bovine serum albumin (BSA) were also measured, and the results are shown in FIG. 10h. The charge of the proteins was measured as well (FIG. 10i). To evaluate the accuracy of our detection, we measured the size and charge of the same proteins with dynamic light scattering (DLS) (FIG. 10i). The results from our approach show good consistency with those determined by DLS and agree with the value reported in literatures.

Dependence of Charge on pH 2D electrophoresis creates a pH gradient in one dimension to separate proteins by tuning the mobility/charge of proteins at different pH. As a preliminary test towards this goal, here we show that ESM can measure the charge change of single IgG molecules at different pH. To alter the charge of IgG, we tuned the solution pH from below to above the isoelectric point (pI) of IgG (pI ranges from 6.6 to 8.2), which changed the polarity and amount of charge.

In the experiment, the same IgG molecules were oscillated and imaged at different pH (5.0, 7.0 and 9.7) (FIG. 3a). FIG. 11b shows the $\Delta z_0$ vs $U_0$ curve of an example IgG molecule at pH 5.0 and 9.7, where the IgG charge polarity were positive and negative, respectively. The oscillation amplitude $\Delta z_0$ were similar at different $U_0$, indicating the charge in the IgG is similar, while the polarity was opposite by examining the phase of the oscillation. We plotted the oscillation profile of the representative IgG molecule at pH 9.7 and found that the oscillation was out-of-phase with the applied potential (FIG. 11c), implying the molecule was negatively charged. After switching the pH to 5.0, the oscillation phase was inversed, which reflected the fact that charge polarity was positive when pH<pI.

We have studied 312, 300 and 314 IgG molecules at pH=5.0, 7.0 and 9.7, respectively, and summarized the size and charge data in FIGS. 11d and e. The results show the charge are +7.6±1.7 e, −5.9±2.2 e and −7.4±2.1 e at pH 5.0, 7.0 and 9.7, consistent with the charge change trend with pH. In contrast, the size does not alter much at different pH (10.4±1.8 nm, 10.4±1.4 nm and 10.5±2.2 nm for pH 5.0, 7.0 and 9.7), which suggests IgG size is not responsive to pH. Together, these results demonstrate that our method is capable of differentiating proteins at different pH.

Identification of Single Proteins in a Two-Protein Mixture

Figures 12A, 12B, 12C:
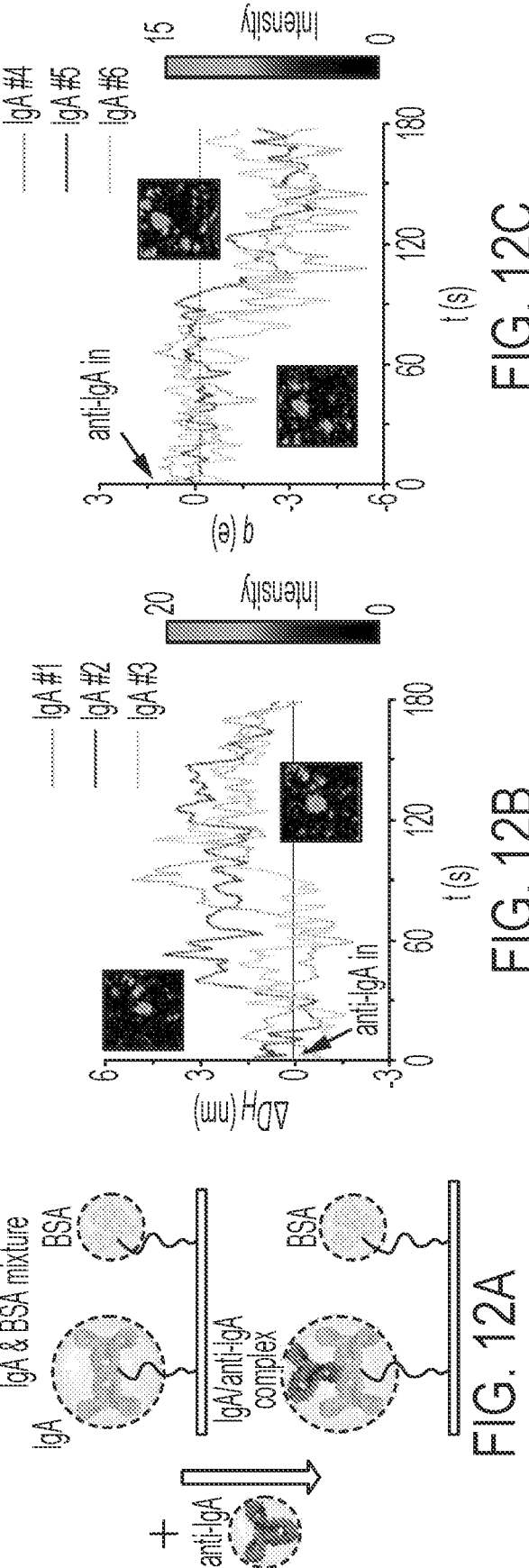
Figures 12D, 12E, 12F:
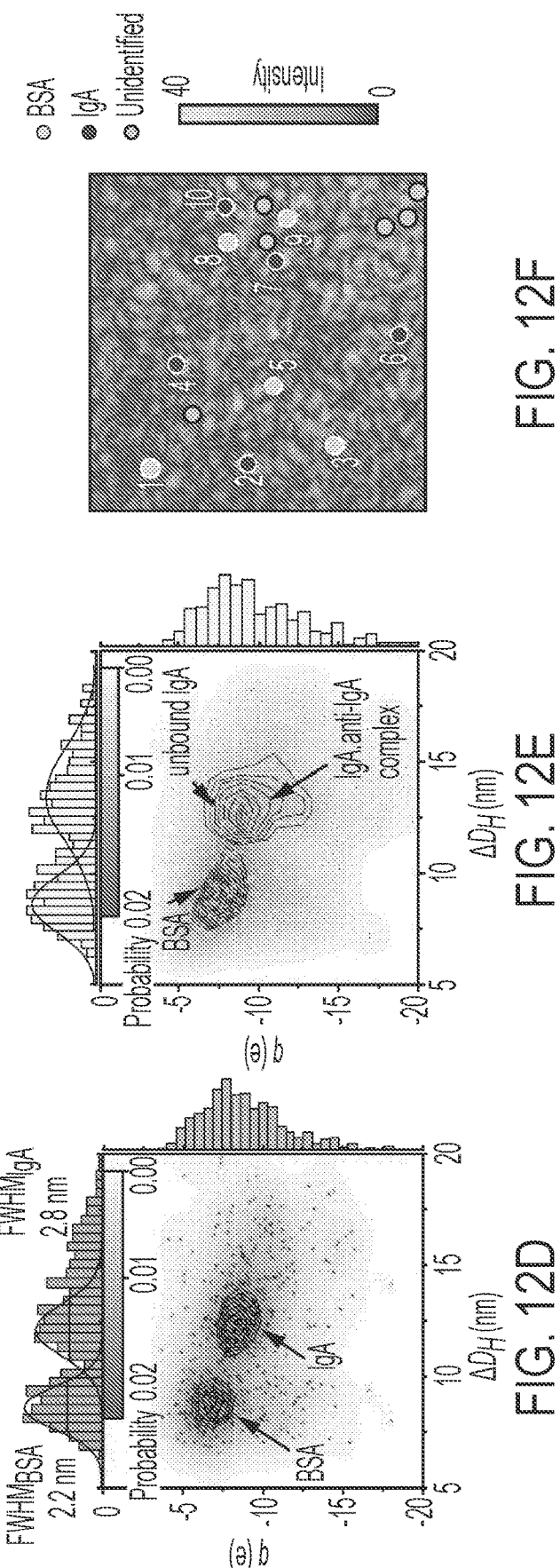

In western blot, proteins are firstly separated by electrophoresis and then identified using antibody. Analogously, we differentiated individual IgA and BSA by size and charge in an IgA/BSA mixture and identified IgA molecules via antibody binding (FIG. 12a). Prior to the measurement, we mixed the samples at 1:1 ratio and then tethered them on the ITO surface. Next, we measured the size and charge of individual proteins in the mixture and plotted the data in a 2D graph with axes showing size and charge. Two separated domains are found in the graph, which are assigned to BSA and IgA (FIG. 12d). Projection of the 2D plot on each axis shows the size and charge distribution of the mixture, where the size distribution has two distinct peaks corresponding to IgA and BSA (FIG. 12d, top panel); However, only one peak is shown in the charge projection (FIG. 12d, right panel) because the charges of these proteins are similar.

To confirm the domain with larger $D_H$ was IgA, we added anti-IgA to the surface and recorded the size and charge change of each single molecule. Binding of anti-IgA to IgA changes its $D_H$ and q such that the IgA molecules can be identified from the mixture. In contrast, BSA should not show changes in $D_H$ and q because it does not bind with anti-IgA. FIGS. 12b and c show the real-time size and charge change of 3 representative IgA molecules upon antibody binding, where a sudden change was observed when the antibody bound to IgA. We measured ~60 anti-IgA binding events in real-time, and the average size and charge change were 1.7 nm and −1.8 e, respectively. After the antibody binding, we switched the imaging area and measured the size and charge for more molecules (~420 molecules) in an end-point fashion (without capturing the binding moment) to construct the 2D plot (FIG. 12e). The 2D plots before and after antibody binding are compared. Before antibody binding (FIG. 12d), the plot shows two separate domains for the two proteins. In the size projection, two peaks with centers at 8.5±1.0 nm and 12.1±1.2 nm could be observed. For the charge projection, only one peak is shown, indicating that the proteins are indistinguishable by merely looking at the charge. After antibody binding (FIG. 12e), the right domain (IgA) shifts to the lower-right with a more dispersed contour. In this case, the two peaks in size projection have centers at 8.6±1.3 nm and 13.6±2.1 nm (FIG. 12e, top panel), where the second peak is ~1.5 nm larger compared to the histogram before the antibody binding. Simultaneously, a peak at ~−10 e could be observed in the charge distribution (FIG. 12e, right panel), reflecting the contour change in 2D results. Compared to the IgA domain, the BSA domain is unaffected by the antibody. To confirm the assignment of two domains, we also measured IgA and BSA independently. For BSA, distribution center in size and charge are at 8.2±1.3 nm and −6.6±1.3 e respectively; For IgA, the values are 12.2±2.2 nm and −7.6±1.8 e in size and charge respectively. They both agree with the mixture measurement.

The above analysis allows us to derive a criterion for distinguishing IgA and BSA on the same sensor chip. We used the width of distribution as a threshold to identify IgA or BSA, where the full width at half maximum (FWHM) for BSA and IgA are 2.2 nm and 2.8 nm (FIG. 12d, top panel). Together with the distribution center, we took the size of 7.4 nm-9.6 nm for BSA and 10.7 nm-13.5 nm for IgA. Using the size threshold and antibody binding induced size and charge change, we were able to identify the single proteins in the IgA/BSA mixture (FIG. 12f).

Conclusion

We have developed a detection method that can quantify the size and charge of single proteins by evanescent scattering microscopy, which has improved SNR and spatial resolution over the total internal reflection imaging method we developed earlier. Two different protein molecules in mixture can be distinguished based on measuring the size, charge, and antibody binding, analogous to 2D electrophoresis and western blot, but at the single-molecule level. This method can contribute to single-molecule studies including measuring small volume samples (e.g. single cells), revealing molecular heterogeneity, and understanding the functions of single molecules in diseases and drugs.

Methods

Materials

ITO coated cover slips with resistance of 70-100Ω were purchased from SPI Supplies. Streptavidin and hydrogen peroxide were purchased from VWR. (3-Glycidyloxypropyl) trimethoxysilane and BSA were purchased from Sigma-Aldrich. IgG (goat anti human IgA, 150 kDa) was purchased from Bio-Rad. Secretory IgA (from human colostrum, MW=385 kDa) and IgM (from human plasma, MW=950 kDa) were purchased from Athens Research and Technology. Streptavidin coated polystyrene nanoparticles (20 nm, 50 nm and 100 nm) and biotin-PEG-NHS (MW=3.4, 5 and 10 kDa) were purchased from Nanocs. 1× phosphate buffered saline (PBS) was purchased from Corning. Ammonium hydroxide was purchased from Mallinckrodt Chemicals. Deionized (DI) water with resistivity of 18.2 MΩ·cm was used in all experiments.

Experimental Setup

An 80 mW laser diode (PL450B, Thorlabs) with central wavelength of 450 nm was used as the light source. The light was collimated by a lens group and then focused to the back focal plane of a 60× oil immersion objective (NA=1.49, Olympus). The light spot on the ITO surface was 30 μm by 30 μm with an intensity of 5 kW·cm$^{-2}$. The reflected light was collected by a camera (Pike F-032B, Allied Vision) which was used to find the total internal reflection angle. Light scattered by the protein molecules was collected from top by a 50× objective (NA=0.42) and imaged by a second camera (MQ003MG-CM, XIMEA) at 200 FPS. The camera exposure time and gain were optimized for different experiments. A function generator (33521A, Agilent) and a potentiostat (AFRDE5, Pine Instrument Company) were used to apply potential to the ITO surface. A sinusoidal potential (f=40 Hz) was applied to the ITO surface through a three-electrode configuration, where the ITO, an Ag/AgCl wire and a Pt sheet served as the working, reference, and counter electrodes, respectively. A USB data acquisition card (USB-6251, National Instrument) was used to control and synchronize the applied potential, current and the camera.

Surface Functionalization of ITO

ITO coated coverslips were cleaned by sonication in acetone, ethanol and DI water serially, each for 10 min. Then the ITO coverslips were soaked in H$_2$O$_2$/NH$_3$—H$_2$O/H$_2$O (1:1:5) and at 80° C. for 30 min, followed by rinsing with DI water and drying with nitrogen flow. Next, the ITO coverslips were incubated with 2% (3-glycidyloxypropyl) trimethoxysilane in isopropanol at 80° C. for 2 hours, rinsed with isopropanol and DI water, and dried with nitrogen flow. The epoxy-functionalized ITO coverslips were incubated with 1 mg·mL$^{-1}$ streptavidin or 1 mg·mL$^{-1}$ BSA in 1×PBS for 1 hour to immobilize streptavidin or BSA on the surface. 1 mg·mL$^{-1}$ BSA was applied to the streptavidin coated surface for 10 minutes to block the non-specific binding sites.

Tethering Nanoparticles to ITO Surface

The BSA-functionalized ITO surface was incubated with 0.5 nM biotin-PEG-NHS (3.4 kDa, 5 kDa or 10 kDa) at 4° C. overnight to allow the covalent bonding between NHS and the primary amine groups on BSA. Then the surface was slowly washed with 1×PBS to remove unbound molecules. Streptavidin coated polystyrene nanoparticles (20 nm, 50 nm or 100 nm) were attached to the PEG linkers via streptavidin-biotin conjugation by incubating the surface with nanoparticle solution (10$^{10}$ particles/mL) for 30 min. Finally, the ITO surface was slowly flushed with 100 times diluted PBS to remove the free particles.

Tethering Proteins to ITO Surface

Biotin-PEG-NHS with MW=10 kDa was used to tether protein to the streptavidin-functionalized ITO surface. The protein (IgM, IgA, IgG or BSA) was first incubated with biotin-PEG-NHS tether at 5:1 ratio to form a protein-PEG complex in 1×PBS at 4° C. overnight. Excess amount of protein reduced the chance that multiple tethers were linked to the same protein molecule. The complex solution was added to the streptavidin functionalized ITO surface and incubated for 1 hour to allow the biotin end of PEG coupling to the streptavidin. The ITO surface was slowly washed with 100 times diluted PBS to remove free protein molecules in the solution before measurement.

Oscillation Detection and Data Processing

A 40 Hz alternating electrical potential sequence was applied to the ITO surface with amplitude ramped from 0.1 V to 0.5 V in 0.05 V step and 1 s duration for each step. At the same time, oscillation images were captured at a frame rate that satisfies Nyquist theorem by the top camera. The exposure time was optimized for different measurements to achieve sufficient SNR while not saturating the camera. To determine oscillation amplitude (in gray scale) from the captured images, temporal FFT was performed by MATLAB (R2019b, MathWorks) for all pixels in every 1 s images in the image sequence, and the 40 Hz amplitude component was extracted. The FFT image showed bright spots that were assigned to single molecules. We integrated the total gray scale intensity of each bright spot within a circular region of interest (ROI, diameter of 7 pixels or 1 μm, the size of Airy disk in this case) as oscillation signal, and then used them to plot the I vs. $U_0$ curve. Each bright spot in the FFT image was checked, and only the ones with plateau appeared at high potential were selected as protein signals. From this curve, the molecular size was determined from the average plateau value and the calibration curve in FIG. 10a. Next, we took the average plateau intensity as where the PEG tether reached its maximum extension, and converted into nanometer. At the same time, the $U_0$ could be converted to $E_0(\Delta z_0)$ after the electric field was calibrated. At last, the charge of protein was determined by fitting the slope of the linear regime in $\Delta z_0$ vs. $E_0$ ($\Delta z_0$) plot. Because of the existence of charge screening effect, the charge determined here should be regarded as the effective charge in 100 times diluted 1×PBS (1.5 mM).

For oscillation phase measurement, a ROI containing protein molecule was selected. The average image intensity within the ROI was calculated for each frame in the image sequence. Then we used FFT to extract the phase information of the protein spot.

Example 3: Multiplexed Protein Detection and Parallel Binding Kinetics Analysis with Label-Free Digital Single-Molecule Counting Introduction Protein plays a key role in the structures and activities of living systems. Determining the proteins and their interactions is critical for drug screening, clinical biomarker analysis, and understanding the biological processes at the molecular level. Diverse technologies have been developed for protein analysis, including mass spectrometry, enzyme-linked immunosorbent assay, western blot, and surface plasmon resonance (SPR). However, these traditional techniques usually only provide ensemble measurement results and lack the capability to analyze the highly heterogeneous proteins at a level of detail. In the recent decade, label-free single-molecule imaging approaches have been developed to push beyond ensemble averages and conduct the statistical analysis of intrinsic protein properties such as molecular weight and binding processes. These techniques include interferometric scattering microscopy (iSCAT), photothermal microscopy, and recently developed plasmonic scattering microscopy (PSM) and evanescent scattering microscopy (ESM).

To precisely analyze the single-molecule signal, which is usually very weak, these imaging-based approaches usually need to remove the strong but static backgrounds with differential processing, namely subtracting or dividing one frame by the previous frame. Meanwhile, the raw image frames are usually required to be averaged at the temporal domain to suppress the shot noise. Unfortunately, the protein binding events are random in the time domain. The extracted single molecule signal intensity depends on the relative time position of the binding events in the averaged frames. The molecules bind to the sensor surface at around the middle of one average period, will have underestimated image intensity or missed if the image processing does not consider the time point of the binding events. This measurement error will limit the system precision in recognizing the proteins with different molecular weights in a mixed sample and in analyzing the kinetics of binding processes, which relies on digitally counting the binding events over time.

Here, we present an automatic single-molecule counting algorithm for ESM that uses moving average and time tracking approaches to determine the time point of binding events with the temporal resolution of the camera exposure time. It has been shown that the moving average is important for obtaining the single-molecule signals precisely in iSCAT. By processing the same experimental data, this algorithm shows that it misses few events and provides more precise image intensity than the classical algorithm. Next, we show that this algorithm can recognize proteins with different molecular weights, thus allowing for monitoring the kinetics of protein binding in solution phase by tracking the numbers of free protein and bound protein complex hitting on the sensor surface, providing one approach for multiplexed protein analysis. Furthermore, we show that this strategy can simultaneously analyze the kinetics of two protein interaction processes on the surface and in the solutions, providing one approach for parallel binding kinetics analysis.

Results

Figures 13A, 13B, 13C, 13D:
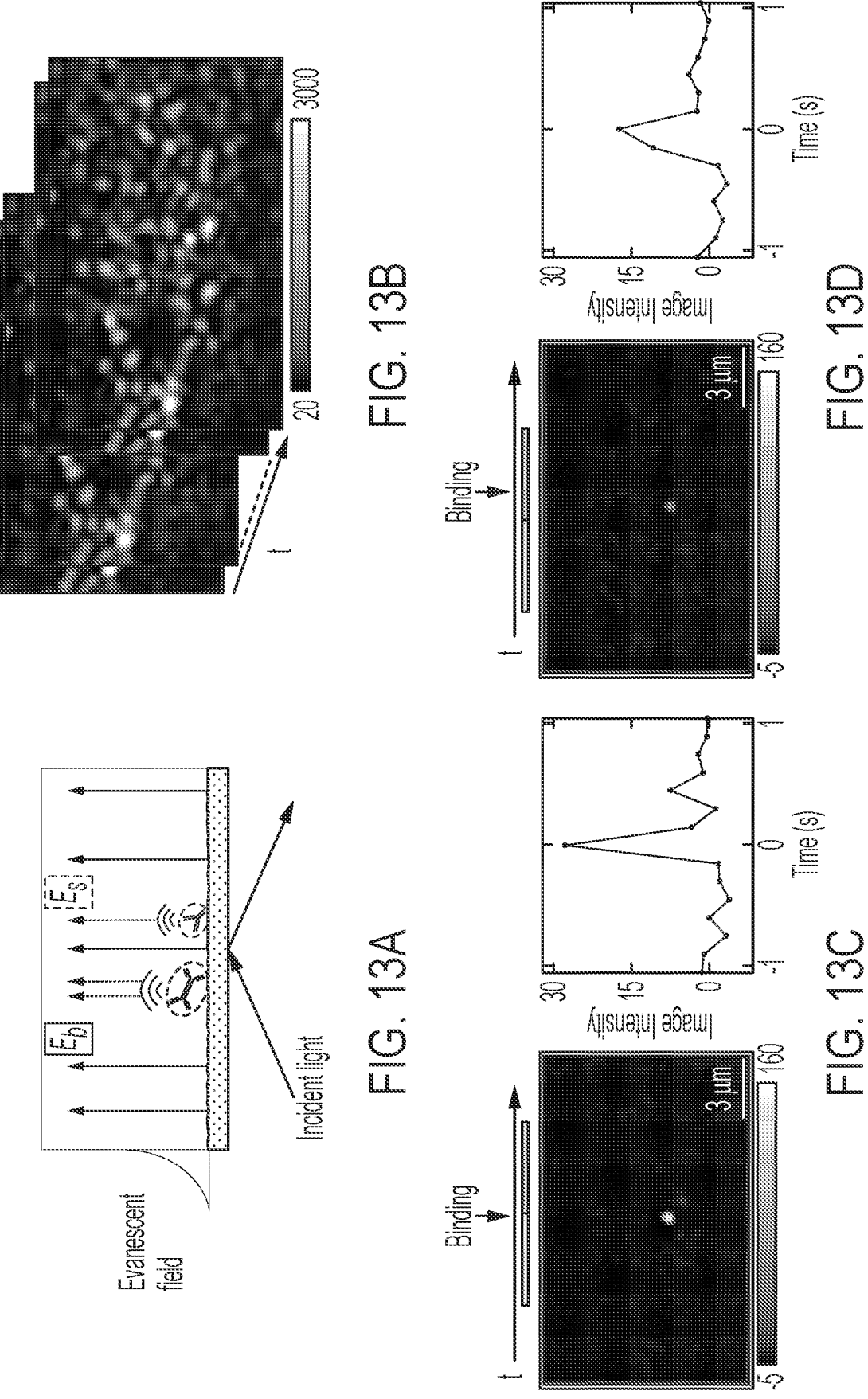

Algorithm principle. ESM system is employed in this study. The 450 nm laser is conditioned to illuminate one indium tin oxide (ITO) coated cover glass with an incident angle of ~65° through a 60× objective. The incident angle is larger than the critical angle to excite evanescent waves on the surface (FIG. 13a). A 50× objective is placed on the top of ITO-coated cover glass to collect the evanescent waves scattered by proteins and surface roughness to form the ESM images.

To suppress the shot noise, the raw images recorded at 160 frames per second (fps) are firstly averaged over time, where the average period is configured to be ~150 ms. Traditionally, the binding image was obtained by implementing a differential process subtracting the previous frame from the present frame, where a binding event appears as a bright spot (FIG. 13c). When a protein bind to the surface, all pixel values within the Airy disk pattern are summed up at the binding site as the image intensity. However, this approach is usually accompanied with image intensity fluctuations over binding time because the protein binding event usually does not ideally happen in the middle of two consecutive averaging stacks, leading to inaccurate estimation of the single-molecule signal intensities (FIG. 13d).

To determine the single-molecule signal more accurately, we scan the binding event in the raw image sequence with a 150 ms moving average window at a single frame step (6.25 ms) to precisely estimate the binding time. This frame step is fixed for the following experiments except else mentioned. Starting with the first frame, we average the two sequential image stacks (frames 1 to n and frames n+1 to 2n) without image overlapping to generate two averaged images. The averaging is performed for each pixel in the time domain with an average period of 150 ms. Next, we subtract the first averaged image from the second averaged one, obtaining the differential image. The signal change, such as a binding or unbinding event, will be shown in a differential image as a bright or dark spot, respectively. Finally, we repeat the above steps sequentially on every subsequent frame in the raw image sequence. For a protein binding to the surface event, the moving-averaging-and-differential process will generate an increase-then-decrease intensity profile in the binding site (FIG. 13e, f) with temporal resolution equal to the duration of single frame exposure time. The maximum intensity in the middle of the intensity profile is the true protein intensity, which exactly locates the binding time in the middle of two averaging stacks.

Figures 14A, 14B, 14C, 14D:
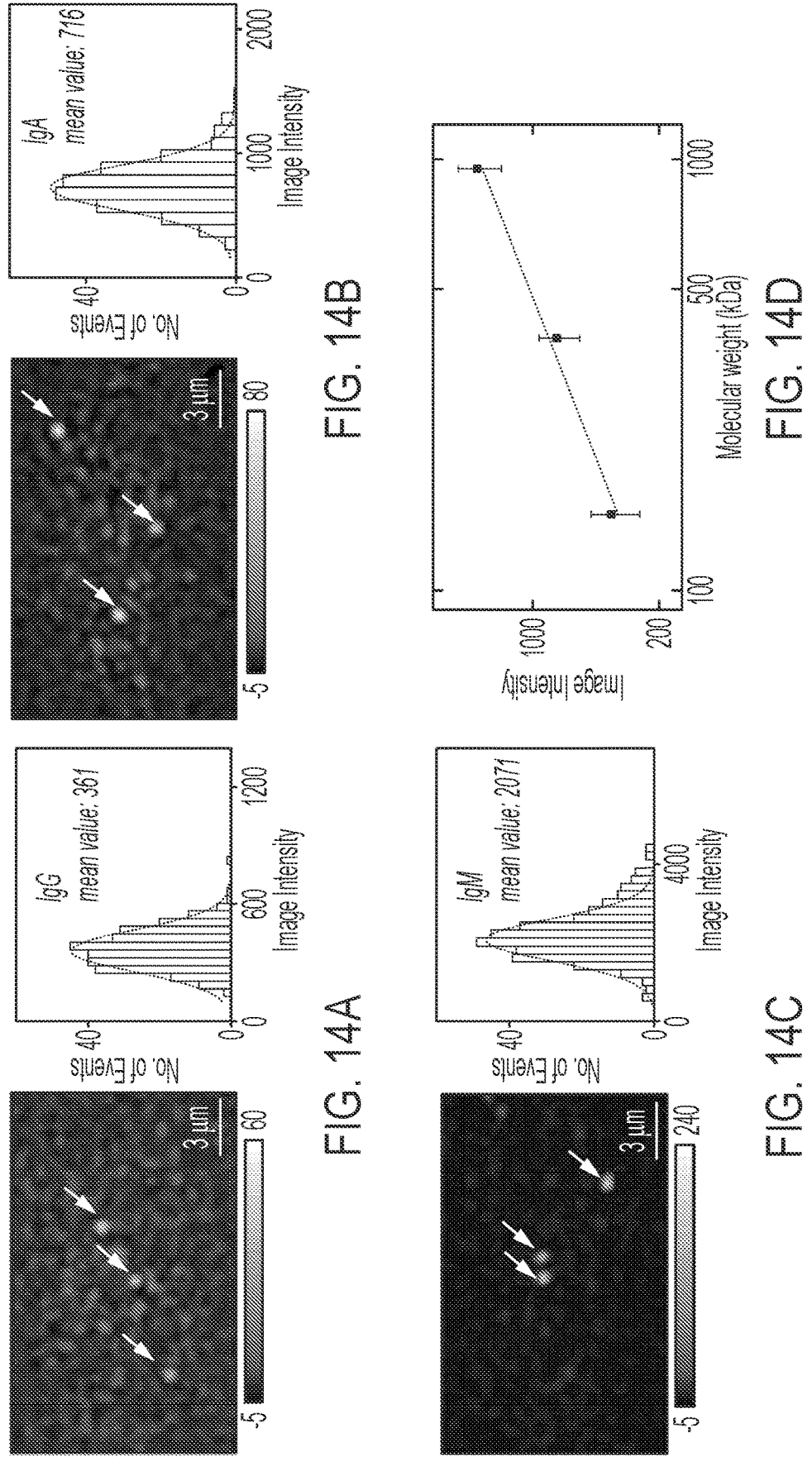

System Calibration. IgG (150 kDa), IgA (385 kDa), and IgM (950 kDa) were measured separately in the experiment to calibrate the ESM system. Protein in phosphate-buffered saline (PBS) buffer was flowed over the chip. The raw image sequence was recorded over time for each measurement (Method). FIG. 14a-c shows protein binding images after moving-averaging and differential data processing. We constructed the histograms by tacking each protein binding event and obtained each protein intensity. Gaussian fitting was applied to the histogram to obtain the mean intensity of the protein. We received 867 binding events with ~21% higher protein intensities and ~125% more binding numbers than data processing without time-scanning. After getting the mean intensity of each protein type, a calibration curve of protein mass versus image intensity was made. As expected, the calibration curve reveals a linear relationship between protein mass and image intensity.

Binding kinetics of IgM to anti-IgM on the surface. To demonstrate the capability of ESM measuring protein binding kinetics with antibodies surface-immobilized approach, we performed IgM and anti-IgM binding kinetics measurement with anti-IgM modified on the surface. We first flowed 2.5 nM IgM solution over the chip for IgM association with the antibodies immobilized on the surface, then flowed PBS buffer over the surface to allow the dissociation of IgM. We tracked the binding and unbinding events of the IgM in real time and plotted the bound IgM numbers versus time to form the binding kinetics curves (FIG. 15b). The fitting of the curves with the first-order binding kinetics model determines the association ($k_{on}$) and dissociation ($k_{off}$) rate constants, which are $1.66 \times 10^6$ $M^{-1}$ $s^{-1}$ and $9.46 \times 10^{-4}$ $s^{-1}$, respectively. From $k_{on}$ and $k_{off}$, the equilibrium dissociation constant ($K_D = k_{off}/k_{on}$) is determined to be 570 pM. These values are in good agreement with the results measured with the ensemble SPR. We collected individual protein binding intensity and made the histogram. The mean intensity of binding proteins is consistent with what we obtained in the calibration experiment (FIG. 15c), confirming the single IgM detection.

Figures 16A, 16B, 16C, 16D, 16E:
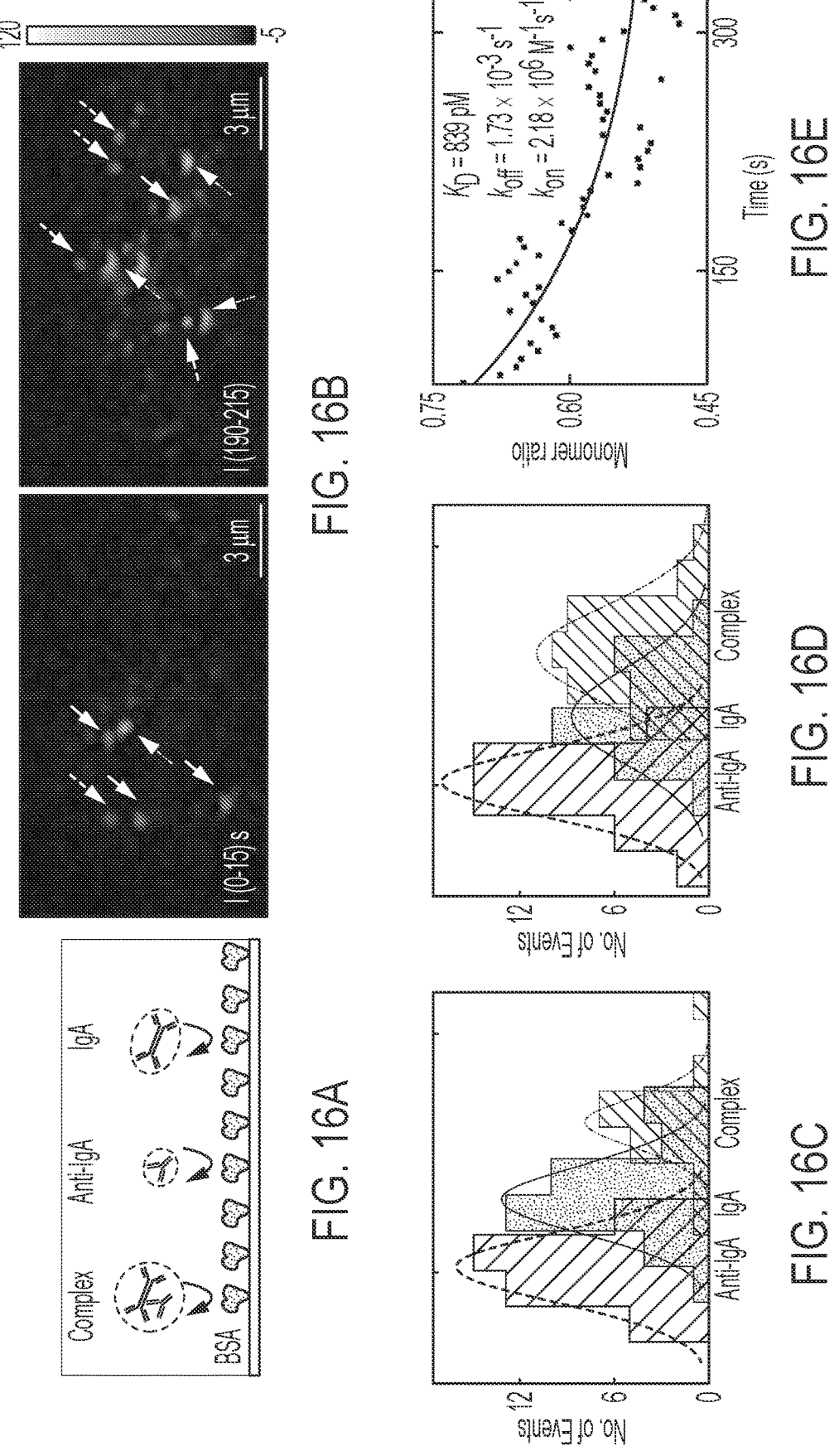

Binding kinetics of IgA to anti-IgA in free solution. We demonstrate that ESM can measure free solution protein-protein interaction through counting the protein landing events to the sensor surface. Considering the process of two monomer species forming the complex in the solution, over time, the concentration of monomers will decrease, and the concentration of the complex will increase. By simultaneously counting the random landing events of the monomer and the complex to the surface, we disclosed the free monomer ratio as a function of time in the solution and calculated the binding kinetics. In the experiment, we modified the ITO surface with bovine serum albumin (BSA), which is a commonly used surface blocker. In this way, the probability of protein landing on the surface scales with the concentration of the protein in the solution. The protein solution was prepared with 5 nM anti-IgA mixed with 5 nM IgA. Then the protein solution was flowed over the BSA chip immediately after the mixing. We tracked the protein landing events in real time. Anti-IgA, IgA, and complex are distinguished based on their image intensity, and their counts are accumulated over time separately. The IgA monomer solution abundance was calculated from the protein counting numbers (Method). During the experiment, few complexes were detected in the first minute (FIG. 16c), and the monomer ratio was close to one. In the third minute, more complexes were detected, and the monomer ratio was close to 0.5 (FIG. 16d). We chose a one-minute time window for accumulating the count number and a five-second moving step. The solution abundance of IgA monomer was calculated as a function of time based on counts. The ratio of monomer IgA versus time is shown in FIG. 16e. The solid curve shows the fitting result of the monomer ratio decay (Method). We obtained $K_D = 839$ pM from the fitting, which is in good agreement with our previous experiment[17], with $k_{off} = 1.73 \times 10^{-3}$ $s^{-1}$ and $k_{on} = 2.18 \times 10^6$ $M^{-1}s^{-1}$.

Figures 17A, 17B, 17C, 17D, 17E:
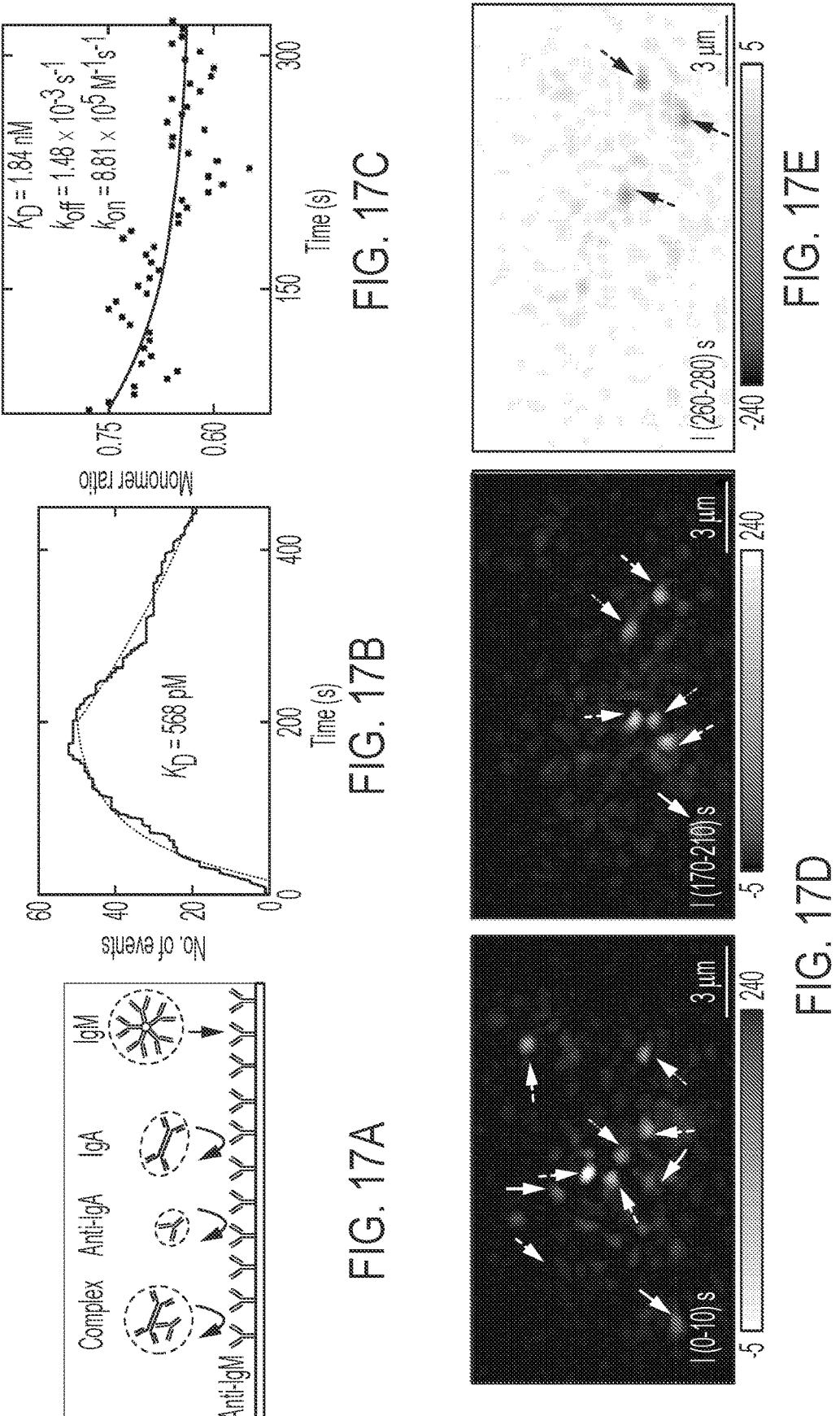

Parallel binding kinetics analysis. The previous sections show that measuring protein-protein interaction is possible either by immobilizing one of the binding antibodies on the surface or by detecting solution protein abundance changes using ESM. Here, we demonstrate that these two methods are compatible in ESM measurement. We simultaneously measured two pairs of protein interactions (anti-IgA to IgA, anti-IgM to IgM) from a protein mixture. Anti-IgA, IgA, and IgM were mixed with 2.5 nM final concentration for each protein in PBS and immediately flowed over the chip. The ITO chip was pre-modified with anti-IgM on the surface. FIG. 17b shows IgM bound numbers along the time. IgM dissociates from the surface, providing bound number decay in FIG. 17b after PBS was flowed over the chip surface. The fitting of the curves with the first-order binding kinetics model determines the association ($k_{on}$) and dissociation ($k_{off}$) rate constants, which are $5.21 \times 10^6$ $M^{-1}$ $s^{-1}$ and $2.96 \times 10^{-3}$ $s^{-1}$, respectively. From $k_{on}$ and $k_{off}$, the equilibrium dissociation constant ($K_D = k_{off}/k_{on}$) is determined to be 568 pM. These values are in good agreement with the stand-alone ESM results shown in FIG. 15. At the same time, Anti-IgA, IgA, and their complex hit the surface nonspecifically. We counted protein collision events in real time and calculated the monomer ratio as the function of time (Method). FIG. 17c shows the monomer IgA ratio versus time during the experiment. At the start of the protein detection, we had the highest monomer ratio, and in the flowing three minutes this ratio decreased, which is the same as FIG. 16. The fitting result of ratio decay is shown in a solid line obtaining $k_{off} = 1.48 \times 10^{-3}$ $s^{-1}$ and $k_{on} = 8.81 \times 10^5$ $M^{-1}s^{-1}$, which leads to $K_D = 1.84$ nM.

Discussion

The single-molecule imaging systems can measure single protein size and number separately, which is a distinct advantage over ensemble molecular interaction analysis. The ensemble approaches only give the integrated results of both quantities, which are not only sensitive to impurity but also impossible to measure multiple protein species at the same time without spatial separation. However, the single-molecule signal is usually weak and challenging to be precisely achieved with conventional approaches. One of the issues is that traditional average-and-differential image processing for shot noise reduction also sacrifices the temporal resolution needed to locate the timing of single molecule binding events. To overcome this issue, we use a moving-average of the images with a single frame step to find the accurate binding time of each protein. In this way, we can count more single protein binding events and determine the single-molecule signals more precisely. Although we use ESM to show the capability of this improved image processing method, the method should be also applicable to PSM and other imaging-based methods that need the average-and-differential image processing approach for shot noise reduction and background subtraction.

To demonstrate the advantage of this improved data processing method, we show that we can track single protein landing events on the surface and distinguish anti-IgA, IgA, and the binding complex based on proteins spot intensities. By counting the ratio of IgA in the total landing events (IgA+complex), we can track the decay of free monomer IgA abundance in the solution during the binding process and obtain the free solution binding kinetics by fitting the decay curve. Furthermore, we can simultaneously count multiple molecules distinct by their intensities to simultaneously analyze the kinetics of binding processes in the solution and on the surface. In the future, we anticipate this capability can help quantitatively estimate the competition between the analyte-protein interaction on the membrane and analyte-antibody binding in the solution.

Materials and Methods

Materials. ITO chips were purchased from SPI Supplies. Human colostrum IgA was purchased from Athens Research and Technology. Anti-IgA was purchased from BIO-RAD. Phosphate-buffered saline (PBS) was purchased from Corning. PBS was filtered with 0.22 um filters (Millex) before usage. N-ethyl-N'-(dimethylaminopropyl) carbodiimide (EDC) and N-hydroxysulfosuccinimide (Sulfo-NHS) were purchased from Thermo Fisher Scientific. 99.5% Isopropyl Alcohol (IPA) was purchased from Oakwood chemical.

Experimental Setup. An 80 mW 450 nm laser diode (PL450B, Thorlabs, Newton, NJ, US) is used for creating an evanescent wave in the experiment. The laser diode is mounted to a temperature-controlled mount (LDM38, Thorlabs) and driven by a benchtop diode current controller (LDC205C, Thorlabs) and a temperature controller (TED200C, Thorlabs). Light from the laser diode is conditioned by an achromatic doublet lens group and focused at the back focal plane of a 60× Objective (Olympus APO N 60× Oil TIRF, NA 1.49). The light incident onto the ITO chip with an angle of ~65° adjusted by a translation stage (XR25P-K2, Thorlabs). The ×50 imaging objective (NA, 0.42) is top-mounted collecting surface, and protein scattered light. A camera (MQ003MG-CM, XIMEA, Munster, Germany) connected to the imaging objective is used to record the scattering images at 160 fps. The image is recorded with a ~8×10 μm² field of view. The power density is 60 kW/cm² for single protein imaging. A flow cell for sample delivery is constructed as previously reported.

Figures 13E, 13F:
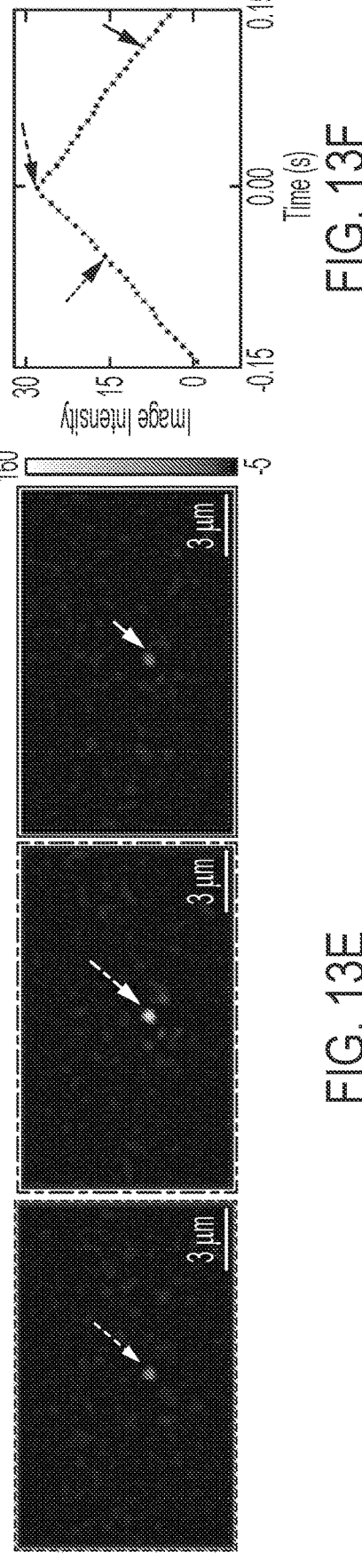

Protein binding analysis. To track the protein binding and extract each protein binding intensity, we use the Trackmate plugin in the ImageJ app and a homemade Matlab code with the following settings: 1) In Trackmate, a Laplacian of Gaussian Filter with 8 pixels diameter is set as determined by setup resolution and camera pixel size. 2) A threshold provides a spot with a larger than three signal-to-noise-ratio is set. Here we use 1.5 as the quality threshold in Trackmate. 3) As a result of moving-averaging-differential processing, a binding event will show as a still bright spot with a first-increase-then-decrease intensity profile in a temporal differential image sequence (FIG. 13f). Trackmate is used to track the binding intensity temporal changes. A gap tolerance is set to 1 frame, and linking distance is set to 1 pixel for tracking one protein binding. We use Matlab to do the following steps. 4) Extract track information from the Trackmate. Filter out tracks with less than 300 ms residence time. This step effectively removes tracks from the background noise. 5) A frame containing more than 40 spots is also filtered out, which usually originated from one or more large impurity particles miss identified by Trackmate as multiple binding spots. 6) For each track, we use the maximum intensity and the Trackmate quality for protein identification. 7) Separate quality thresholds are determined for different protein species relying on binding quality from Trackmate. We have threshold ranges for anti-IgA (1.5-2.8), IgA (2.8-3.2), and IgM (4.8-10), which are determined in the calibration experiments. The threshold range for the complex is 3.2-4.8.

IgA and anti-IgA binding kinetics analysis. We have anti-IgA and IgA landing counts as the function of time. The fraction of monomer IgA counts equal to the mole fraction of the solution monomer:

$$X_{IgA} = \frac{[IgA]}{[IgA]+[Complex]} = \frac{\text{counts}(IgA)}{\text{counts}(IgA) + \text{counts}(Complex)} \quad (4)$$

Where [IgA] and [Complex] are the concentration of the IgA and the complex. The sum of IgA and complex concentration is a constant, which is the initial concentration of IgA. We consider the first-order reaction of anti-IgA and IgA association experiment. According to the derivative equation, $k_{on}$ and $k_{off}$ can be obtained by fitting the IgA concentration decay:

$$\frac{d[IgA]}{dx} = k_{off}[\text{Complex}] - k_{on}[IgA]\left[anti-IgA\right] \quad (5)$$

$$K_D = \frac{k_{off}}{k_{on}} \quad (6)$$

Where $k_{on}$ and $k_{off}$ are the rate constants, and $K_D$ is the equilibrium dissociation constant. IgA and complex counts are used here because they have a better signal-to-noise ratio than anti-IgA due to their larger size.

Surface Functionalization and Surface Immobilization. To measure the nonspecific landing of single proteins, ITO chips were modified with carboxyl groups by the flowing steps. 1) Incubated the ITO chip in $NH_3$, $H_2O_2$, and $H_2O$ mixture with a 1:1:5 volume ratio for 1 h. Dropping water became a layer on the hydrophilic chip surface. 2) Ultrasonically cleaned the chip and container with water, rinsed the chip with water, and dried it with nitrogen gas. 3) Incubated the chip in 1% APTES in IPA for 2 hours. This step functionalizes the surface with the amine group. 4) Ultrasonically cleaned the chip and container with IPA, rinsed the chip with water, and dried it with nitrogen gas. 5) Incubated the chip in 10 g/L succinic anhydrate for 3 hours. The solution pH should be between 7.5-8.6) Cleaned the chip and container with water ultrasonically, rinsed the chip with water, and dried it with nitrogen gas. Store the chips in the water for further usage. In the experiment, 0.05 M NHS and 0.2 M EDC were mixed and incubated on the chip surface for 15 minutes to activate the surface. The EDC/NHS solution was filtered with a 0.22 μm filter before usage. After activation, the surface was rinsed with PBS. In the calibration experiment, 10 nM IgG or 5 nM IgA in PBS was flowed onto the surface for single protein calibration. In IgM calibration measurement, 20 nM anti-IgM was incubated on the surface for 1 h after EDC/NHS activation. Then, the surface was rinsed with PBS. Finally, 20 nM IgM solution was flowed onto the surface for measurement. In free solution IgA and anti-IgA binding kinetics measurement, 100 nM BSA was incubated on the surface for 1 h after EDC/NHS activation. 2.5 nM anti-IgA and 2.5 nM IgA was flowed over the surface. In IgM and anti-IgM binding kinetics experiment, 20 nM anti-IgM was incubated on the surface for 1 h after EDC/NHS activation. 2.5 nM IgM solution was flowed onto the surface for measurement. In parallel binding kinetics measurement, 20 nM anti-IgM was incubated on the surface for 1 h after EDC/NHS activation. Anti-IgA, IgA, and IgM with a final 2.5 nM concentration for each protein were flowed onto the surface.

Example 4: Single-Objective Evanescent Scattering
Microscopy for Imaging Single Proteins and
Binding Kinetics Introduction Determining molecular interactions is vital for drug screening, molecular diagnosis, biochemical analysis, and understanding the biological processes at the molecular level. To meet this need, evanescent detection approaches have been developed as a powerful tool for detecting molecules and quantifying the molecular interaction dynamics. These approaches are accomplished with different processes, such as total internal reflection (TIR), surface plasmon resonance (SPR), optical waveguide, manipulating Bloch surface waves, optical microcavities, and plasmonic resonators. The shared feature of these processes is creating an evanescent field localized within several hundred nanometers from the sensor surface for measurement. The evanescent field has exponentially decaying intensity in the axial direction, thus allowing tracking analyte motion with resolution down to sub-nanometer level by monitoring signal intensity variations in real-time. More importantly, the evanescent field can significantly reduce the illumination volume for enhancing light-analyte interaction and reducing the environmental noise, which is responsible for the high sensitivity of evanescent detection. As a result, the combination of evanescent detection and fluorescence approaches, namely the total internal reflection fluorescence, has become one of the most popular single-molecule detection schemes in the last decades. In recent years, the label-free evanescent single-molecule sensing approaches were intensely studied to analyze intrinsic molecular properties such as mass and quantify molecular interaction kinetics without labels. Recently developed plasmonic scattering microscopy (PSM) has further advanced this field by providing single-molecule imaging capability for parallelly monitoring the molecular interaction process in different locations. However, two factors prevent the broader applications of PSM. One is the heating effect accompanying the plasmonic enhancement, limiting its applications for detecting fragile biological molecules under normal conditions. The other is the complicated system structure and flow cell fabrication for clear observations with the second objective. For example, the flow channel needs to be constructed with a thin cover glass as top window and a channel height less than 100 micrometers for correctable image distortion, which makes it challenging to combine with other technologies, such as electrochemical microscopy, to analyze additional molecular properties such as charge and charge-to-mass ratio.

Here, we show that label-free evanescent single-molecule imaging can be achieved on a single total internal reflection fluorescence objective. TIR replaces SPR to provide the evanescent illumination for single-molecule imaging. As a result, no gold film is coated on the sensing substrate, thus allowing excitation and observation using one objective without heating effect. We also show that single protein molecules can be detected and identified based on their mass and specific binding to the corresponding antibodies. Additionally, we demonstrate measurement of protein binding kinetics, which is one mainstream application of evanescent detection approaches, by digitally counting the binding and unbinding of individual molecules. We also show that this system can record the protein binding sites with nanometer precision, providing a solution to analyze molecular interaction with high spatiotemporal resolution.

Results

Figures 18A, 18B, 18C, 18D:
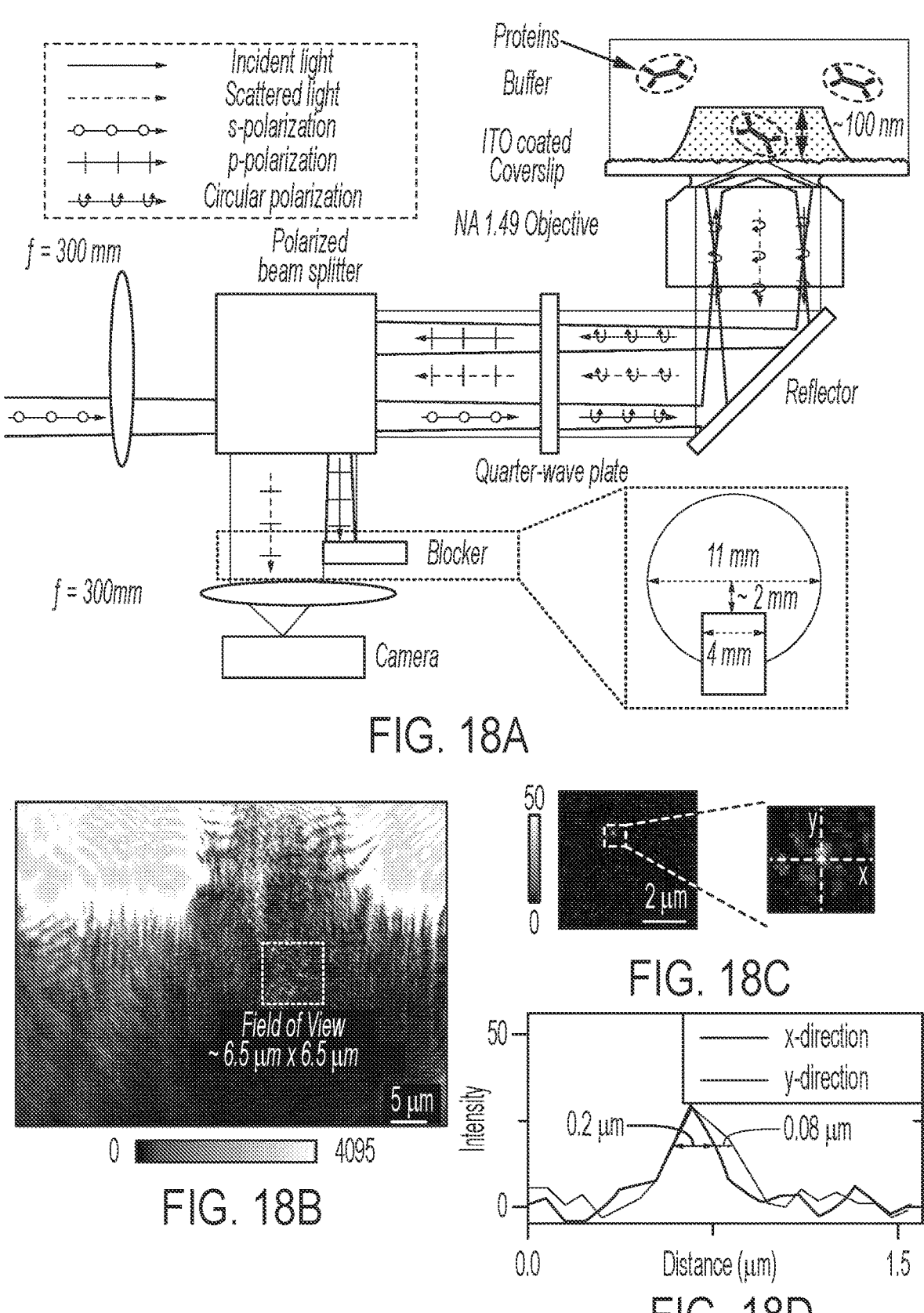

Imaging principles. We excite evanescent waves using TIR configuration by directing light beyond critical angle via an oil-immersion objective onto an Indium-Tin-Oxide (ITO) coated coverslip placed on the objective (FIG. 18). The ITO film was employed to provide nanometer-scale surface roughness profiles instead of the gold film, which is used in the PSM. As both the ITO film and coverslip have good optical transparency, we can collect the evanescent waves scattered by the ITO surface and proteins with the same objective. To reduce the optical energy loss in the path, polarization beam splitting strategy is used here. As shown in FIG. 18A, the s-polarized incident beam becomes circularly polarized after passing the quarter-wave plate. Then, the circularly polarized reflection beam and evanescent waves scattered by the ITO surface and proteins become p-polarized after passing the quarter-wave plate and then are reflected to the detection path by a polarization beam splitter. Finally, one blocker with a diameter of 4 mm was applied to block the intense reflection beam. Thus, we can clearly see the background ($E_b$) created by evanescent waves scattered by the surface roughness of ITO film (FIG. 18B). The $E_b$ can interfere with the evanescent waves scattered by the proteins ($E_s$). Consequently, the image is given by $$I = |E_b + E_s|^2 = |E_b|^2 + |E_s|^2 + 2\,|E_b|\,|E_s|\cos(\beta) \qquad (7)$$

where $\beta$ is the phase difference between light scattered by the ITO surface and proteins. The $E_b$ created by the high-density ITO islands on the surface is much larger than $E_s$ created by proteins, and thus the interference term, $2|E_b||E_s|\cos(\beta)$, dominates the sensor output and produces the image contrast that scales with protein volume, or the molecular weight. To differentiate this plasmonic imaging method from PSM, we refer it to as evanescent scattering microscopy (ESM). The ESM does not rely on the gold film to produce an evanescent wave and therefore permits the incident intensity of 150 kW/cm$^2$ used here, which is 50 times higher than the PSM, making it possible to image smaller proteins.

To achieve the high contrast ESM image of single proteins, it is necessary to remove $|E_b|^2$ in equation (7), which is achieved with the following imaging processing algorithm. Starting from the images captured with a high frame rate, usually 2000 frames per second, we first average the image frames within usually 20 ms to suppress random noise in the images. We then obtain differential images by subtracting a previous frame from each frame. The subtraction removes background features and captures the binding of a protein to the surface. The codes for data processing have been published previously. FIG. 18C shows an ESM image of one immunoglobulin G (IgG) molecule, where the point spread function is wider in vertical than horizontal direction (FIG. 18D). This should be because the blocker prevents high spatial frequency components from passing, leading to smaller effective numerical aperture and thus worse spatial resolution in the vertical direction. As a result, we determined the image intensity by integrating the intensities of all pixels within the disk centered around the protein's binding position with the diameter selected from the length of the axis of the point spread function in the vertical direction.

Detection of single proteins. We validated single-objective ESM by imaging the proteins with different molecular weights, including bovine serum albumin (BSA, 66 kDa), goat IgG (150 kDa), human immunoglobulin A (IgA, 385 kDa), and human immunoglobulin M (IgM, 950 kDa). For each molecular weight, the proteins dispersed in phosphate-buffered saline (PBS) buffer were introduced into a solution well mounted on the ITO surface, and the binding of the proteins to the surface was recorded over time. The ITO surface was modified with N-hydroxysuccinimide (NHS) groups to increase the binding rate (Methods). FIG. 19A shows the ESM images of BSA, IgG, IgA, and IgM proteins binding on the surface, and the ESM image achieved by flowing PBS buffer was also shown as control. The ESM images reveal the individual proteins as bright spots due to the constructive interference between the evanescent waves scattered by the ITO surface and proteins, and the number in the intensity bar indicates the grayscale intensity range. We tracked and counted the individual protein binding events over 10 min and constructed an image intensity histogram from the multiple protein molecules for each molecular weight. The image intensity histogram of the individual proteins follows a Gaussian distribution (FIG. 19B), and ESM image contrast increases along with increasing the molecular weight, which is clearly shown by the intensity histograms (FIG. 19C). By fitting the histograms with a Gaussian distribution, the mean intensity of each protein was extracted and also presented in FIG. 19B. Plotting the mean image intensity versus molecular weight reveals a linear relationship (FIG. 19D), confirming that the ESM image intensity is a measure of protein volume and therefore the molecular mass. The signal-to-noise ratio (SNR) for ESM imaging of BSA proteins is estimated to be ~10, while the PSM usually can only achieve the SNR of 10 for imaging IgA, which is ~6 times heavier than BSA, demonstrating the advantages of single-objective ESM for single protein analysis.

Figures 20A, 20B, 20C:
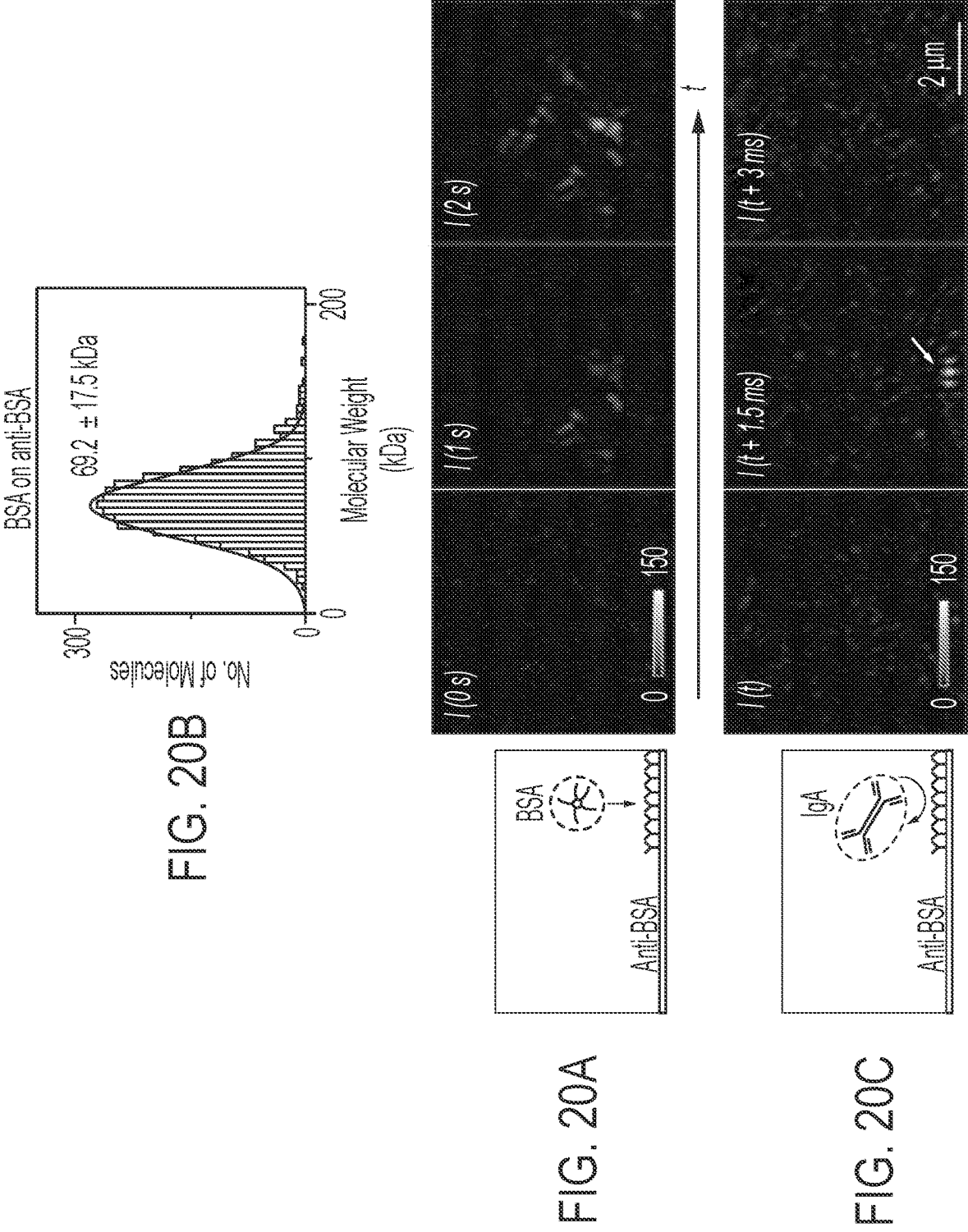

Identification of single proteins. To identify single proteins with single-objective ESM, we coated the ITO surface with anti-BSA and studied the specific binding of BSA to anti-BSA (FIG. 20A). On exposure to BSA, the binding of single BSA molecules to anti-BSA took place immediately, which was observed as the bright spots appearing one at a time on the surface. FIG. 20A shows a few snapshots. To view all the BSA binding events on the surface on the Nth frame, we integrate the differential images from 1 to N as described before. We counted the individual BSA binding events over 10 min and constructed a molecular weight histogram using the calibration curve shown in FIG. 19D, showing a major peak due to single BSA molecules (FIG. 20B). As a negative control experiment, we flowed IgA over the anti-BSA coated ITO surface. Unlike the case of BSA, where a bright spot appears and stays on the surface, bright spots (IgA proteins) show up on the surface only transiently (FIG. 20C), which is expected because IgA does not bind specifically to anti-BSA. For the negative control experiment, the average period is set to be 1.5 ms for improving temporal resolution to avoid motion blur. The identification experiment confirms that the single-objective ESM can specifically image the single proteins.

Figures 21A, 21B, 21C, 21D, 21E:
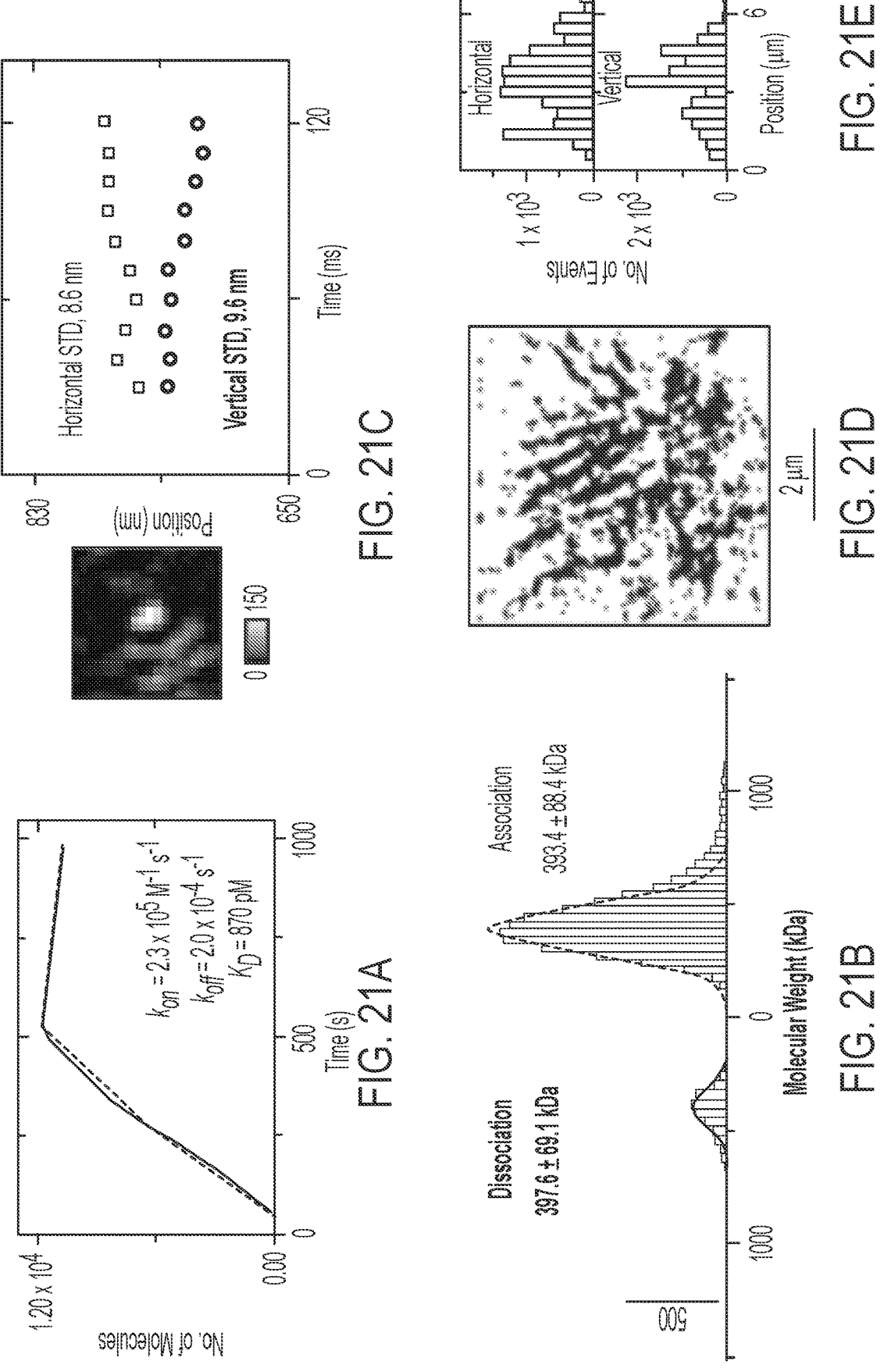

Quantification of protein binding kinetics. The most powerful application of PSM is measuring the molecular binding directly by digital counting for binding kinetics analysis, rather than a shift in the resonant angle measured by the ensemble SPR, which depends on the refractive index of the solution and must be corrected for accurate binding kinetics measurement. We show here that the single-objective ESM can also measure the protein binding kinetics at the single-molecule level by counting the binding and unbinding of single molecules. As a proof-of-concept, we studied IgA binding to anti-IgA (FIG. 21A). We first flowed IgA over an anti-IgA coated ITO surface to monitor the association process, then flowed PBS buffer over the sensor surface to dissociate IgA from anti-IgA. We tracked the association and dissociation processes by counting the individual IgA molecules in real-time. Plotting the number of bound IgA versus time produces binding kinetics curves. Fitting of the curves with the first-order binding kinetics model determines the association ($k_{on}$) and dissociation ($k_{off}$) rate constants, which are $2.3 \times 10^5$ $M^{-1}$ $s^{-1}$ and $2.0 \times 10^{-4}$ $s^{-1}$, respectively. From $k_{on}$ and $k_{off}$, the equilibrium dissociation constant ($K_D = k_{off}/k_{on}$) is determined to be 870 pM. These values agree with the published results. In addition, the mean intensity changes associated with the binding and unbinding of events are consistent with the molecular weight of an IgA molecule, confirming the detection of single proteins (FIG. 21B).

The single-objective ESM can not only provide high temporal resolution for binding kinetics analysis at the single-molecule level, but also permit the super localization of protein binding sites with high precision owing to that it employs an oil immersion objective with a numerical aperture of 1.49, which is ~3.5 times higher than the observation objective used in PSM. Two-dimensional Gaussian fitting was employed to localize the protein binding sites. We track one IgA protein binding on the ITO surface for 100 ms with a temporal resolution of 10 ms to estimate the localization error (FIG. 21C). The localization precision is estimated to be 8.6 nm, and 9.6 nm at horizontal, and vertical directions, respectively. The lower localization precision in the vertical direction should be because of the smaller effective numerical aperture resulting from the blocker. The localization precision in both directions is lower than theoretical predictions, which should be because the tracking period of 100 ms is longer than the shot noise limited duration of ~20 ms. Then, the sites of IgA binding to anti-IgA measured in FIG. 21A were localized as shown in FIG. 21D. The binding probability is not uniform over the surface, which can be more clearly revealed by the statistical analysis in horizontal and vertical directions (FIG. 21E). The IgA prefer binding to a few areas over others on the ITO surface, which should be because the thin APTES film used for modifying ITO surface anti-IgA is usually not uniform due to the multilayer-island growth kinetics, resulting in nonuniform antibody coverage.

Discussion

The image contrast of single-objective ESM arises from the interference of evanescent waves scattered by sensor surface and proteins, which is analogous to PSM. Single-objective ESM shares the advantage of PSM, namely that the evanescent enhancement effect enables comparable signal-to-noise ratio with either lower incident light power or wider field of view than conventional nonevanescent approaches. Compared to PSM, single-objective ESM shows two advantages. First, the ITO surface produces little heat, thus allowing the incident light intensity of up to 150 kW $cm^{-2}$, which is ~50 times higher than the PSM. This makes it possible to use single-objective ESM for reliably imaging medium-sized single proteins as small as the BSA (66 kDa), which is usually considered as the practical measurement limit for label-free single-molecule detection technologies. Second, the ITO coated coverslips have good transparency, thus allowing the excitation and detection with a single total internal reflection fluorescence objective, which has a much higher numerical aperture than the dry objective used for PSM. Owing to this, the single-objective ESM allows both higher collection efficiency and super-resolution localization precision. Furthermore, the single objective optical arrangement simplifies the system structure by removing the second objective on the top of the sensor surface, thus eliminating the image distortion resulting from the refraction of the water layer and allowing the applications of conventional flow cells, rather than the complicated flow cell with a thin cover glass as a top window for PSM. The simple optical arrangement makes it easy to combine with other technologies, such as electrochemical microscopy, to analyze additional molecular properties such as charge.

We have demonstrated the evanescent single-molecule imaging with TIR configuration on a single-objective ESM system. The light scattered by the ITO surface is used as a reference for interfering with light scattered by proteins, providing the quantitative mass imaging of single proteins. We also show that this approach can identify single proteins and quantify the protein binding kinetics by digitally counting the binding and unbinding of single proteins. In addition, the single-objective ESM can also provide super-resolution localizations of protein binding sites, thus providing one solution for label-free mapping of target proteins on the bio membrane by dynamically monitoring the antibody binding. The single-objective ESM also presents a solution to achieve label free single protein imaging with conventional optical arrangement, which can be easily combined with other technologies. Thus, we anticipate that the single-objective ESM can become an essential tool for analyzing single molecule behaviors, especially when combined with electrochemical microscopic imaging for a systematic understanding of protein distributions and activities on the biological surfaces.

Materials and Methods

Materials. The No. 1 ITO Coated Cover Slips (22×22 mm, Catalog No. 06470-AB) were purchased from SPI Supplies (West Chester, PA, US). Isopropyl alcohol (IPA, Catalog No. BDH2032-1GLP) was purchased from VWR (Radnor, PA, US). Hydrogen peroxide ($H_2O_2$, 30%, Catalog No. H1009), (3-Aminopropyl)triethoxysilane (APTES, Catalog No. 440140), succinic anhydride (Catalog No. 239690), and bovine serum albumin (BSA, Catalog No. A7638), sodium hydroxide (NaOH, Catalog No. S5881) were purchased from Sigma-Aldrich (St. Louis, MO, US). Ammonium hydroxide ($NH_3 \cdot H_2O$, 28.0 to 30.0%, Catalog No. C5103500-2.5D) was purchased from Mallinckrodt Reagents (Belmont, NC, US). 1-ethyl-3-(3-dimethylaminopropyl)carbodiimide hydrochloride (EDC, Catalog No. 22980) and Sulfo-NHS (N-hydroxysulfosuccinimide, Catalog No. 24510) were purchased from Thermo Scientific (Waltham, MA, US). Phosphate-Buffered Saline (PBS, Catalog No. 21-040-CV) was purchased from Corning (Corning, NY, US) and filtered with 0.22-μm filters (Millex-GS, Catalog No. SLGSM33SS) from Sigma-Aldrich (St. Louis, MO, US). Goat anti-human IgA (IgG, Catalog No. STAR141) was purchased from BIO-RAD (Hercules, CA, US). Human colostrum IgA (Catalog No. 16-13-090701) and Human IgM (Catalog No. 16-16-090713) were purchased from Athens Research and Technology (Athens, GA, US). Deionized water with resistivity of 18.2 MΩ cm$^{-1}$ was filtrated with a 0.22-μm filter and used in all experiments.

Experimental setup. A 120-mW laser diode (L660P120, Thorlabs, Newton, NJ, US) is used as the light source to provide the incident wavelength of 660 nm. The laser diode is fixed at a temperature-controlled mount (LDM56, Thorlabs), which is driven by a benchtop diode current controller (LDC205C, Thorlabs) and a temperature controller (TED200C, Thorlabs). Light from the laser diode is conditioned by an achromatic doublet lens group, and then focused to the back focal plane of a ×60 objective (Olympus APO N 60× Oil TIRF, NA 1.49) by a tube lens with focal length of 300 mm. The incident angle was adjusted by a manual translation stage to reach total internal reflection condition at 650 (XR25P-K2, Thorlabs). A combination of polarization beam splitter with quarter-wave plate is employed to separate the signal light from incident light. Refection beams is blocked by a M4 screw with a diameter of 4 mm. The evanescent waves scattered by the ITO surface and proteins are collected by a camera (MQ003MG-CM, XIMEA). A detailed schematic representation of the optics can be found in FIG. 3.

Surface functionalization. For measuring nonspecific binding of single proteins, the ITO coated coverslips were modified with active carboxyl groups using following steps. 1) The ITO coated coverslips were cleaned in the boiling solution mixing the $NH_3$—$H_2O$, $H_2O_2$, and water with volume ratio of 1:1:5 for 1 hour to obtain clean hydroxylated ITO surfaces, where dropping water became a layer. 2) The ITO coated coverslips and container were washed twice with water, and then ultrasonically cleaned 2 times with water, and blew dry with nitrogen. 3) The hydroxylated ITO coated coverslips were incubated in boiling 1% APTES diluted with IPA for 3 hours to functionalize the surface with primary amine group. After processing, both solution and ITO coated coverslips should be clear if drying in second step is performed properly. 4) ITO coated coverslips and container were washed twice with IPA, ultrasonically cleaned twice with IPA, and blew dry with nitrogen. 5) Incubate the amino group modified ITO coated coverslips in 10 g L$^{-1}$ succinic anhydride in water for 1 hour to obtain carboxylic group functionalized ITO coated coverslips. The pH of succinic anhydride solution is adjusted to 7.5-8 with 1 M NaOH solution. The ITO coated coverslips and container were washed twice with water, ultrasonically cleaned twice with water, and then stored in the water prior to use. In the experiment, the surface was incubated in 40 g L$^{-1}$ EDC mixed with 11 g L$^{-1}$ Sulfo-NHS for 15 min to activate the carboxyl groups for connecting proteins. The EDC/NHS solution was filtered by a 0.22-μm filter before use. For specific binding kinetic analysis, the activated carboxylic group modified ITO coated coverslips were rinsed with PBS buffer, and then 20 nM anti-IgA in PBS buffer was applied to the surface and incubated for 1 hour to allow immobilization. Next, the surface was incubated in 1 mg ml$^{-1}$ BSA for 10 min to block any remaining activated carboxylic group to minimize nonspecific binding. Finally, the protein solution was flowed onto the surface for specific binding measurement.

Data processing. The raw image sequence captured at high frame rate (2000 fps) was converted to an averaged-image sequence, by usually averaging images over every 20 ms using previously reported MATLAB program or the real-time averaging function of the camera recording software (XIMEA CamTool), to suppress shot noise. To remove the background, a differential image sequence was obtained by subtracting the previous frame using the Image Calculator plugin in ImageJ. The TrackMate plugin in ImageJ was employed to find and count particles or molecules. The ESM intensity of a particle or molecule was determined by integrating the intensities of all pixels within the disk centered around the protein's binding position with the diameter selected from the length of the axis of the point spread function in the vertical direction. Origin 2019 was used to create data plots and histograms. Scrubber v. 2.0a was used to determine the association and dissociation rate constants by fitting the curves in FIG. 21A with the first-order binding kinetics model.

Some further aspects are defined in the following clauses:

Clause 1: A method of detecting single molecules. The method comprising: binding single molecules in a sample solution to a first surface of an optically transparent substrate; irradiating the first surface of the substrate with an incident light having an incident angle selected to achieve total internal reflection of the incident light, thereby scattering light from the first surface and from the single molecules bound to the surface, wherein a wavelength of the incident light is between 10 nm and 350 μm and the optically transparent substrate has a refractive index at the wavelength of the incident light exceeding that of the sample solution; and collecting an image that captures interference between evanescent light scattered from the single molecules and the first surface, while avoiding collection of light reflected from the first surface.

Clause 2: The method of Clause 1, wherein collecting the image comprises collecting a series of images over time.

Clause 3: The method of Clause 1 or Clause 2, further comprising processing the series of images.

Clause 4: The method of any one of the preceding Clauses 1-3, wherein processing the series of images comprises: averaging images in the series of images; subtracting a previous image from each image to form a differential image sequence; and integrating the differential image sequence over time.

Clause 5: The method of any one of the preceding Clauses 1-4, wherein the single molecules comprise proteins.

Clause 6: The method of any one of the preceding Clauses 1-5, wherein the proteins are bound to the first surface with carboxylic groups.

Clause 7: The method of any one of the preceding Clauses 1-6, wherein an intensity of the image is proportional to a molecular weight of the single molecules.

Clause 8: The method of any one of the preceding Clauses 1-7, further comprising assessing binding kinetics of the single molecules to the first surface over time.

Clause 9: The method of any one of the preceding Clauses 1-8, wherein the light has a wavelength between 10 nm and 400 nm, between 200 nm and 400 nm, between 400 nm and 700 nm, between 700 nm and 1100 nm, or between 700 nm to 350 μm.

Clause 10: The method of any one of the preceding Clauses 1-9, further comprising assessing association and dissociation properties of the single molecules with respect to the first surface by digitally counting a number of the single molecules bound to the first surface over time.

Clause 11: The method of any one of the preceding Clauses 1-10, wherein collecting the image comprises capturing the interference between the evanescent light scattered from the single molecules and the first surface through an objective positioned above the first surface and through an objective positioned below a second surface of the substrate.

Clause 12: The method of any one of the preceding Clauses 1-11, wherein collecting the image comprises capturing the interference between the evanescent light scattered from the single molecules and the first surface only through an objective positioned below a second surface of the substrate.

Clause 13: The method of any one of the preceding Clauses 1-12, wherein the optically transparent substrate is free of a metallic coating.

Clause 14: The method of any one of the preceding Clauses 1-13, wherein the optically transparent substrate comprises a metallic coating.

Clause 15: The method of any one of the preceding Clauses 1-14, wherein the single molecules are unlabeled.

Clause 16: A system comprising: a flow cell comprising an optically transparent substrate, wherein the flow cell is configured to facilitate flow of a sample solution over a first surface of the substrate and target molecules and the first surface is configured to bind to target molecules if present in the sample; a light source configured to irradiate the first surface with an incident light having an incident angle selected to achieve total internal reflection of the incident light, wherein a wavelength of the incident light is in a range of 10 nm and 350 μm, and the optically transparent substrate has a refractive index at the wavelength of the incident light exceeding that of the sample solution and an incident angle is selected to achieve total internal reflection of the light; at least one camera; and an optical system configured to capture interference between evanescent light scattered from the first surface and evanescent light scattered from the target molecules if preset on the first surface, while avoiding collection of light reflected from the first surface to form a series of images on the camera.

Clause 17: The system of Clause 16, wherein the first surface of the substrate produces scattered light for sufficient interference with the light scattered by the target molecules.

Clause 18: The system of Clause 16 or Clause 17, wherein a roughness of the surface is at least 0.5 nm, between 1 nm and 100 nm, or between 0.5 nm and 2 nm.

Clause 19: The system of any one of the preceding Clauses 16-18, further comprising a controller, wherein the controller is configured to: average images in the series of images; subtract a previous image from each image to form a differential image sequence; and integrate the differential image sequence over time.

Clause 20: The system of any one of the preceding Clauses 16-19, wherein the first surface comprises receptors configured to bind to the target molecules, and binding and unbinding of the target molecules is detected by counting the target molecules over time and fitting with a binding model to determine kinetic constants and affinity.

Clause 21: The system of any one of the preceding Clauses 16-20, further comprising a controller, wherein the controller is configured to correct for mechanical drift.

Clause 22: The system of any one of the preceding Clauses 16-21, wherein correcting for mechanical drift comprises: identifying one or more features of the first surface; determining a drift displacement for each image; and subtracting the drift displacement from each image.

Clause 23: The system of any one of the preceding Clauses 16-22, wherein the optical system comprises a prism or high numerical aperture oil immersion objective.

Clause 24: The system of any one of the preceding Clauses 16-23, wherein the optical system is configured to capture the interference between the evanescent light scattered from the first surface and the evanescent light scattered from the target molecules if present on the first surface through an objective positioned above the first surface and through an objective positioned below a second surface of the substrate.

Clause 25: The system of any one of the preceding Clauses 16-24, wherein the optical system is configured to capture the interference between the evanescent light scattered from the first surface and the evanescent light scattered from the target molecules if present on the first surface only through an objective positioned below a second surface of the substrate.

Clause 26: The system of any one of the preceding Clauses 16-25, wherein the optically transparent substrate is free of a metallic coating.

Clause 27: The system of any one of the preceding Clauses 16-26, wherein the optically transparent substrate comprises a metallic coating.

Clause 28: The system of any one of the preceding Clauses 16-27, wherein the single molecules are unlabeled.

Clause 29: A method of imaging a multiplicity of components in a liquid sample, the method comprising: flowing the liquid sample over a first surface of a glass substrate of a flow cell, thereby coupling one or more of the components to the first surface, wherein the glass substrate is free of a metallic coating; directing light to the first surface at an incident angle selected to achieve total internal reflection; obtaining, over a length of time, a series of images comprising regions corresponding to light scattered by each component coupled to the first surface; and assessing, from the series of images, an intensity of the light scattered by each component coupled to the first surface as a function of time.

Clause 30: The system of Clause 29, wherein a peak intensity of the light scattered from each component increases with a mass of the component.

Clause 31: The system of Clause 29 or Clause 30, further comprising assessing, from the series of images, a length of time each component is coupled to the first surface.

Clause 32: The system of any one of the preceding Clauses 29-31, comprising obtaining, over the length of time, the series of images through an objective positioned above the first surface and through an objective positioned below a second surface of the glass substrate.

Clause 33: The system of any one of the preceding Clauses 29-32, comprising obtaining, over the length of time, the series of images only through an objective positioned below a second surface of the substrate.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

---

What is claimed is:

1. A method of detecting single molecules, the method comprising:
   binding single molecules in a sample solution to a first surface of an optically transparent substrate;
   irradiating the first surface of the substrate with an incident light having an incident angle selected to achieve total internal reflection of the incident light, thereby scattering light from the first surface and from the single molecules bound to the surface, wherein a wavelength of the incident light is between 10 nm and 350 μm and the optically transparent substrate has a refractive index at the wavelength of the incident light exceeding that of the sample solution; and
   collecting an image that captures interference between evanescent light scattered from nanoscale roughness of the first surface and evanescent light scattered from individual unlabeled single molecules, while avoiding collection of specularly reflected propagating light from the first surface.

2. The method of claim 1, wherein collecting the image comprises collecting a series of images over time.

3. The method of claim 2, further comprising processing the series of images.

4. The method of claim 3, wherein processing the series of images comprises:
   averaging images in the series of images;
   subtracting a previous image from each image to form a differential image sequence; and
   integrating the differential image sequence over time.

5. The method of claim 1, wherein the single molecules comprise proteins.

6. The method of claim 5, wherein the proteins are bound to the first surface with carboxylic groups, and/or wherein an intensity of the image is proportional to a molecular weight of the single molecules.

7. The method of claim 1, further comprising assessing binding kinetics of the single molecules to the first surface over time by digitally counting individual single molecules appearing and disappearing in the interference image over time and fitting a time-dependent binding model to determine association and dissociation rate constants.

8. The method of claim 1, wherein collecting the image comprises capturing the interference between the evanescent light scattered from the single molecules and the first surface through an objective positioned above the first surface and through an objective positioned below a second surface of the substrate, or wherein collecting the image comprises capturing the interference between the evanescent light scattered from the single molecules and the first surface only through an objective positioned below a second surface of the substrate.

9. The method of claim 1, wherein the optically transparent substrate is free of a metallic coating, or wherein the optically transparent substrate comprises a metallic coating.

10. The method of claim 1, wherein the single molecules are unlabeled.

11. A system comprising:
   a flow cell comprising an optically transparent substrate, wherein the flow cell is configured to facilitate flow of a sample solution over a first surface of the substrate and target molecules and the first surface is configured to bind to target molecules if present in the sample;
   a light source configured to irradiate the first surface with an incident light having an incident angle selected to achieve total internal reflection of the incident light, wherein a wavelength of the incident light is in a range of 10 nm and 350 μm, and the optically transparent substrate has a refractive index at the wavelength of the incident light exceeding that of the sample solution and an incident angle is selected to achieve total internal reflection of the light;
   at least one camera; and
   an optical system comprising one or more lenses, apertures, spatial filters, beam blocks, mirrors, beam splitters, or combinations thereof, arranged along an optical path between the first surface and the at least one camera, wherein the optical system is configured to capture interference between evanescent light scattered from the first surface and evanescent light scattered from the target molecules if present on the first surface, the evanescent light from the first surface arising from nanoscale surface roughness, while avoiding collection of specularly reflected light from the first surface to form a series of images on the camera.

12. The system of claim 11, wherein the first surface of the substrate produces scattered light that interferes with the light scattered by the target molecules.

13. The system of claim 11, wherein a roughness of the surface is at least 0.5 nm, between 1 nm and 100 nm, or between 0.5 nm and 2 nm.

14. The system of claim 11, further comprising a controller, wherein the controller is configured to:
   average images in the series of images;
   subtract a previous image from each image to form a differential image sequence; and
   integrate the differential image sequence over time.

15. The system of claim 14, wherein the first surface comprises receptors configured to bind to the target molecules, and binding and unbinding of the target molecules is detected by digitally counting individual target molecules in successive interference images and fitting a binding model to determine kinetic rate constants and affinity.

16. The system of claim 11, further comprising a controller, wherein the controller is configured to correct for mechanical drift of the first surface relative to the camera during acquisition of the interference images.

17. The system of claim 16, wherein correcting for mechanical drift comprises:
   identifying one or more fixed nanoscale surface-scattering features of the first surface in the interference images;
   determining a lateral drift displacement for each image relative to a reference image; and
   subtracting the drift displacement from each image prior to counting individual molecules.

18. The system of claim 11, wherein the optical system comprises a prism or high numerical aperture oil immersion objective, wherein the optical system is configured to capture the interference between the evanescent light scattered from the first surface and the evanescent light scattered from the target molecules if present on the first surface through an objective positioned above the first surface and through an objective positioned below a second surface of the substrate, or wherein the optical system is configured to capture the interference between the evanescent light scattered from the first surface and the evanescent light scattered from the target molecules if present on the first surface only through an objective positioned below a second surface of the substrate.

19. The system of claim 11, wherein the optically transparent substrate is free of a metallic coating, or wherein the optically transparent substrate comprises a metallic coating.

20. The system of claim 11, wherein the single molecules are unlabeled.

* * * * *